(12) United States Patent
Tracy et al.

(10) Patent No.: US 6,901,346 B2
(45) Date of Patent: May 31, 2005

(54) SYSTEM, METHOD AND MEDIUM FOR CERTIFYING AND ACCREDITING REQUIREMENTS COMPLIANCE

(75) Inventors: Richard P. Tracy, Ashburn, VA (US);
Peter A. Smith, Ashburn, VA (US);
Lon J. Berman, Sterling, VA (US);
Gary M. Catlin, Bricktown, NJ (US);
David J. Wilson, Ashburn, VA (US);
Hugh Barrett, Centreville, VA (US);
Larry L. Hall, Jr., Sterling, VA (US)

(73) Assignee: Telos Corporation, Ashburn, VA (US)

( * ) Notice: Subject to any disclaimer, the term of this patent is extended or adjusted under 35 U.S.C. 154(b) by 380 days.

(21) Appl. No.: 09/794,386

(22) Filed: Feb. 28, 2001

(65) Prior Publication Data

US 2002/0069035 A1 Jun. 6, 2002

Related U.S. Application Data

(60) Provisional application No. 60/223,982, filed on Aug. 9, 2000.

(51) Int. Cl.[7] .............................................. G06F 17/60
(52) U.S. Cl. ....................................... 702/181; 702/179
(58) Field of Search ................................. 702/179–183, 702/119, 123, 185–188, FOR 134, FOR 135, DIG. 150, FOR 171; 705/7, 1, 405, 51, 37, 53, 80; 717/124, 106; 703/20–22, 2; 709/223–225, 219, 227, 229; 706/932, 919, 920, 916, 917, 908, 909, 902, 20; 713/200–202, 133; 707/9; 714/25, 26, 40; 380/201

(56) References Cited

U.S. PATENT DOCUMENTS

| | | | |
|---|---|---|---|
| 5,621,889 A | 4/1997 | Lermuzeaux et al. | 713/200 |
| 5,625,751 A | 4/1997 | Brandwajn et al. | 706/20 |
| 5,684,959 A | 11/1997 | Bhat et al. | 709/224 |
| 5,699,403 A | * 12/1997 | Ronnen | 379/15.04 |
| 5,740,248 A | 4/1998 | Fieres et al. | 713/156 |
| 5,796,942 A | 8/1998 | Esbensen | 713/201 |
| 5,850,516 A | 12/1998 | Schneier | 713/200 |
| 5,859,847 A | 1/1999 | Dew et al. | 370/389 |
| 5,870,545 A | 2/1999 | Davis et al. | |
| 5,892,900 A | 4/1999 | Ginter et al. | 713/200 |

(Continued)

FOREIGN PATENT DOCUMENTS

| | | |
|---|---|---|
| EP | 0999489 | 5/2000 |
| WO | WO 00/70463 | 11/2000 |
| WO | WO 01/37511 | 5/2001 |
| WO | WO 01/59989 | 8/2001 |
| WO | WO 0199349 | 12/2001 |
| WO | WO02/061544 | 8/2002 |

OTHER PUBLICATIONS

Dennis Szerszen, "Secure Strategies—A Year–Long Series on the Fundamentals of Information Systems Security—Extending your business to the Web requires a firm understanding of directories, what they offer and the challenges you'll face in deploying them," Apr. 2000, Part I, from http://infosecuritymag.techtarget.com/articles/april00/features4.shtml, pp. 1–4.

(Continued)

*Primary Examiner*—Hal D. Wachsman

(57) ABSTRACT

A computer-implemented system, method and medium for assessing the risk of and/or determining the suitability of a system to comply with at least one predefined standard, regulation and/or requirement. In at least some embodiments of the present invention, the method can utilize the steps of: 1) gathering information pertaining to the system, 2) selecting one or more requirements with which the system is to comply; 3) testing the system against the requirements; 4) performing risk assessment of the failed test procedures, and 5) generating certification documentation based on an assessment of the first four elements.

61 Claims, 36 Drawing Sheets

U.S. PATENT DOCUMENTS

| | | | | |
|---|---|---|---|---|
| 5,892,903 | A | 4/1999 | Klaus | 713/201 |
| 5,931,946 | A | 8/1999 | Terada et al. | 713/201 |
| 6,006,328 | A | 12/1999 | Drake | 713/200 |
| 6,134,664 | A | 10/2000 | Walker | 713/201 |
| 6,148,401 | A | 11/2000 | Devanbu et al. | 713/170 |
| 6,151,599 | A | 11/2000 | Shrader et al. | 707/9 |
| 6,185,689 | B1 * | 2/2001 | Todd et al. | 713/201 |
| 6,205,407 | B1 | 3/2001 | Testa et al. | 702/119 |
| 6,219,626 | B1 | 4/2001 | Steinmetz et al. | 702/183 |
| 6,219,628 | B1 | 4/2001 | Kodosky et al. | 703/2 |
| 6,219,805 | B1 * | 4/2001 | Jones et al. | 714/38 |
| 6,256,773 | B1 | 7/2001 | Bowman-Amuah | 717/121 |
| 6,282,546 | B1 | 8/2001 | Gleichauf et al. | 707/102 |
| 6,298,445 | B1 | 10/2001 | Shostack et al. | 713/201 |
| 6,317,868 | B1 | 11/2001 | Grimm et al. | 717/127 |
| 6,324,647 | B1 | 11/2001 | Bowman-Amuah | 713/201 |
| 6,370,573 | B1 | 4/2002 | Bowman-Amuah | 709/223 |
| 6,389,402 | B1 | 5/2002 | Ginter et al. | 705/51 |
| 6,401,073 | B1 | 6/2002 | Tokuda et al. | |
| 6,405,364 | B1 | 6/2002 | Bowman-Amuah | 717/101 |
| 6,408,391 | B1 | 6/2002 | Huff et al. | 713/201 |
| 6,473,794 | B1 | 10/2002 | Guheen et al. | 709/223 |
| 2001/0027389 | A1 * | 10/2001 | Beverina et al. | 703/22 |
| 2001/0034847 | A1 | 10/2001 | Gaul, Jr. | 713/201 |
| 2002/0104014 | A1 | 8/2002 | Zobel et al. | 713/200 |

OTHER PUBLICATIONS

"DOD Information Technology Security Certification and Accreditation Process (DITSCAP)," Lesson 11, Aug. 29, 2000, from http://atzhssweb.gordon.army.mil/otd/c2protect/isso/item17.html, pp. 1–25.

The Mitre Croporation, "The Key to Information Sharing—Common Vulnerabilities & Exposures," Aug. 17, 2000, from http://www.cve.mitre.org/about/introduction.html.

Al Berg, "Secure Strategies—A Year–Long Series on the Fundamentals of Information Systems Security—On the surface, all vulnerability assessment scanners perform essentially the same way. Here's how to decide which on–if–any–is right for your requirements," Part 2, "Audits, Assessments & Tests (Oh, My)," from http://www.infosecuritymag.com/aug2000/securestrategies.htm, pp. 1–5.

Dan Swanson, "Secure Strategies—A Year–Long Series on the Fundamentals of Information Systems Security—Avoiding Is Icebergs," Part 4, "Audits, Assessments & Tests (Oh, My)," from http://www.infosecuritymag.com/oct2000/icebergs.htm, pp. 1–4, Oct. 2000.

George Kurtz and Chris Prosise, "Secure Strategies—Penetration Testing Exposed," Part 3, "Audits, Assessments & Tests (Oh, My)," from http://www.infosecuritymag.com/sep2000/securestrategies.htm, pp. 1–5.

Department of Defense Information Technology Security Certification and Accreditation Process (DITSCAP) Application Manual, Jul. 31, 2000, DoD 8510.1–M, pp. 1–157.

Department of Defense Standard "Department of Defense Trusted Computer System Evaluation Criteria," Dec. 26, 1985, DOD 5200.28–STD (Supersedes CSC–STD–001–83, dtd Aug. 15, 1983, Library No. S225,711), pp. 1–71.

Apr. 11, 2002. International Preliminary Examination Report from PCT/US00/09842 (note that all references were cited previously in IDS submissions on Jul. 29, 2002 and Nov. 12, 2002).

Polk, W. T. Dec. 1992. "Automated Tools for Testing computer system vulnerability (Abstract)." National Institute of Standards & Technology, Washington, DC.

Hochberg, Judith, Kathleen Jackson, Cathy Stallings, J.F. McClary, David Dubois, and Josephine Ford. May 3, 1993. "NADIR: An automated system for detecting network intrusion and misuse (Abstract)." Computers & Security, vol. 12, No. 3.

Dec. 26, 1985. "Department of Defense Trusted Computer System Evaluation Criteria." DoD 5200.28–STD.

Jul. 31, 2000. "Department of Defense Information Technology Security Certification and Accreditation Process (DITSCAP): Application Manual." DoD 8510.1–M.

Baskerville, Richard. Dec. 4, 1993. "Information Systems Security Design Methods: Implications for Information Systems Development." ACM Computing Surveys, vol. 25, No. 4, pp. 375–414.

Zhou, Qin, J. Davidson, and A.A. Fouad. Feb. 1994. "Application of artificial neural networks in power system security and vulnerability assessment (Abstract only)." IEEE Transactions on Power Systems, vol. 9, No. 1.

Jackson, K. A., J. G. Hochberg, S. K. Wilhelmy, J. F. McClary, and G. G. Christoph. May 3–5, 1994. "Management issues in automated audit analysis (Abstract only)." Los Alamos National Lab, Department of Energy computer security group training conference. Denver, Colorado.

Jackson, K. A., M. C. Neuman, D. D. Simmonds, C. A. Stallings, and J. L. Thompson. May 1–4, 1995. "Misuse and intrusion detection at Los Alamos National Laboratory (Abstract only)." Department of Energy computer security group training conference ($17^{th}$). Milwaukee, Wisconsin.

Casella. K. A. Sep 17–22, 1995. "Security administration in an open networking environment (Abstract only)." Proceedings of the Ninth Systems Adminstration Conference, Monterey, California.

Doty, T. Fall 1995. "Test Driving Satan (Abstract only)." Computer Security Journal, vol. 11, No. 2.

Karygiannis, T. Mar. 23–25, 1998. "Network security testing using mobile agents (Abstract only)." Proceedings of the Third International Conference on the Practical Application of Intelligent Agents and a Multi–Agent Technology, London, United Kingdom.

Gimble, T. F., M. F. Ugone, C. A. Miggisn, D. L. Dixon, and K. Fitzpatrick. Jun. 3, 1998. "Information Assurance for the Defense Civilian Personnel Data System—Washington, Headquartes Services (Abstract only)." Audit Report, Department of Defense, Office of the Inspector General. Washington, DC.

Swiler, L. P. and C. Phillips. Jun. 30, 1998. "Graph–based system for network–vulnerability analysis (Abstract only)." USDOE Office of Financial Management and Controller. Washington DC.

Rudd, Alan, Joel McFarland, and Scott Olsen. Aug. 1998. "Managing security vulnerabilities in a networked world ((Abstract only)." Journal of Digital Imaging, vol. 11, No. 3, Suppl. 1.

Mar. 1999. "DoD Information Technology Security Certificate and Accreditation Process (DITSCAP) (on CD–ROM) (Abstract only)." Defense Information Systems Agency. Arlington, Virginia.

Levine, Diane E. May 24, 1999. "CyberCop Patrols on Linux: Network Associates Scanner Detects Security, System Vulnerabilities." *InformationWeek*, 2 pages.

Jun. 1999. "Intrusion detection [market survey](Abstract only)." *Secure Computing (International Edition)*, United Kingdom.

Rogers, Amy. Jul. 9, 1999. "Testing For Network Vulnerabilities: VARs Can Build Lucrative Practices Around Emerging Products." *ChannelWEB,* 2 pages.

Mixer, R. A. Jul. 26, 1999. "Common Database Format for Network Security Data (Master's Thesis) (Abstract only)." Air Force Institute of Technology, Wright Patterson AFB, Ohio.

Apr. 2000. "Secure Strategies: A Year Long Series On The Fundamentals of Information Systems, Security." www.infosecuritymag.com/articles/april00/features4.shtml., 6 pages.

Mayer, A., A. Wool, and E. Ziskind. May 14–17, 2000. "Fang: A firewall analysis engine (Abstract only)." Proceedings 2000 IEEE Symposium on Security and Privacy, Berkeley, California.

Korzeniowski, Paul. Aug. 2000. "Audit and Assessment: Ironclad Security." www.infosecuritymag.com/articles.aug00/column6.shtml., 5 pages.

Nov. 8, 2000. "BMC Software Automates Security Management for E-businesses; Provides Customers with Automated Access Management and E-business Information Security (Abstract). " *Business Wire,* p. 084. Houston, Texas.

Mendelson, Edward. Dec. 5, 2000. "The Danger Within." *PC Magazine.*

Dec. 18, 2000. "TruSecure Adopts Sanctum Inc.'s Web Application Security Audit Solution; Sanctum's Powerful Web Application Security Audit Software Complements TruSecure's Security Program (Abstract only)." *Business Wire,* p. 0121. Santa Clara, California.

Shipley, G. Jan. 8, 2001. "Vulnerability assessment scanners (Abstract only)." *Network Computing,* vol. 12, No. 1.

May 3, 2001. "Mixing Solutions to Garner Full Assessments: Vulnerability Assessment Tools." *Channel Web,* 2 pages.

Mohamed Baith. Jun. 19–22, 2001. "An effective modified security auditing tool (SAT) (Abstract only)." Proceedings of the 23rd International Conference on Information Technolgy Interfaces, part vol. 1, Pula, Croatia.

Gilliam, D. P., J. C. Kelly, J. D. Powell, and M. Bishop. Jun. 20–22, 2001. "Development of a software security assessment instrument to reduce software security risk (Abstract only)." Proceedings Tenth IEEE International Workshop on Enabling technolgies: Infrastructure for Collaborative Enterprises, Cambridge, Massachusetts.

Langa, Fred. Jun. 11, 2001. "Good and Bad Online Security Check–Ups." *InformationWeek.com,* 4 pages.

Chi, Sung–Do, Jong Sou Park, Ki–Chan Jung, and Jang–Se Lee. Jul. 2001. "Network security modeling and cyber attack simulation methodology (Abstract only)." Information Security and Privacy. $6^{th}$ Australasian Conference, ACISP 2001 Proceedings, Sidney, NSW, Australia.

Jul. 12, 2001. "Xacta Web C & A™ User Notification Setup For Work Product Manager User Guide." Xacta Corporation.

XACTA™ Corporation. Aug. 2001. *Xacta Web C&A™ 2001 User Guide: DITSCAP/NIACAP.* Ashburn, VA; Xacta Corporation.

Aug. 22, 2001. "Xacta Detect Installation Guide." Xacta Corporation

Aug. 29, 2001. "Xacta Web C & A™ 2001 System Administrator Guide." Xacta Corporation.

Aug. 29, 2001. "Xacta Web C & A™ 2001 Installation Guide." Xacta Corporation.

Hulme, George V. Sep. 21, 2001. "Sanctum Adds Audit–Automation Tools to Security Software: Sanctum Introduces Enhanced Version of AppScan Software, Which Automates the Auditing of Web Applications for Holes that Hackers Could Use to Break Into Systems." *InformationWeek.com,* 1 page.

Wang, Rong, Feiyi Wang, and G. T. Byrd. Oct. 15–17, 2001. "Design and implementation of acceptance monitor for building scalable intrusion tolerant system (Abstract only)." Proceedings Tenth Annual International Conference on Computer Communictions and Networks, Scottsdale, Arizona.

Fisher, Dennis. Oct. 29, 2001. "HP Expands Security Practice." EWEEK., 1 page.

Sidel, Scott and Andy Briney. Feb. 2002. "Patching Across the Enterprise" www.infosecuritymag.com/2002/feb/features_sidebar1.shtml., 3 pages.

Hulme, George V. Mar. 14, 2002. "Hercules' Strength is Security Automation: Citadel–3 s New Tool Gathers Info from Software–Vulnerability Scanners and Downloads Available Patches." *InformationWeek.com.,* 1 page.

Hulme, George V. Mar. 18, 2002. "Herculean Help For Patching: Tool Collates Vulnerabilities and Aids with Patch Deployment." *InformationWeek.com.,* 2 pages.

Sturdevant, Cameron. Apr. 8, 2002. "Top Layer Testing." *EWEEK.,* 1 page.

Machrone, Bill. Apr. 22, 2002. "Syscheck: System Tests and Port Scanners." *ExtremeTech.,* 3 pages.

Machrone, Bill. Apr. 22, 2002. "Syscheck: Network Tests." *ExtremeTech.,* 3 pages.

Fisher, Dennis. May 20, 2002. "Enforce Keeps Far–flung Systems in Check." *EWEEK.,* 1 page.

Dyck, Timothy. May 20, 2002. "App Scanning Helps Secure Weak Spots." *EWEEK.,* 3 pages.

Rapoza, Jim. May 20, 2002. "Foundscan Roots Out Problems." *EWEEK.,* 2 pages.

Musich, Paula. May 28, 2002. "Loudcloud Automates Patch Management." *EWEEK.,* 1 page.

Karagiannis, Konstantinos. Jun. 20, 2002. "Finding and Fixing Network Vulnerabilities." *PC Magazine,* 2 pages.

Jul. 29, 2002. "Best Practices and Beyond. (Industry Speaks)." *Government Computer News,* vol. 21, No. 21, p. S14(6), 11 page.

James, Robert. Sep. 2002. "Hercules: Citadel provides some muscle to vulnerability scanners." www.infosecuritymag.com/2002/sep/testcenter.shtml., 4 pages.

Briney, Andrew. Oct 2002. "Automating Policies: New Software Tools Relieve the Headache of Policy Management." www.infosecuritymag.com/2002/oct/policytools.shtml., 3 pages.

Wood, Lamont. Oct. 24, 2002. "Smart Security: Netwoork Scanners." *Tech Update.,* 3 pages.

Greenemeier, Larry. Nov. 4, 2002. "Certified Secure." *InformationWeek.com.,* 1 page.

Hulme, George V. Nov. 11, 2002. "Discover Security Threats Faster: E–Security's New Tool Helps Companies Quickly Identify Problems Before an Attack Occurs." *InformationWeek.com.,* 1 page.

Nov. 11, 2002. "Microsoft Gets Security Approval." *Federal Computer Week.,* 1 page.

2002. "Active Sentry™ 3.0 (Security You Can See)." *Intranode Software Technologies,* pp. 1–19.

2002. "Managed Vulnerability Assessment: A Proactive Approach to Network Security." www.qualys.com., pp. 1–20. (No month).

2002. "SecureScan SP." www.vigilante.com., 4 pages (No month).

2002. "Xacta Web C & A™ User Guide Version 3.3." Xacta Corporation.

Linger, Richard C. Nov. 2000. "Systematic Generation of Stochastic Diversity as an Intrusion Barrier in Survivable Systems Software." Carnegie Mellon University, 10 pages, http://www.sei.cmu.edu/programs/nss/stochastic–divers.html.

The Software Engineering Institute (SEI). Nov. 2000. "Operationally Critical Threat, Asset, and Vulnerability Evaluation (Octave) Framework. Version 1.0." Carnegie Mellon university, 6 pages, http://www.sei.cmu.edu/publication/documents/99.reports/99tr017chap01.html.

The Software Engineering Institute (SEI). Nov. 2000. "Survivable Network Analysis." Carnegie Mellon University. http://www.sei.cmu.edu/organization/programs/nss/analysis–method.html, 3 pages.

XACTA™ Corporation. Sep. 2000. *Web C&A™*. Ashburn, VA; Xacta Corporation, pp. 1–87.

Winkler, Ira, Al Berg, George Kurtz, Chris Prosise, and Dan Swanson. Jul. 2000. "Audits, Assessments & Tests Oh My)." http://www.infosecuritymag.com/july2000/audits.html, 18 pages.

Dorobek, Christopher J. May 2000. "Project Matrix Indentifies How Systems Interact." *Government Computer News*. Post–Newsweek Tech Media Group, Inc. http://ww.gen.com/vol19_no11/news/1974–1.html, 3 pages.

Government Computer News. May 2000. "CIO Council Launches Security Best Practives Web Site." Post–Newsweek Tech Media Group, Inc. http://www.gcn.com/vol1_no1/daily–updates/2067–1.html, 2 pages.

Government Computer News. Aug. 1999. "Scanner Suite Increases its Risk Assessment Tool Features." Post–Newsweek Tech Media Group, Inc. http://wwwgcn.com/vol18_no28/com/495–1.html, 2 pages.

FDIC. Jul. 1999. "Risk Assessment Tools and Practices for Information System Security." http://www.fdic.gov/news/financial/1999/FIL9968a.html, 9 pages.

Fisher, David A., and Howard F. Lipson. Jan. 1999. "Emergent Algorithms: A New Method for Enhancing Survivability in Unbounded Systems." *Proceedings of the Hawaii International Conference On System Sciences*. Maui, Hawaii: IEEE. http://www.sei.cmu.edu/organization/programs/nss/emergent–algor.html, 14 pages.

Ellison, R. J., R. C. Linger, T. Longstaff, and N. R. Mead. Sep. 1998. *A Case Study in Survivable Network System Analysis*. Pittsburgh, PA: Carnegie Mellon Software Engineering Institute.

Linger, R. C., N. R. Mead, and H. F. Lipson. 1998. "Requirements Definition for Survivable Network Systems." *IEEE*. http://sei.cmu.edu/programs/nss/icre.html, pp. 1–15. (No month).

Ellison, Robert J., David A. Fisher, Richard C. Linger, Howard F. Lipson, Thomas A. Longstaff, and Nancy R. Mead. 1998. "Survivability: Protecting Your Critical Systems." *Proceedings of the International Conference on Requirements Engineering*. Colorado Springs, CO: IEEE. http://www.sei.cmu.edu/programs/nss/project–critical–systems.html, pp. 1–12.

Valletta, Anthony M. Dec. 1997. "DoD Information Technology Security Certification and Accreditation Process (CITSCAP). " *Department of Defense Instruction*. Doc. No. 5200.40.

Bassham, Lawrence E., and Timothy Polk. "Threat Assessment of Malicious Code and Human Computer Threats." Oct. 1992. National Institute of Standards and Technology. http://www.it.kth.se/~cwe/wastebin/threat–assess.html, pp. 1–11.

"System Accreditation." http://bsp.cio.gov/getfile.cfm?messageid=000, 5 pages, (No date).

Ellison, Robert J., Richard C. Linger, Thomas Longstaff, and Nancy R. Mead. "Survivable Network System Analysis: A Case Study." Carnegie Mellon University, 10 pages, (no date).

* cited by examiner

|   | THREAT CATEGORY | SUB-CATEGORY | SUB-SUB-CATEGORY |
|---|---|---|---|
| 1 | NATURAL DISASTER | FIRE | |
| 2 | | FLOOD | |
| 3 | | EARTHQUAKE | |
| 4 | | VOLCANO | |
| 5 | | TORNADO | |
| 6 | | LIGHTNING | |
| 7 | SYSTEM FAILURE | HARDWARE | |
| 8 | | POWER | |
| 9 | | COMMUNICATION LINK | |
| 10 | ENVIRONMENTAL FAILURE | TEMPERATURE | |
| 11 | | POWER | |
| 12 | | HUMIDITY | |
| 13 | | SAND/DUST | |
| 14 | | SHOCK/VIBRATION | |
| 15 | HUMAN UNINTENTIONAL | SOFTWARE DESIGN ERROR | |
| 16 | | SYSTEM DESIGN ERROR | |
| 17 | | OPERATOR ERROR | SYSTEM ADMINISTRATOR |
| 18 | | | REGULAR USER |
| 19 | | | MAINTENANCE PERSONNEL |
| 20 | HUMAN INTENTIONAL | AUTHORIZED PERSONNEL | SYSTEM ADMINISTRATORS |
| 21 | | | MAINTENANCE PERSONNEL |
| 22 | | | REGULAR USERS |
| 23 | | UNAUTHORIZED USERS | TERRORISTS |
| 24 | | | HACKERS |
| 25 | | | SABOTEURS |
| 26 | | | THIEVES |
| 27 | | | VANDALS |
| 28 | | PHYSICAL COMBAT | |
| 29 | | ELECTRONIC WARFARE | |

| IF A CHARACTER POSITION IN THE PROJECT THREAT PROFILE STRING IS: | AND THE CORRESPONDING CHARACTER POSITION IN THE THREAT CORRELATION STRING IS: | THEN THE CORRESPONDING CHARACTER POSITION IN THE RISK PROFILE STRING IS: |
|---|---|---|
| N | ANYTHING | N |
| L | N | L |
| L | L | L |
| L | M | L |
| L | H | M |
| M | N | N |
| M | L | L |
| M | M | M |
| M | H | M |
| H | N | N |
| H | L | M |
| H | M | H |
| H | H | H |

FIG. 24

SYSTEM, METHOD AND MEDIUM FOR CERTIFYING AND ACCREDITING REQUIREMENTS COMPLIANCE

RELATED APPLICATION

This application claims priority to application Ser. No. 60/223,982, filed Aug. 9, 2000, entitled "Web Certification and Accreditation System, Method and Medium", which is assigned to the assignee of this application. The disclosure of application Ser. No. 60/223,982 is incorporated herein by reference.

BACKGROUND OF THE INVENTION

1. Field of the Invention

The present invention relates generally to the field of certifications and accreditation (C&A) and, more particularly, to a computer-implemented system method and medium for certification and accreditation that assesses the risk of and/or determines the suitability of a target system to comply with at least one predefined standard, regulation and/or requirement.

2. Background Description

The general purpose of C&A is to certify that automated information systems adequately protect information in accordance with data sensitivity and/or classification levels. In accordance with Department of Defense (DoD) Instruction 5200.40, dated Dec. 30, 1997, entitled *DoD Information Technology Security Certification and Accreditation Process (DITSCAP)*, which is incorporated herein by reference in its entirety, certification can be defined as the comprehensive evaluation of the technical and non-technical features of an information technology (IT) system and other safeguards, made in support of the accreditation process, to establish the extent that a particular design and implementation meets a set of specified security requirements. Similarly, as used herein, accreditation can be defined as a formal declaration by a designated approving authority that an IT system is approved to operate in a particular security mode using a prescribed set of safeguards at an acceptable level of risk. In general DISTSCAP is utilized by the DoD for identifying and documenting threats and vulnerabilities that pose risk to critical information systems. DITSCAP compliance generally means that security risk posture is considered acceptable and that potential liability for system "owners" is mitigated.

The C&A process typically involves a number of policies, regulations, guidelines, best practices, etc. that serve as C&A criteria. Conventionally, the C&A process is typically a labor intensive exercise that can require multiple skill sets over a period of time typically spanning 6–12 months. There can be, for example, several organizations and/or individuals that may be involved in the processes of selecting applicable standards, regulations and/or test procedures, and assembling test results and other information into a DITSCAP compliant package. There is therefore a need to substantially streamline and expedite the security C&A process in a computer based application that substantially automates the process of performing security risk assessments, certification test procedure development, system configuration guidance, and residual risk acceptance.

SUMMARY OF THE INVENTION

To address the deficiencies of prior schemes as indicated above, the present invention provides a system, method and medium that substantially automates the security C&A process in a manner that enhances and facilitates security risk assessments, certification test procedure development, system configuration guidance, and/or residual risk acceptance.

In an exemplary embodiment, the C&A process is automated in accordance with DoD's DITSCAP requirements. The present invention is not, however, limited to a DoD environment, and may also be used in non-DoD government as well as civilian/private sector organizations requiring risk management and guidance. For example, the system and method according to the present invention can also be used to automate the National Information Assurance Certification and Accreditation Process (NIACAP).

An exemplary embodiment according to the present invention contemplates a browser based solution that automates the DITSCAP process. The browser is preferably directed to five primary elements: 1) gathering information, 2) analyzing requirements, 3) testing requirements, 4) performing risk assessment, and 5) generating certification documentation based on an assessment of the first four elements.

The information gathered primarily relates to a description of the system to be certified, and its respective components and operating environment (e.g., workstation manufacturer and model, operating system and version, secret, or top secret operating environment, etc.). The requirements analysis generally involves selecting by the user a list of standards and/or regulations that the system must or should comply with. The user may optionally input his own standards/regulations and/or additional requirements. Once information is gathered and the requirements analysis is provided, the system intelligently selects a set of test procedures against which the system is tested. Upon completion of testing, the risk assessment provides as output an estimate of the risk level for each individual test failed. Each of the failed tests are also collectively considered and used to evaluate the risk level of the target system as a whole. Then, documentation can be printed that includes information pertaining to the first four elements that would enable an accreditation decision to be made based on the inputs and outputs respectively provided and generated in the first four elements.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways.

BRIEF DESCRIPTION OF THE DRAWINGS

The Detailed Description including the description of a preferred structure as embodying features of the invention will be best understood when read in reference to the accompanying figures wherein:

FIG. 6 is an exemplary project definition screen shot showing user selection of a military branch;

FIG. 7 is an exemplary project definition screen shot showing user selection of an information category;

FIGS. 20A and 20B are exemplary screen shots that enable a user to enter test results;

FIG. 22 is a table showing three different levels of illustrative threat categories;

FIG. 23 is an exemplary screen shot showing a portion of the illustrative threat categories of FIG. 22;

FIG. 24 is an exemplary scheme by which the risk of an individual test failure is assessed in accordance with at least some embodiments contemplated by the present invention;

DETAILED DESCRIPTION

Figure 1:
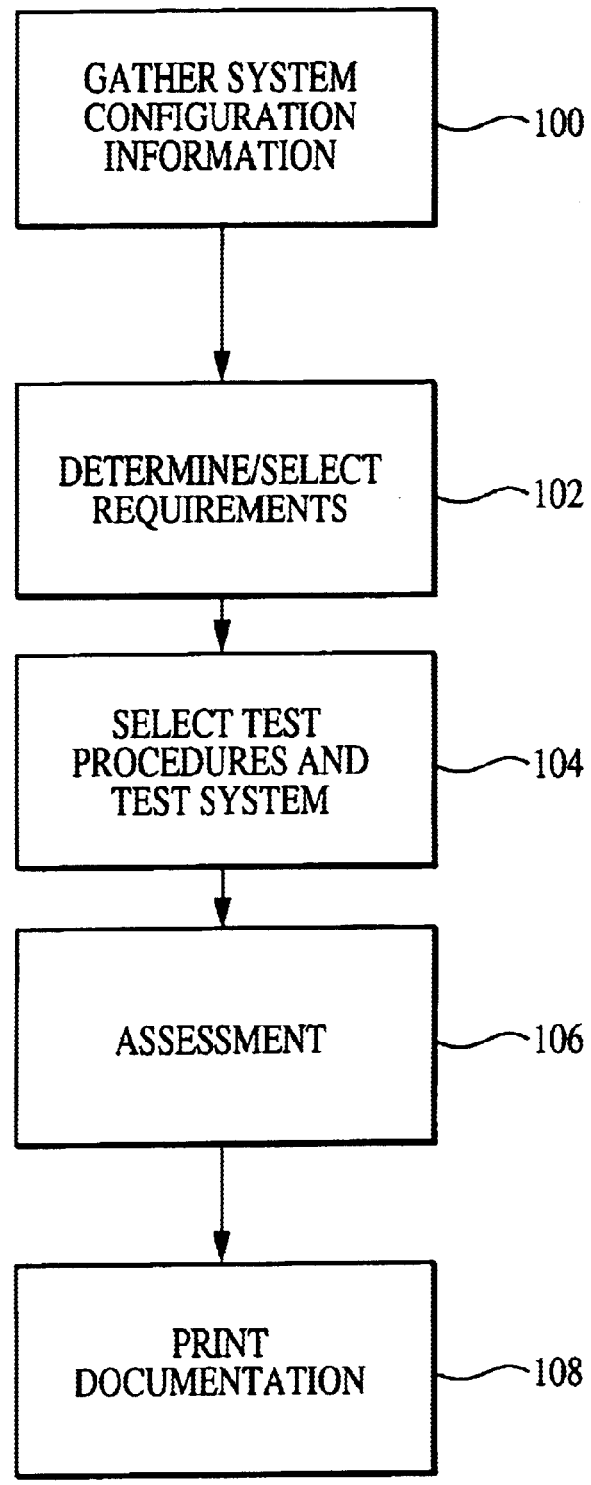
FIG. 1 is an exemplary high level flowchart of a method contemplated by at least some embodiments of the present invention.

Referring now to the drawings, and more particularly to FIG. 1, a high level flow diagram is shown that provides an overview of the method according to the present invention. In the first step, information is gathered pertaining to the system or network undergoing C&A. This is indicated by a block 100. The information gathered typically relates to a description of the system to be certified, and its respective components and operating environment (e.g., workstation manufacturer and model, operating system and version, secret, or top secret operating environment, etc.).

As indicated above, aspects of at least some embodiments of the present invention are described in accordance with DoD's DITSCAP requirements. However, it should be understood that such description is only by way of example, and that the present invention contemplates use with regard to any number of types of requirements or environments. In addition, within its use with regard to DITSCAP requirements, it should be understood that many of the various aspects and selection options are also exemplary, as is the fact that information is shown as being entered via a web browser.

The requirements analysis generally involves selecting (by a human and/or some automated procedure) a list of standards and/or regulations that the system must, or should, comply with. This is indicated by a block 102. Optionally, selection of additional standards/regulations and/or requirements by a user is also contemplated. At least some embodiments of the present invention then contemplate automatically displaying/listing each requirement that comprises the current security requirements traceability matrix (SRTM), which is derived from the selected set of standards and/or regulations that the system must comply with. Additionally, the user will be able to customize the current SRTM by either adding, editing and/or deleting requirements. As known to those skilled in the art, a SRTM can be a table used to trace project lifecycle activities (e.g., testing requirements) and/or work products to the project requirements. The SRTM can be used to establish a thread that traces, for example, testing and/or compliance requirements from identification through implementation. A SRTM can thus be used to ensure that project objectives and/or requirements are satisfied and/or completed.

Once information is gathered 100 and the requirements analysis 102 is provided, the system intelligently selects a set of test procedures against which the system is tested, as indicated by a block 104. The test procedures are selected in a manner so that successful completion of the test procedures will render the system undergoing C&A to satisfy the SRTM requirements.

Figure 2:
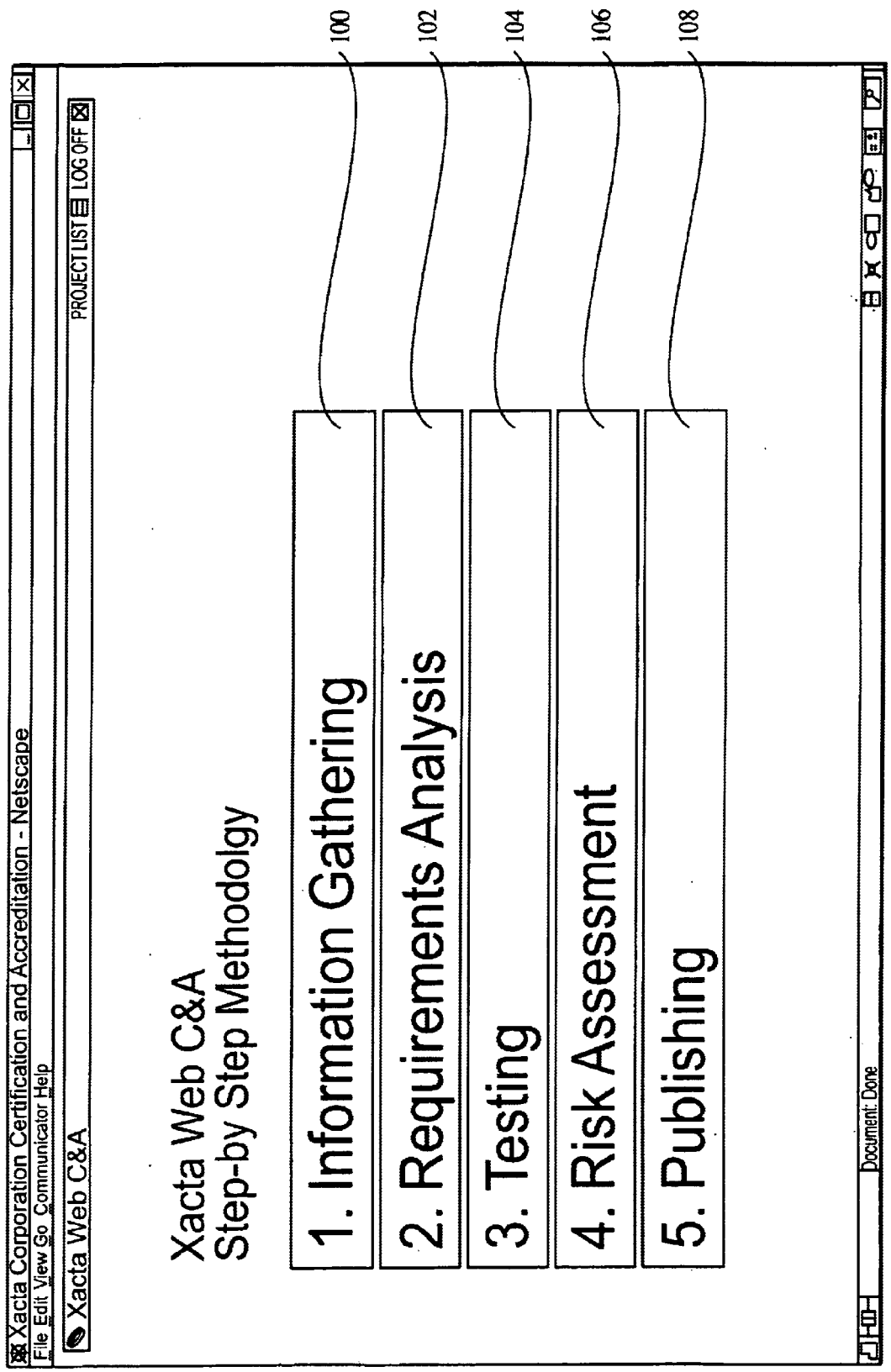
FIG. 2 is an exemplary introductory screen shot corresponding to the flow chart provided in FIG. 1.

Upon completion of testing 104, the risk assessment step (as indicated by a block 106) then involves assessing for each test failure (should any exist) the vulnerability of the system, as well as the level of the threat as determined by the information gathered. The risk assessment 106 provides as output an estimate of the risk level for each individual test failed. Each of the failed tests are also collectively considered and used to evaluate the risk level of the system as a whole. Then, documentation can be optionally printed 108 that includes information pertaining to the first four elements that would enable an accreditation decision to be made based on the inputs and outputs respectively provided and generated in the first four blocks (i.e., 100, 102, 104, 106). Each block shown in FIG. 1 (i.e., 100, 102, 104, 106 and 108) will be discussed in further detail herein. FIG. 2 is an exemplary screen shot corresponding to the blocks (100, 102, 104, 106, 108) provided in FIG. 1. Further information pertaining to the system and method according to the present invention can be found in the following document: *WEB C&A™*, Version 1.0, 20 Sep. 2000, available from Xacta Corporation, Ashburn, Va. A copy of this document is incorporated herein by reference in its entirety.

Figure 3:
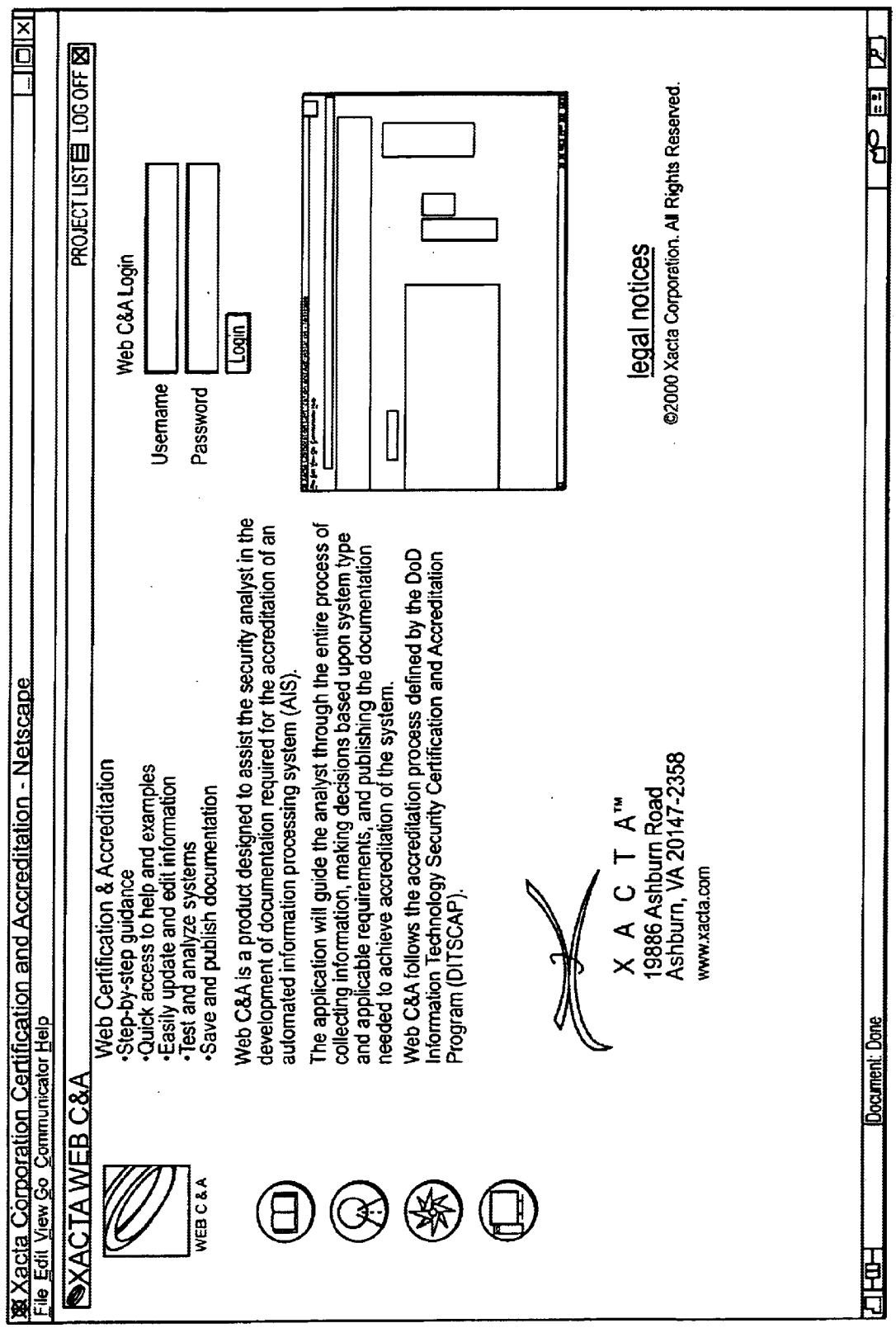
FIG. 3 is an exemplary user login screen shot.

FIG. 3 shows an exemplary access control screen shot (e.g., for access to some or all aspects of the present invention as indicated above). Each user can optionally be required to input a valid user name and password, which provides them with access to only the information for which they are responsible. The system can also optionally exclude the password and access feature, providing users access to a set of predetermined and/or default information.

Information Gathering

Figure 4:
FIG. 4 is an exemplary project definition screen shot.

FIGS. 4–10 show selected exemplary screen shots of the information gathering 100 process. Specifically, FIG. 4 shows project definition information, which is assumed to have been selected by tab 402. Fields such as project name 430, project version 432, project acronym 434, project description 436, department 438, and service 440 can be provided as being part of the project definition. The project name 430 field is preferably a read-only field, provided for information only. The project version field 432 enables the numeric version of the system undergoing C&A to be entered, if applicable. The project acronym field 434 is optionally used to provide an acronym for the project. The project description field 436 can be used to provide a detailed description of the project (e.g., mission statement, function, features, and/or capabilities of the system being accredited). The department field 438 can be used to identify the Government (or civilian) department under which this system is being accredited. As shown, the current choice is DoD. The service field 440 is used to identify the Service/Agency under which this system is being accredited. As shown, the current choices are Army, Navy, Marine Corps, Air Force, OSD, and Other. Each of the above-identified fields can be tailored to suit a particular need and/or application.

Figure 5:
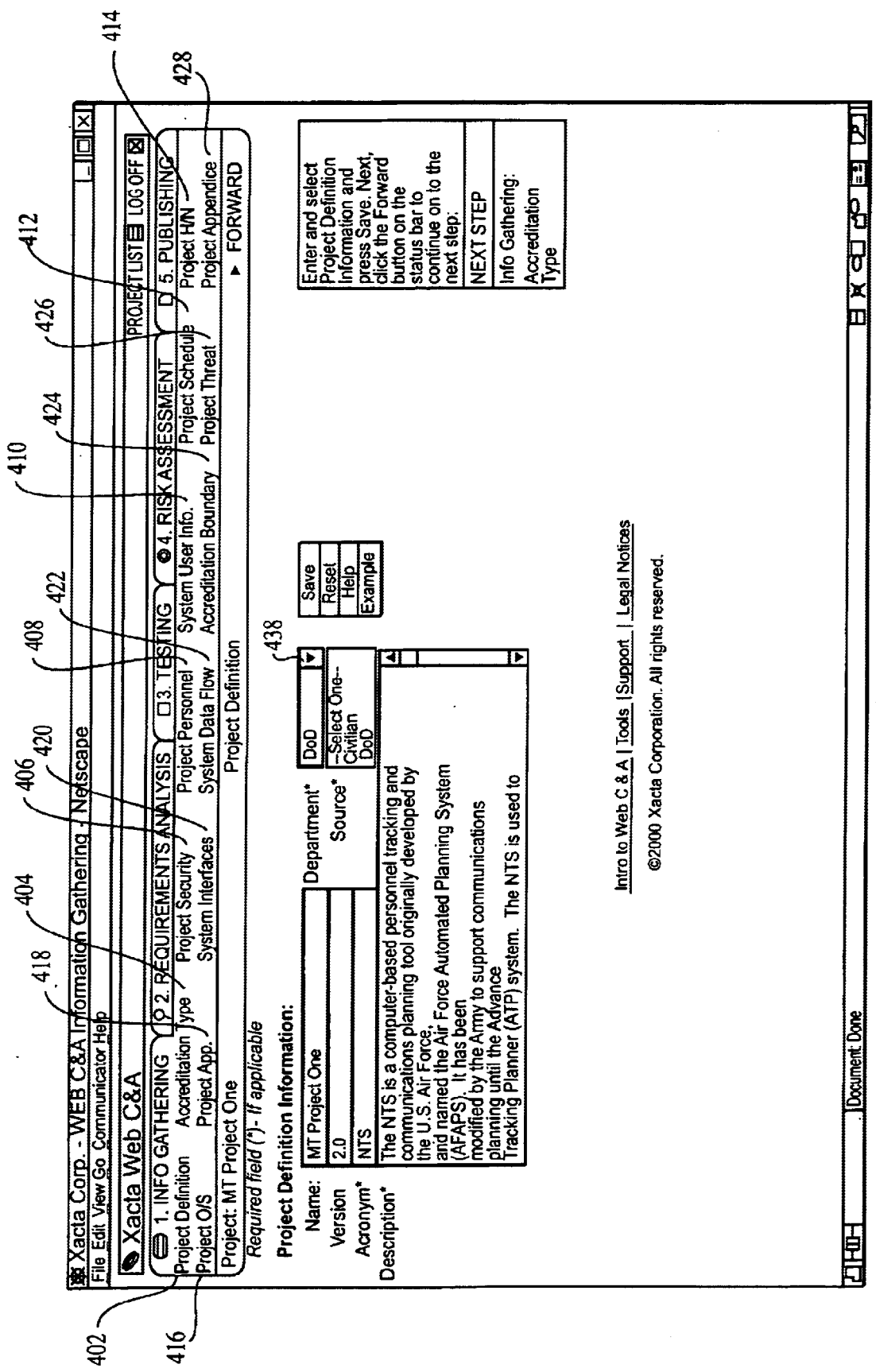
FIG. 5 is an exemplary project definition screen shot showing user selection of either civilian or Department of Defense applicability.
Figure 6:
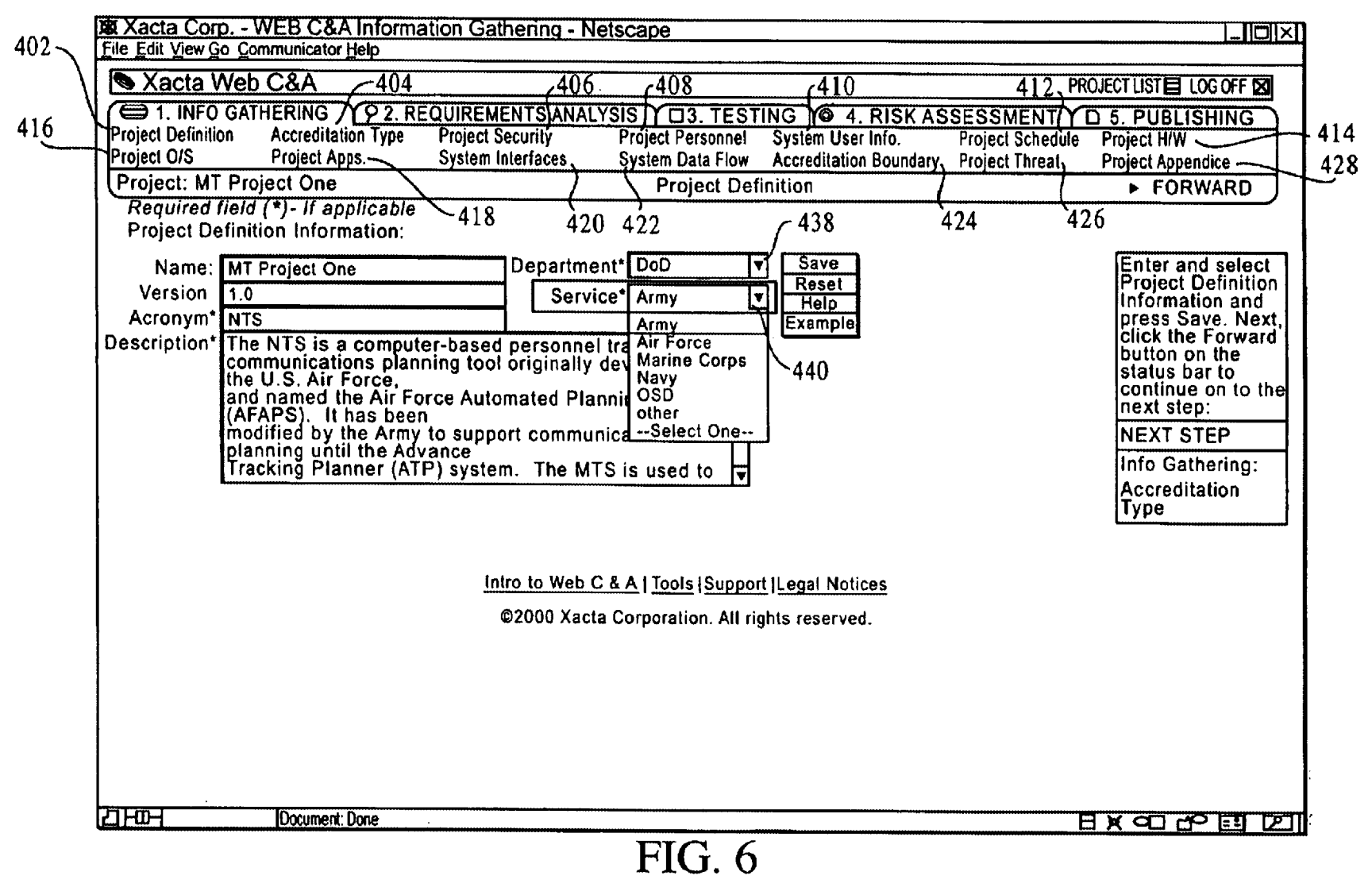

FIG. 5 shows how a user can select, via a conventional pulldown menu, either civilian or DoD service from field 438. FIG. 6 shows how a user can select, via a conventional pulldown menu, a military service branch (e.g., Army, Air Force, Marine Corps, OSD, or other) in field 440 when DoD is selected in field 438.

As shown in FIGS. 4–10, tab 404 pertains to the accreditation type. When a user clicks on the accreditation type tab 404, a menu appears that allows the user to select among one or more top-level security and accreditation parameters that are used throughout the project, such as the project name 430, project version 432, project acronym 434, project description 436, department 438, and service 440 fields discussed above.

Figure 7:
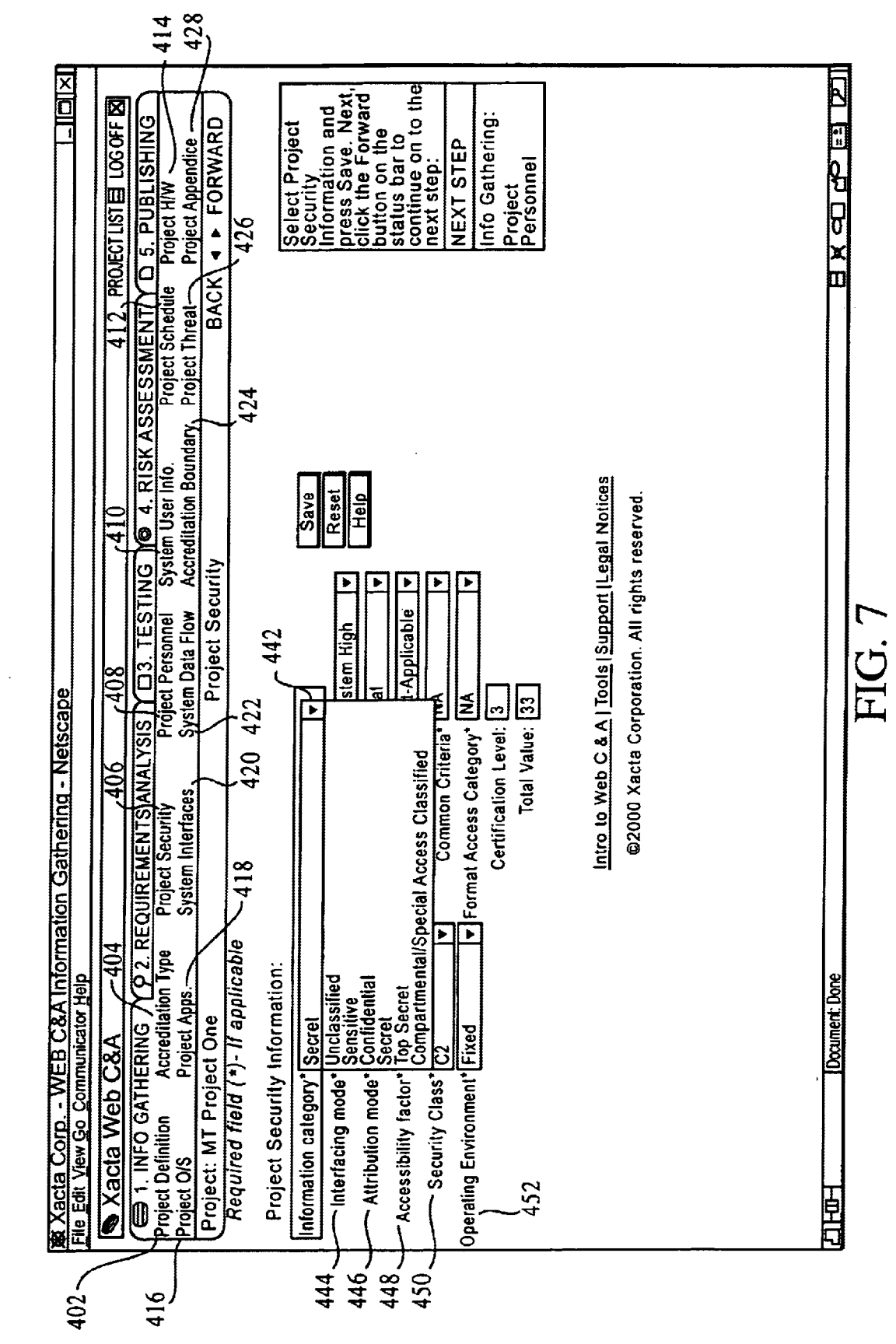

When tab 406 is activated, a project security information screen, such as shown in FIG. 7, preferably appears. In a preferred embodiment, FIG. 7 allows a user to input the Information Technology Security (ITSEC) parameters of the system being accredited. Such parameters can pertain to, for example, interfacing mode, processing mode, attribution mode, mission-reliance factor, accessibility factor, accuracy factor, information categories, system class level, and certification analysis level, as explained in DoD Instruction 5200.40.

When the user selects information category tab 442, a pull down menu listing the security levels (e.g., secret, unclassified, sensitive, etc.) appears. FIG. 7 also provides pull down menus for interfacing mode 444, attribution mode 446, accessibility factor 448, security class 450, and operating environment 452. The interfacing mode 444, for example, can categorize interaction between systems, and may be through either physical or logical relationships. Exemplary available choices include benign, passive, and active. The attribution mode 446, for example, distinguishes the degree or complexity of accountability (auditing) required to identify, verify, and trace system entities as well as changes in their status. The exemplary available choices include none, rudimentary, selected, and comprehensive. The accessibility factor 448 relates the degree to and/or relative time at which the operation, data, infrastructure, or system needs to be available from a security perspective. Exemplary available choices are reasonable, soon, as soon as possible, and immediate. Availability concerns are those that relate to security risks (non-tolerable operational impacts) and does not include those that are only performance concerns. The Security Class 450 (which can be, e.g., in accordance with the Trusted Computing Security Evaluation Criteria (TCSEC), as defined in the *DoD Trusted Computer System Evaluation Criteria*, DoD 5200.28-STD, dated 26 Dec. 1985, available from Assistant Security Of Defense Command, Control, Communications And Intelligence, Washington, D.C., and which is incorporated herein by reference in its entirety, is used to select the appropriate security requirements from the TCSEC. TCSEC security requirements comprise: C1 (Discretionary Security Protection), C2 (Controlled Access Protection), B1 (Labeled Security Protection), B2 (Structured Protection, B3 (Security Domains), and A1 (Verified Protection). The operating environment 452 is utilized to specify the type of environment where the system is used (e.g., mobile or fixed).

Figure 8:
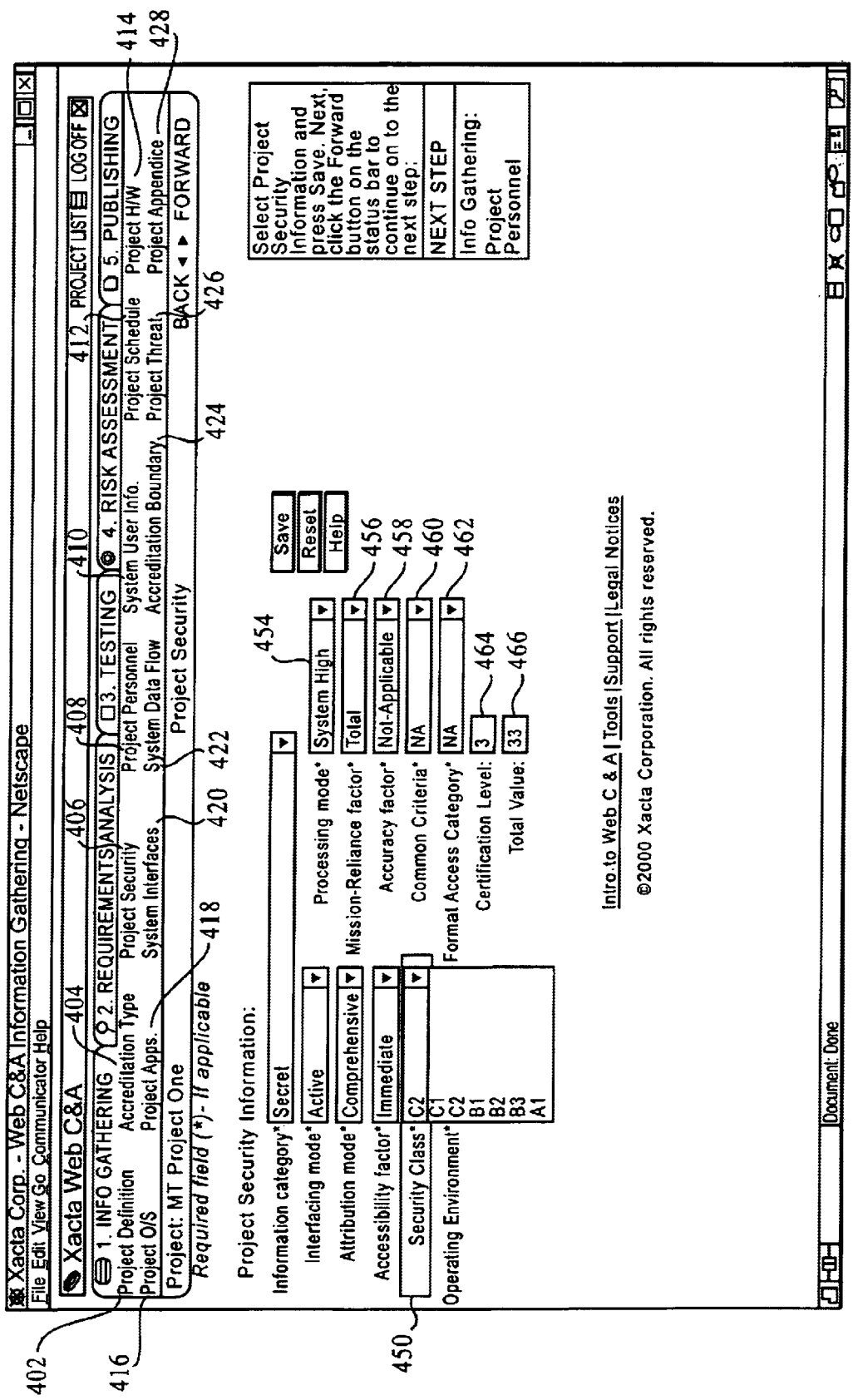
FIG. 8 is an exemplary project definition screen shot showing user selection of a security class.

Also in accordance with DITSCAP requirements, FIG. 8 shows pulldown menus for processing mode 454, mission reliance factor 456, accuracy factor 458, common criteria 460, formal access category 462, certification level 464, and total value 466. The processing mode 454 distinguishes the way processing, transmission, storage, or data is handled. Each of the modes exhibits unique security qualities. The exemplary available choices are dedicated, system high, compartmentalized, and multilevel. The Mission-Reliance Factor 456 relates the degree to which the success of the mission relies on the operation, data, infrastructure, or system. The criticality of the mission in a broader context is independent of that factor and can be used separately. The exemplary available choices are preferably none, cursory, partial, and total. The accuracy factor 458 relates the degree to which the integrity of operation, data, infrastructure, or system is needed from a security perspective. Integrity concerns are those that relate to security risks (non-tolerable operational impacts) and does not include those that are only performance concerns. The exemplary choices are: not applicable, approximate, and exact. Common Criteria 460 is the common criteria application profile for the system being accredited. For example, the Common Access Protection Profile (CAPP) is selected for most systems operating in the dedicated or systems high mode. The Labeled Security Protection Profile (LSPP) is an exemplary choice for most compartment-mode or multi-level security systems.

Formal access category 462 is a designator indicating the level of formal approval for accessing the system and is related to the clearance levels of users and the maximum data classification processed by the system. Formal access category 462 is in at least some embodiments contemplated by the present invention, to be only applicable for a system operating in the compartmented mode or multi-level security mode. There are different definitions for each mode. In a compartmented mode system, exemplary available options are: 1) No user lacks formal access for more than one category being processed; and 2) At least one user does not have formal access approval for more than one category being processed. In a Multi-level Security system, the options can be: 1) All users have formal access approval for all categories of data processed by the system; 2) No user lacks formal access approval for more than one category being processed; and 3) At least one user lacks formal access approval for more than one category being processed.

Certification Level 464 can be a read-only display of the calculated Certification Analysis Level. Finally, Total Value 466 can be a read-only display of the total weighted values of the ITSEC parameters. These can be used to determine the Certification Analysis Level.

Figure 9:
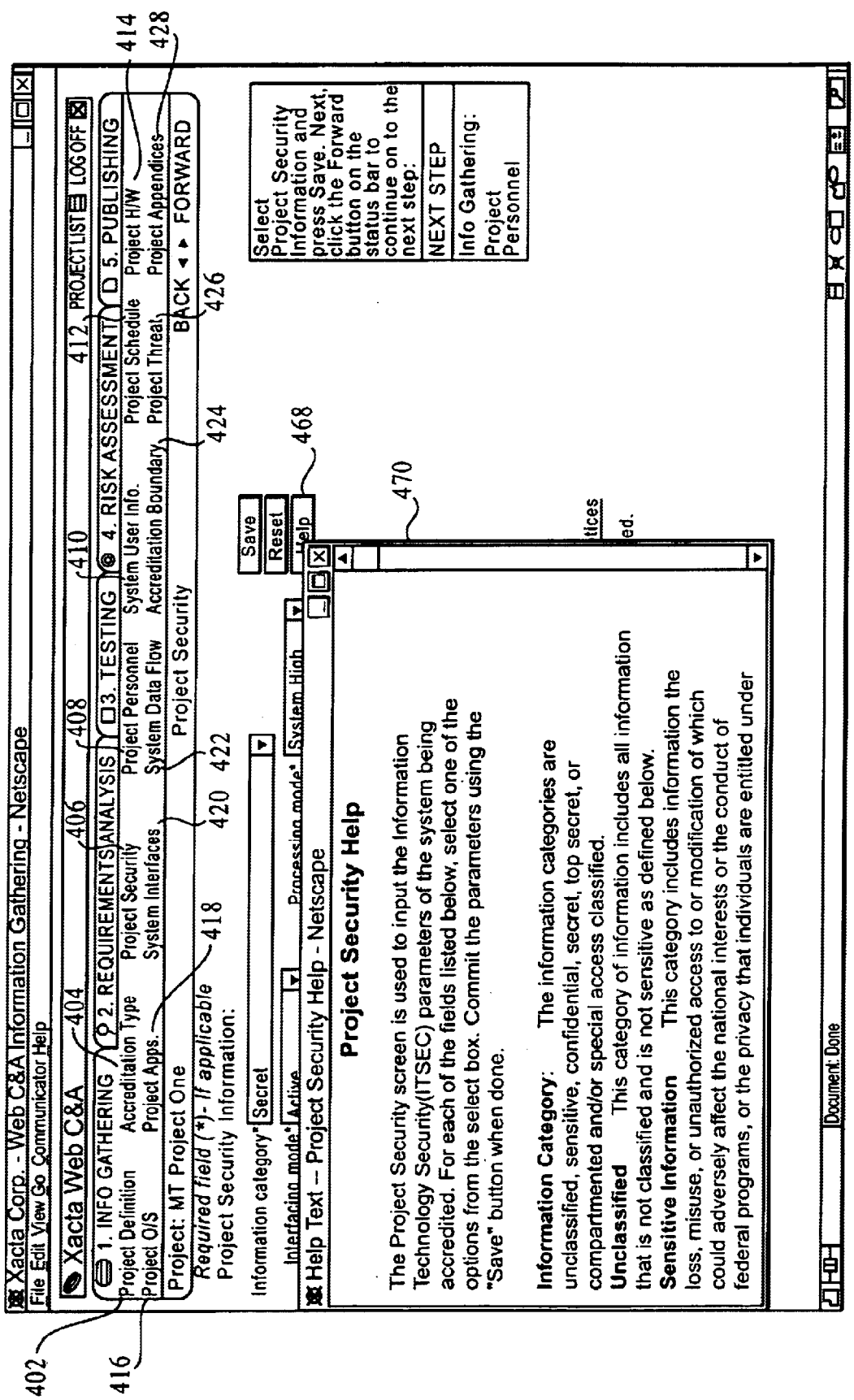
FIG. 9 is an exemplary context help screen shot.

As shown in FIG. 9, by clicking the help tab 468, a context sensitive help text 470 is provided. The help tab 468 can be invoked when, for example, the user is not certain which options to choose in any of the pulldown menus or has a question during any process. Help tab 468 can be optionally on any displays where it is believed that context sensitive help may be needed to assist user understanding.

When project personnel tab 408 shown in FIG. 4 is activated, a menu (not shown) can be provided that enables a user to enter information identifying all the project personnel associated with the accreditation effort. The personnel are preferably identified by the role, as discussed below, that they serve in the accreditation process. At least one entry for each role is preferably defined for the project.

For example, the following fields can be provided in a menu (not shown) subsequent to clicking the personnel tab 408:

Role Name—The role associated with the accreditation team member. The available choices can be:
  Accreditation Team Lead—The person in charge of the accreditation effort, usually the Project Manager.
  Accreditation Team Member—All the members of the accreditation team (analysts, testers, etc.).
  Certification Authority (CA)—Person in charge of the system certification.
  Certification Authority POC—Point of Contact (POC) to the CA.
  DAA—Designated Approving Authority. Person ultimately responsible for the accreditation of the system.
  DAA POC—Point of Contact (POC) to the DAA.
  ISSO—Information System Security Officer. Person responsible for the security implementation of the system being accredited.
Organization Responsible—Organization responsible for the design and development of the system being accredited.
Organization Responsible POC—Point of Contact to the Organization responsible.
Program Manager—Program manager of the system being accredited.
User Representative—Representative from the user community.
Title—The title associated with the accreditation team member (Mr., Ms. or Dr., etc.)
First Name—The first, middle initial, and last name of the accreditation team member.
Office—The office (e.g., Office of the Assistant Deputy for Policy and Planning) of the accreditation team member.
Office Designation—The office designation of the accreditation team member. For example, if the office is the Office of the Assistant Deputy for Policy and Planning, then the office designation may be ADS-P.
Organization—An organization that is associated with the accreditation team member.
Work Address—A work address if applicable for the accreditation team member (include city, state and zip code).
Work Phone—A work phone number for the accreditation team member.
Work Fax—A work fax number if applicable for the accreditation team member.
Email Address—An email address if applicable for the accreditation team member.

When the project schedule tab 412 of FIG. 4 is activated, a screen can appear (not shown) that provides the capability to describe and store each project milestones for the system being accredited. Fields such as milestone title, milestone date, and milestone description can be provided.

Figure 10:
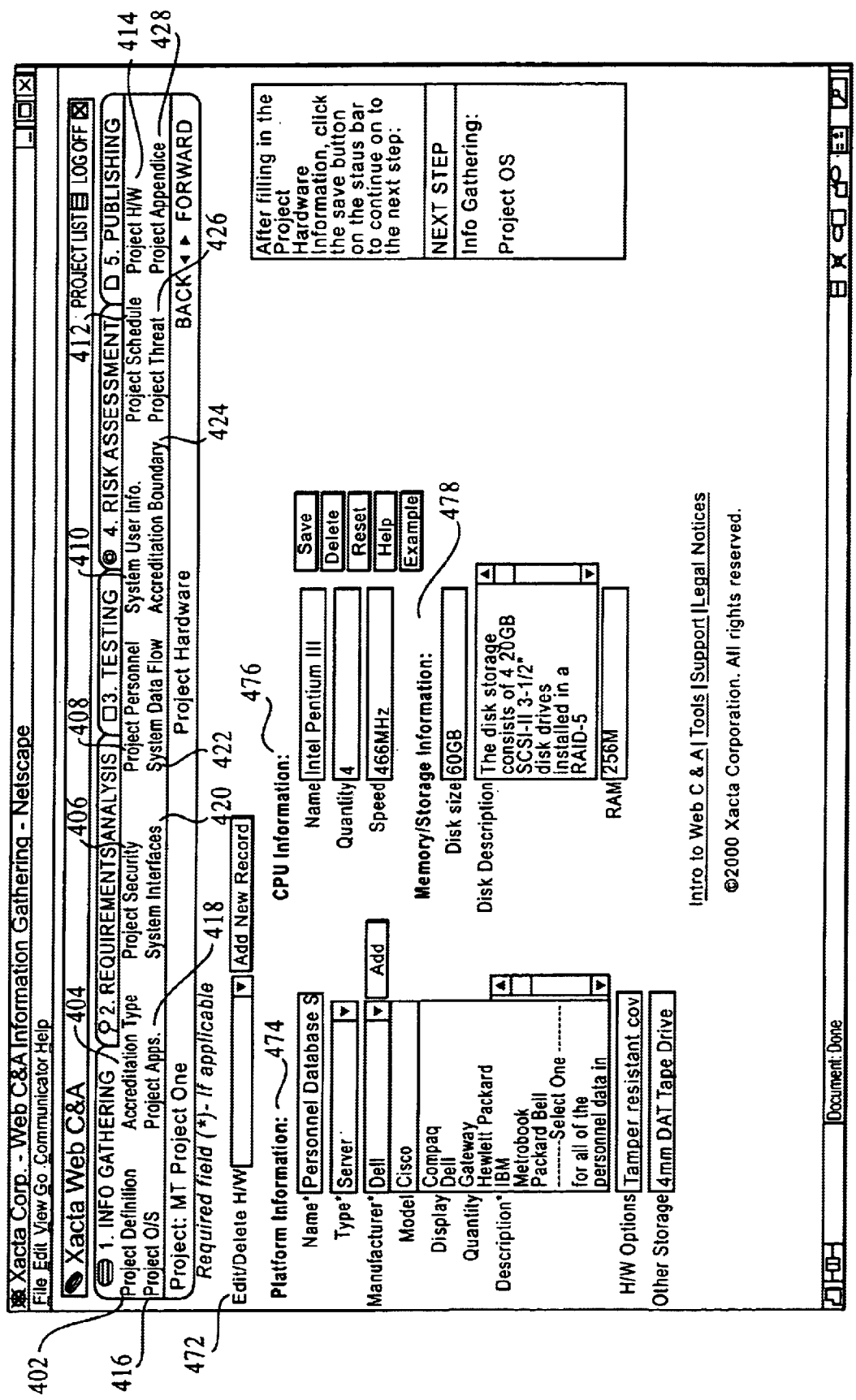
FIG. 10 is an exemplary project hardware screen shot.

When project hardware tab 414 is activated, a menu as shown in FIG. 10 can be provided. The menu allows a user to, for example, Edit/Delete H/W 472, enter various Platform Information 474, CPU information 476, and/or Memory/Storage Information 478. This information can be modified to reflect changes in system configurations throughout the information gathering requirements analysis and testing phases.

When project operating system 416 is activated, a menu (not shown) that enables a user to describe and store operating systems associated with the system hardware is provided. The ability to enter information pertaining to multiple operating systems (OS) on each hardware platform can be provided. Fields are provided to enable a user to enter information pertaining to the OS Name (e.g., Windows NT, AIX, HP UX, etc.), OS Type (e.g., NT, UNIX, etc.), OS Manufacturer (e.g., Microsoft, Hewlett Packard, IBM, etc.), OS Version (the numeric value of the operating system version), OS Options (a list of all OS options (if any) obtained for this platform), OS Patches (a list of OS patches (if any) that have been installed on the platform), OS Description (a detailed description of the operating system, possibly including the basic features, and any functions unique to the system being accredited).

When project application tab 418 is activated, a project application screen appears (not shown) that can provide the analyst with the ability to describe and store applications associated with the system hardware/OS combinations. The following exemplary fields can be provided: Application Name (the name of the application), Application Type (the type of application on the system being accredited—e.g., database, office automation, e-mail server, etc.), Application Manufacturer (the name of the application manufacturer), Application Version (the numeric version of the application), Application Options (a list of the options associated with the application (if any)), Application Patches (a list of the patches associated with the application), and Application Description (a detailed description of the application).

When system interfaces tab 420 is activated, a menu (not shown) is provided that provides the user the ability to describe and store the flow of information into and out of the accredited system. The system interfaces entries can describe each of the internal and external interfaces identified for the system. The following exemplary fields can be provided: Interface Name (an internal or external name associated with the system interface), and Interface Description (a detailed description of the internal or external system interface, which preferably includes a statement of the significant features of the interface as it applies to the entire system, as well as a high level diagram of the communications links and encryption techniques connecting the components of the information system, associated data communications, and networks).

When system data flow tab 422 is activated, a menu (not shown) is provided that can provide the user the ability to describe and store the flow of information within the accredited system. System data flow entries can describe the flow of information to each of the external interfaces identified for the system. The following exemplary fields can be provided: Data Flow Short Name (a brief user-defined name associated with the system data flow), and Data Flow Description (a detailed description of the data flow associated with the external interface, which preferably includes a statement of the purpose of the external interface and the relationship between the interface and the system, as well as the type of data and the general method for data transmission, if applicable).

When accreditation boundary tab 424 is activated, a menu (not shown) that provides the user with the ability to describe and store the identification of components that are associated with the system being accredited, but are outside of the accreditation boundary (i.e., not included in the accreditation). This category might include such equipment/ services as, for example, a domain naming service (DNS) used to translate the host names to IP addresses. The DNS might not be part of the atomic system being accredited, but is required for most communication activities. The following exemplary fields can be provided: Accreditation Boundary Name (a name associated with the external system component), and Accreditation Boundary Description (a detailed description of the external system component, which preferably includes the function that this component/ service provides the system being accredited and its relationship to the system).

When project threat tab 426 is activated, a menu (not shown) appears that provides the user the ability to quantify the threat environment where the system is intended to operate. If the system is targeted to operate in multiple locations, the environmental condition that results in the higher or highest level of risk can be selected. The following exemplary fields can be provided: Location (CONUS (CONtinental US) or OCONUS (Outside CONtinenal US) as the primary operating location for the system), System Communications (the primary means of information transfer to external systems, such as No LAN, Local LAN Only, SIPRNET (SECRET Internet Protocol Router Network), NIPRNET (Unclassified but Sensitive Internet Protocol Router Network), Internet, etc.), Connection (the types of connection—e.g., wireless, dial-up, or protected distribution system (PDS), etc.), Training Competency Level (e.g., administrator, maintenance personnel, user, etc.), Installation Facility (the operating environment of the system at its intended end site), Natural Disaster Susceptibility (e.g., fire, flood, lightning, volcano, earthquake, tornado, etc.), and Custom Components.

When project appendices tab 428 is activated, a menu (not shown) that provides the user the ability to identify external documents that are associated with the C&A is provided. These appendices can optionally include references to other documents, or consist of the contents of other documents that are accessible via a computer-implemented embodiment of the present invention. Representative appendices that may be derived are: System Concept of Operations, Information Security Policy, System Rules of Behavior, Incident Response Plan, Contingency Plans, Personnel/Technical Security Controls, Memoranda of Agreement, Security, Education, Training and Awareness Plan, and Certification and Accreditation Statement.

Tabs 402–428 can be activated in any order, and do not need to be activated sequentially. Also, each tab can be optionally customized to contain different, fewer, or additional fields relative to the fields discussed above. Further, the tabs (402–428) can be arranged differently. Fewer or additional tabs can also be provided to suit a particular application or need.

Requirements Analysis

Figure 11:
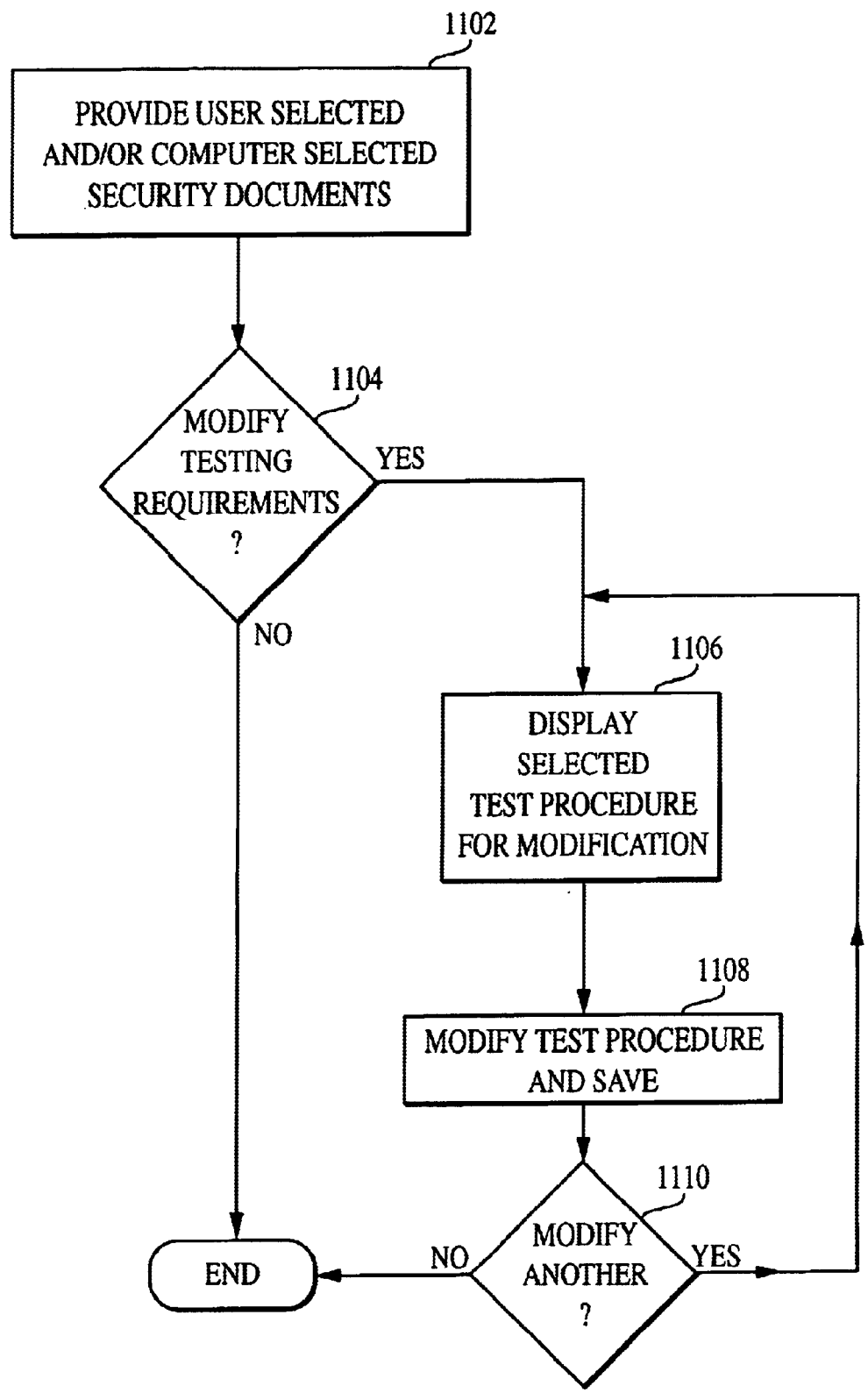
FIG. 11 is an exemplary flow chart of the requirements analysis process as contemplated by at least some embodiments of the present invention.

The system configuration captured in the step of block 100 of FIG. 1 is used as input for the determination of the requirements indicated by block 102. The process of editing and/or determining/selecting those requirements is shown in FIG. 11. In at least some embodiments contemplated by the present invention, the Requirements Analysis step is related to the Accreditation Type 404 and Project Security 406 information stored in the step indicated by block 100. In at least some embodiments, data is entered and saved in the Accreditation Type 404 and Project Security 406 fields provided before beginning the Requirements Analysis step indicated by block 102.

In an exemplary embodiment, a general purpose computer on which the present invention operates will have stored thereon or have access to a repository of security regulations and test procedures from various government and/or civilian departments, agencies, organizations, etc (e.g., such as those from DITSCAP). In step 1102 (FIG. 11), and based at least in part on the information entered in step 100, pertinent regulations will be selected from this repository, upon which to build a security requirement traceability matrix (SRTM) for the C&A. The SRTM, as discussed above, can be a mapping of one or more test procedures to each individual requirement within a requirements document. Satisfactory completion of the respective one or more test procedures that can be mapped to each requirement is generally considered to render the requirement satisfied. However, the user has the flexibility to view and modify 1104 the SRTM as desired to meet the specific needs of the systems being accredited by, for example, adding and/or deleting one or more tests to/from the SRTM, and/or editing one or more of the test procedures to, for example, include additional testing requirements. If the user decides to modify a test procedure, the specified test procedure displayed 1106. The user can then modify and save the revised test procedure 1108. The user can then either end the editing process or continue to modify another security document 1110.

Figure 12:
FIG. 12 is an exemplary screen shot used to generate a security requirements traceability matrix (SRTM)

FIG. 12 shows an exemplary Generate Baseline SRTM screen shot. In at least some embodiments of the present invention, clicking the Requirements Analysis tab 1201 from the application menu will switch control to the Generate Baseline SRTM screen. As shown, FIG. 12 provides a menu that provides a list of pre-packaged (i.e., shipped with the application) regulations documents (1202–1222) for the user to select. Each regulations document (1202–1222) contains specific requirements, one or more of which may be utilized when performing the C&A. All unmarked check boxes (e.g., check boxes associated with documents 1202, 1206, 1210, 1212, 1214, 1216, and 1218) represent unselected Regulations Documents, and thus do not factor into the requirements analysis step 102 for the particular project under consideration.

Figure 13:
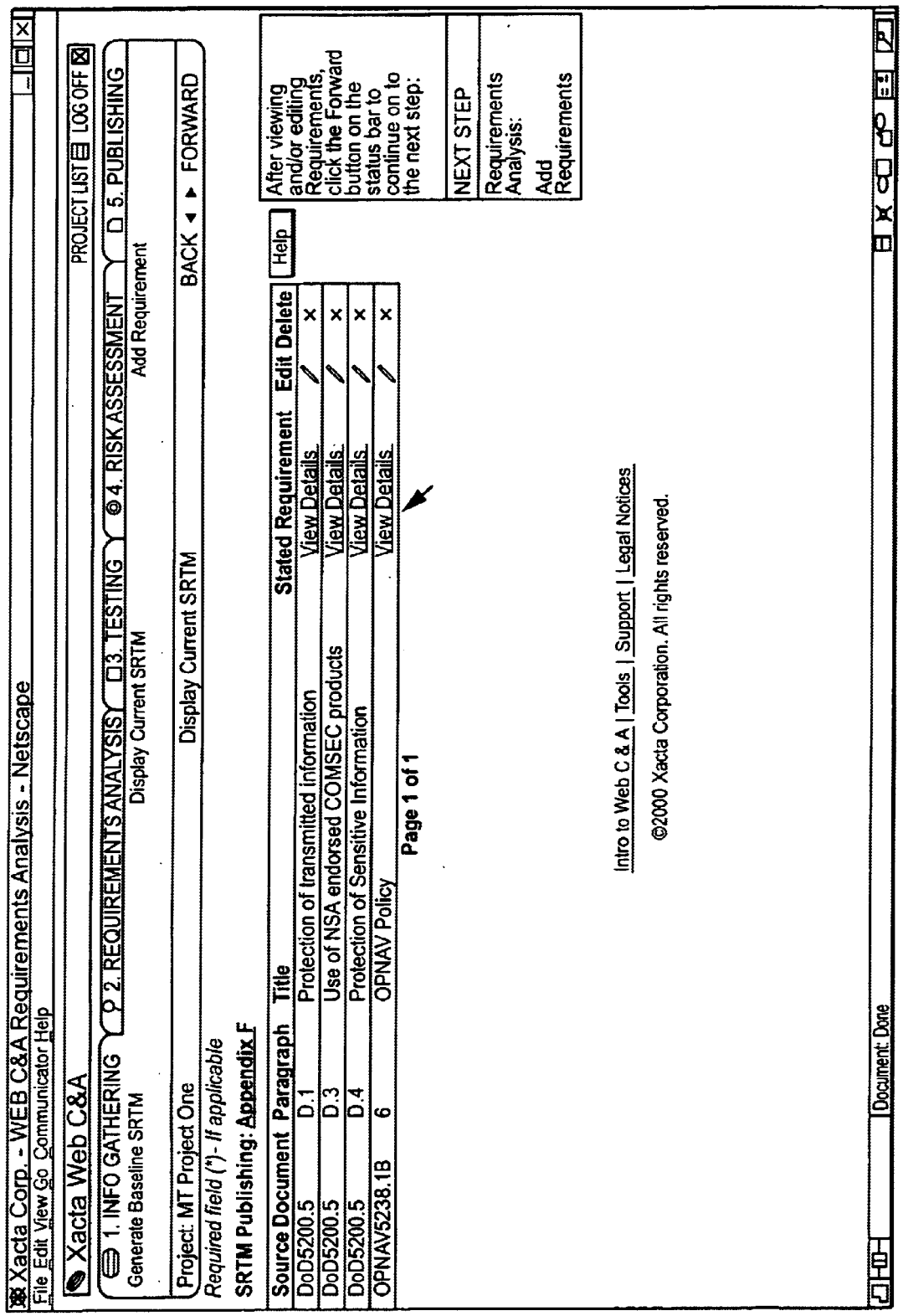
FIG. 13 is an exemplary screen shot showing a display of a SRTM.

After selections have been made, either by the user by, for example, clicking the appropriate boxes associated with documents (e.g., 1204, 1208, 1220 and 1224), and/or by the system, the application will provide a Display SRTM screen as shown in FIG. 13. Additionally, FIG. 13 may display any optional user-defined requirements as determined at FIG. 12, 1226. FIG. 13 particularly shows pertinent portions of DoD 5200.5, selected in FIG. 12 (1208), that are applicable to the C&A at hand.

Testing

Figure 14:
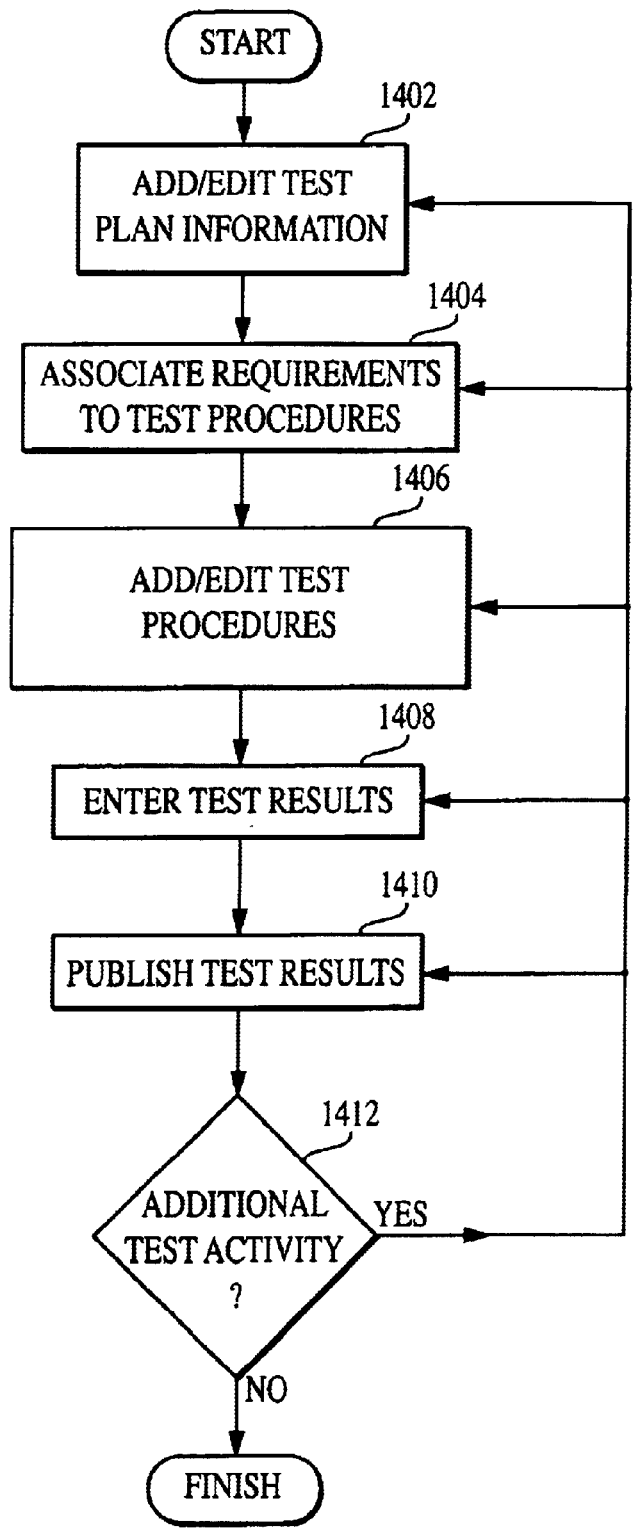
FIG. 14 is an exemplary flow chart illustrating the testing process as contemplated by at least some embodiments of the present invention.

With the security requirements traceability matrix in place (a portion of which is illustratively shown in FIG. 13), the user proceeds to the testing step 104. In at least some embodiments of the present invention, user interfaces will be provided, in accordance with the steps shown in FIG. 14, for the user to add and/or edit test plan information 1402, associate all the requirements to test procedures 1404, add and/or edit test procedures 1406, enter test results 1408, and/or publish test results 1410. Any of the above steps can optionally be repeated as needed, as indicated in decision step 1412. Each of these steps will be discussed in further detail herein.

Figure 15:
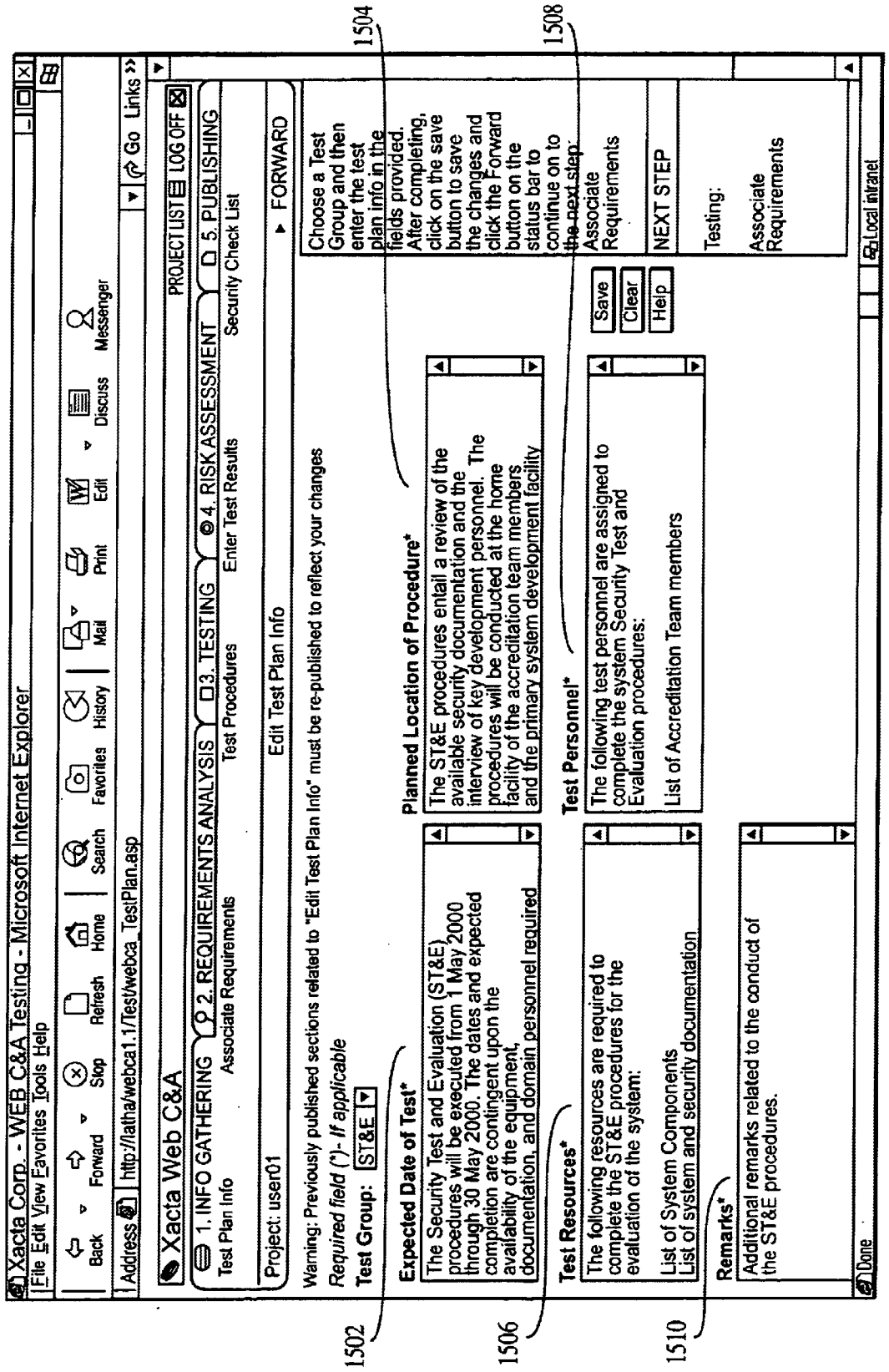
FIG. 15 is an exemplary screen shot showing how test plan information can be edited.

An Edit Test Plan Information screen, corresponding to step 1402, is shown in FIG. 15. The exemplary input fields on the screen are Expected Date of Test 1502, Planned Location of Procedure 1504, Test Resources 1506, Test Personnel 1508, and Remarks 1510.

Figure 16:
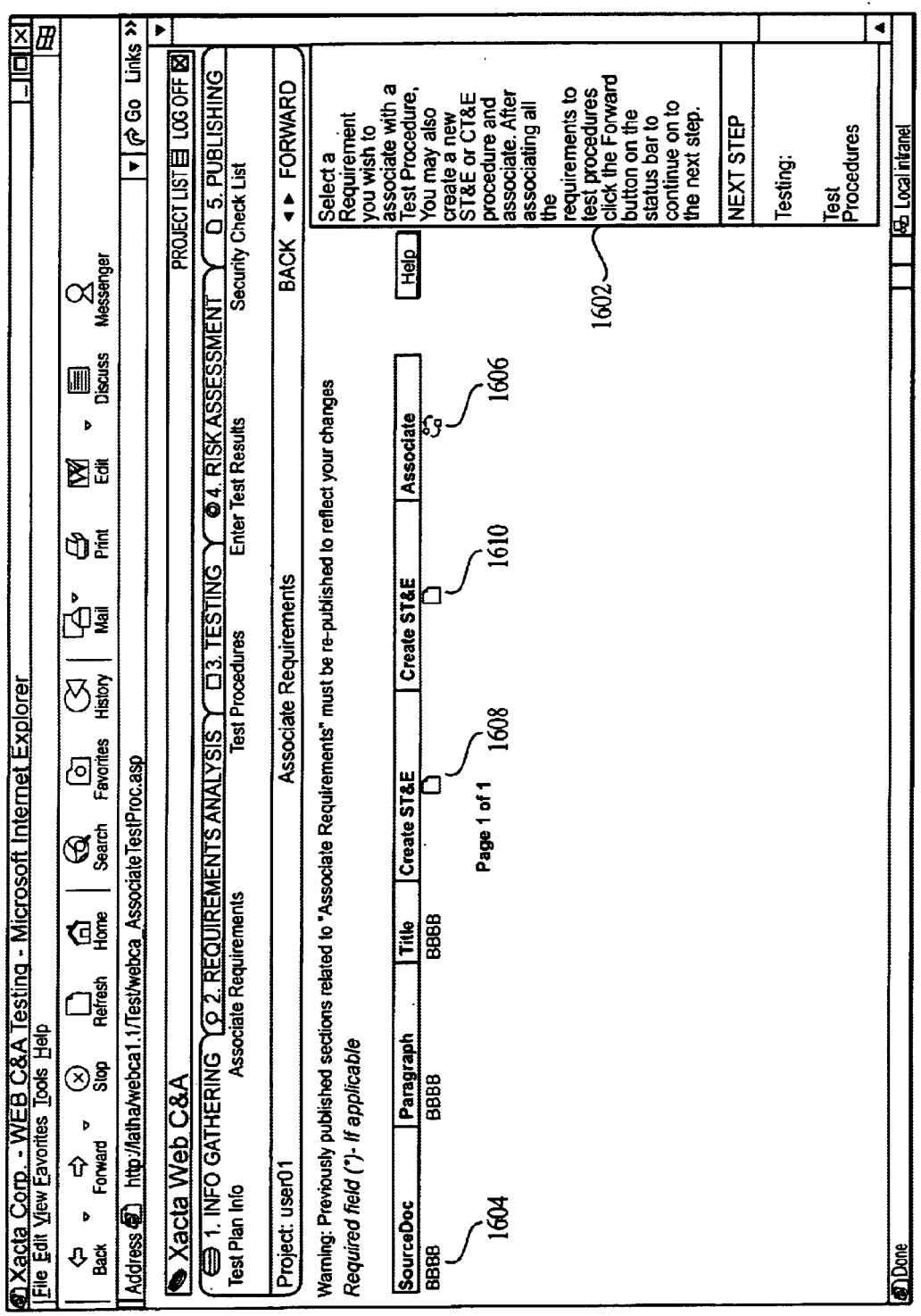
FIG. 16 is an exemplary screen shot illustrating how a user can select an existing test procedure and/or create a new test procedure and associate the test procedure(s) with one or more requirements.

FIG. 16 is an Associate Requirements screen, corresponding to step 1404, which illustrates how a user can select a test procedure to associate it with at least one requirement selected. (FIG. 18 and the associated text below will discuss an automated version of this). As indicated in the descriptive text block 1602, a user can select a source requirements document 1604. Upon clicking on the associate icon 1606, a list of test procedures (not shown) can be displayed. The user can then select one or more of the test procedures within the test procedure database (as discussed above) and associate it/them with the selected source document 1604. A user can also create a new security test and evaluation procedure (ST&E) 1608 or certification test and evaluation (CT&E) procedure 1610, by clicking on the respective icon. After the user enters the respective CT&E and/or ST&E information into a form presented on a new menu (not shown), the user can save the procedure(s) and optionally associate the procedure(s) via the Associate icon, as described above.

Figure 17:
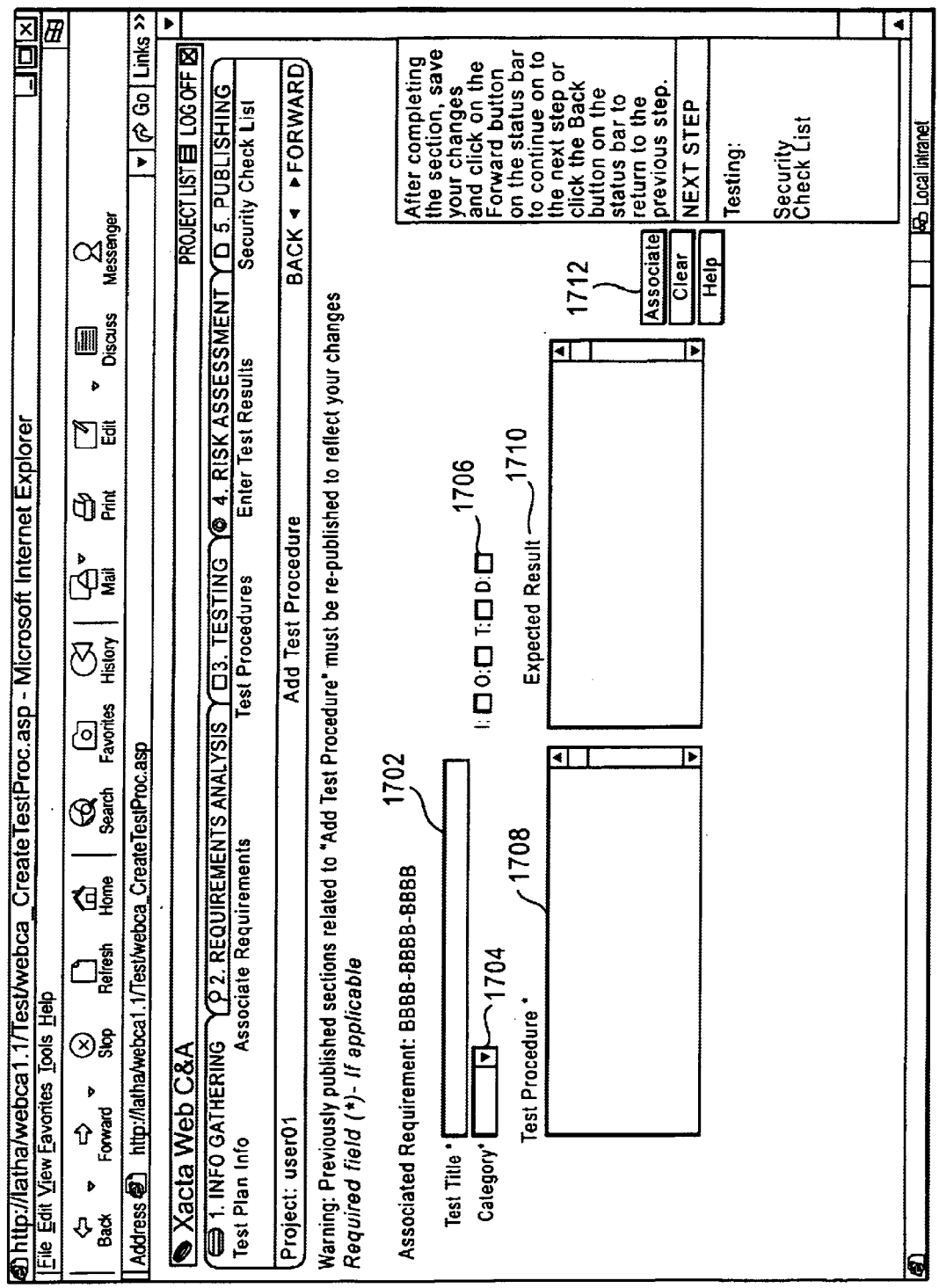
FIG. 17 is an exemplary screen shot showing how a user can add a test procedure.

FIG. 17 is a screen illustrating how a user can enter a new test procedure. As shown, the input fields on the screen are Test Title 1702, Category 1704, I, O, T, D (where I represents interview, O represents observation, T represents text, and D represents documentation review) 1706, Test Procedure 1708, and Expected Result 1710. If Associate 1712 is selected, then a new row is preferably created in the test procedure data base with the data entered in the input fields provided.

Figure 18:
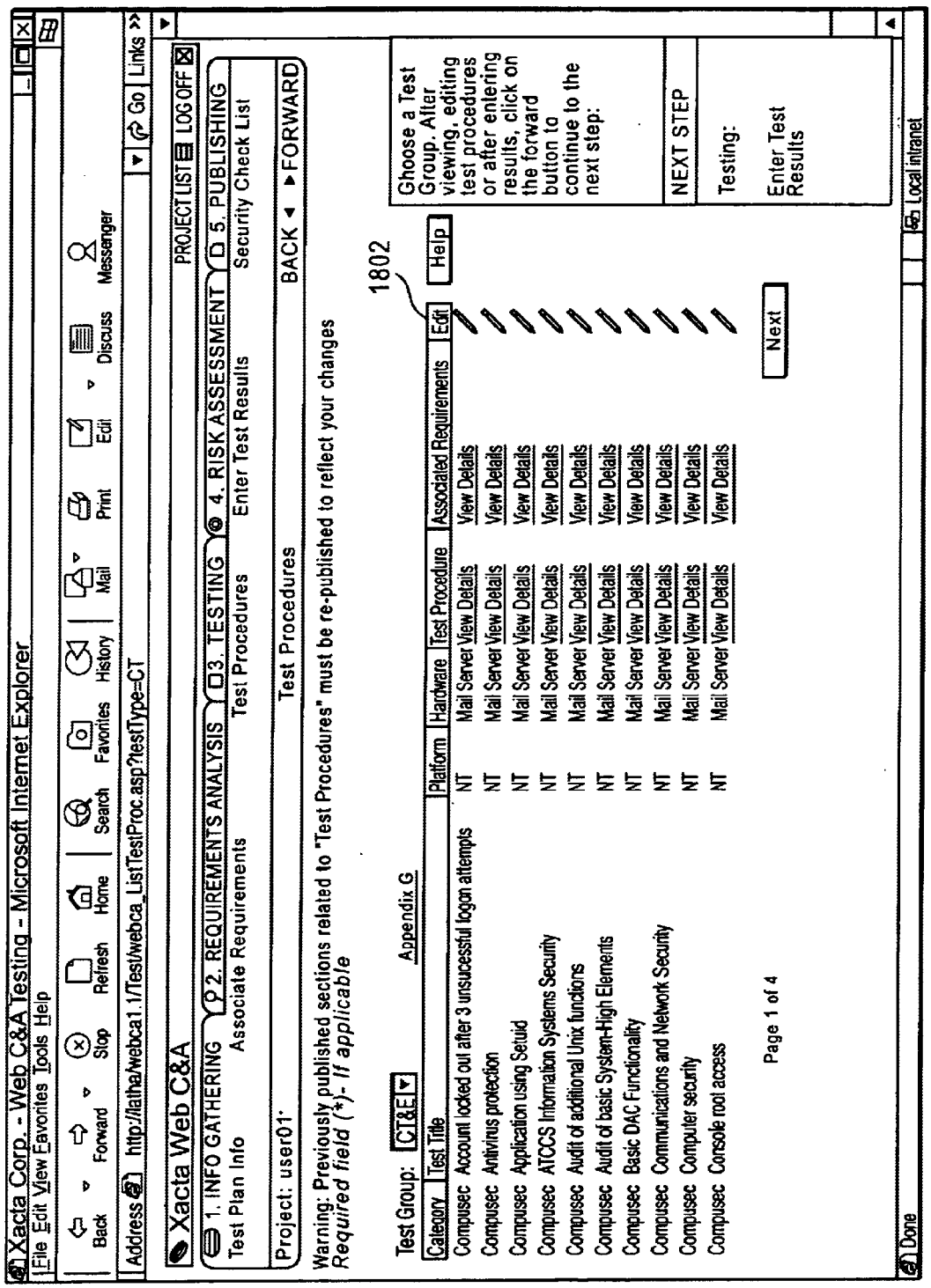
FIG. 18 is an exemplary screen shot showing test procedures that will be utilized for C&A.
Figure 19:
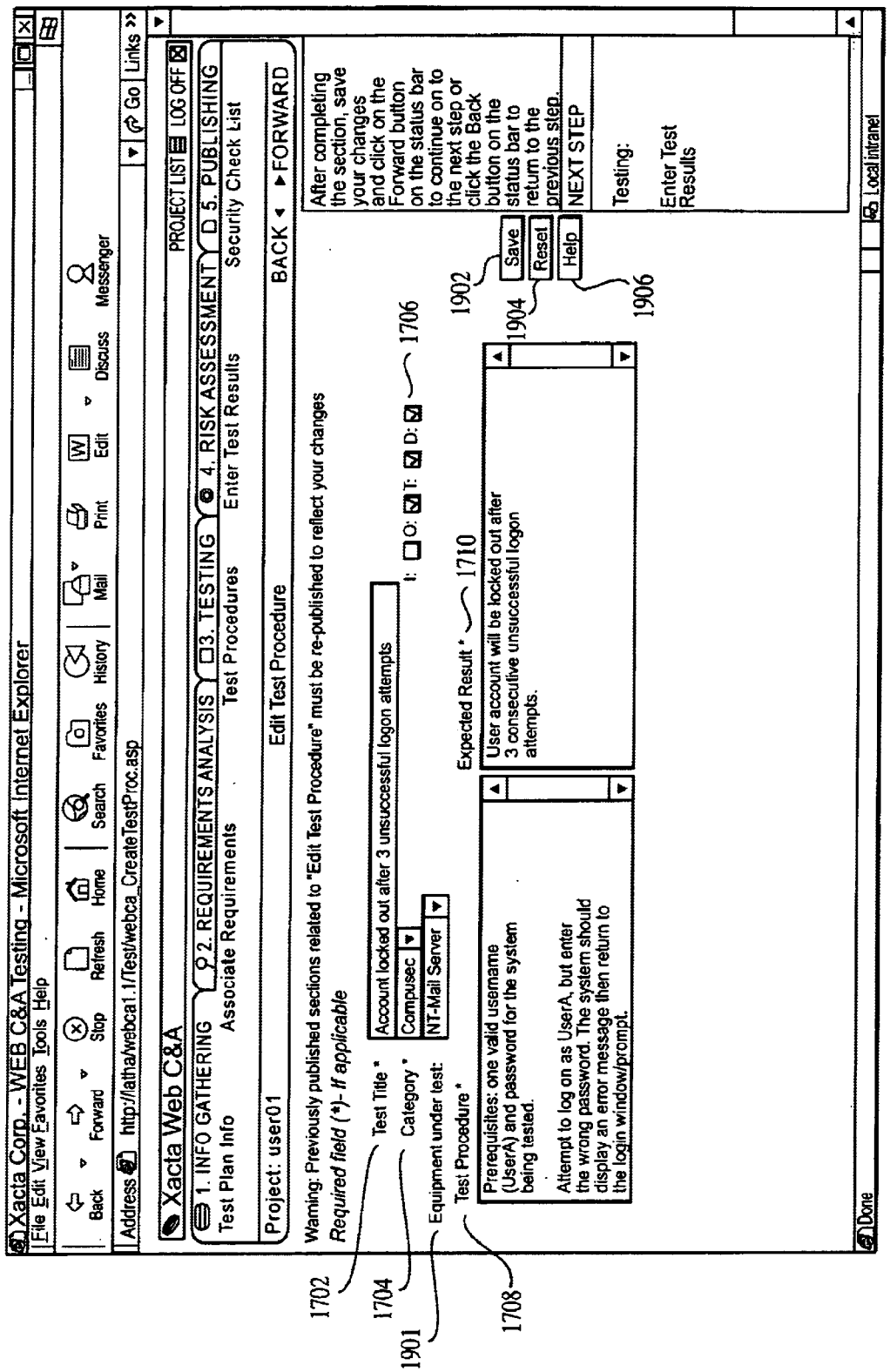
FIG. 19 is an exemplary screen shot showing how a user can edit a test procedure.

FIG. 18 is a screen showing a display of test procedures that will be used for a given C&A. The test procedures are intelligently selected by the present invention for the C&A at hand by using the system information specified in step 100 and the requirements analysis step 102. As discussed above in the context of the SRTM, one or more test procedures within the test procedure database can be mapped to, linked with, and/or otherwise associated with each of the individual requirements within each respective requirements document (FIG. 12). As shown in FIG. 19, one or more of the test procedures shown in FIG. 18 can be edited by, for example, clicking the edit button 1802 in FIG. 18. In a preferred embodiment, the user will be able to edit any of fields 1702, 1704, 1706, 1708 and/or 1710.

FIG. 19 is a screen showing how a user can edit a test procedure. As shown, the user can edit any of the fields Test Title 1702, Category 1704, Equipment Under Test 1901, I, O, T, D 1706, Test Procedure 1708 and/or Expected Result 1710. Once any of the above fields is edited, the edited results can be saved 1902 or canceled 1904. Context sensitive help for any of the above fields is also available 1906.

Figure 20A:
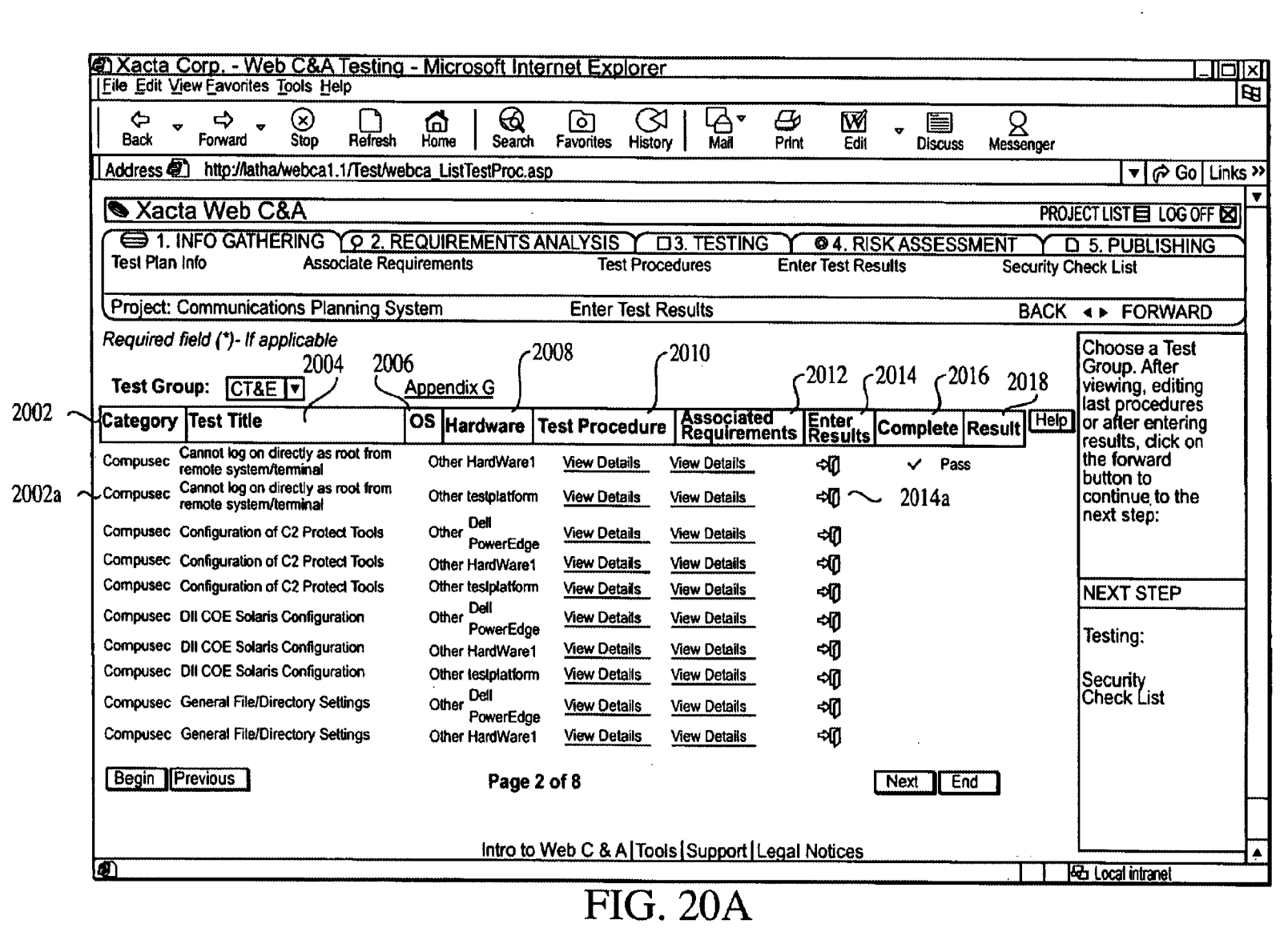

FIG. 20A is a screen that enable a user to enter test results. As shown, at least some embodiment of the present invention contain the following exemplary columns: Category 2002, Test Title 2004, Operating System (OS) 2006, Hardware 2008, Test Procedure 2010 (which enables a user to view the details of the test procedure), Associate Requirements 2012 (which allows the user to view which requirements a particular test procedure is associated with), Enter Results 2014, Complete 2016 (which provides an indication of whether the test procedure has been completed), and Result 2018 (which provides an indication of whether the test procedure has passed or failed). (It should be appreciated, however, that various embodiments of the present invention contemplate that the present invention automatically initiates the test, and obtains the results, without the need for any additional manual entry steps).

Figure 20B:
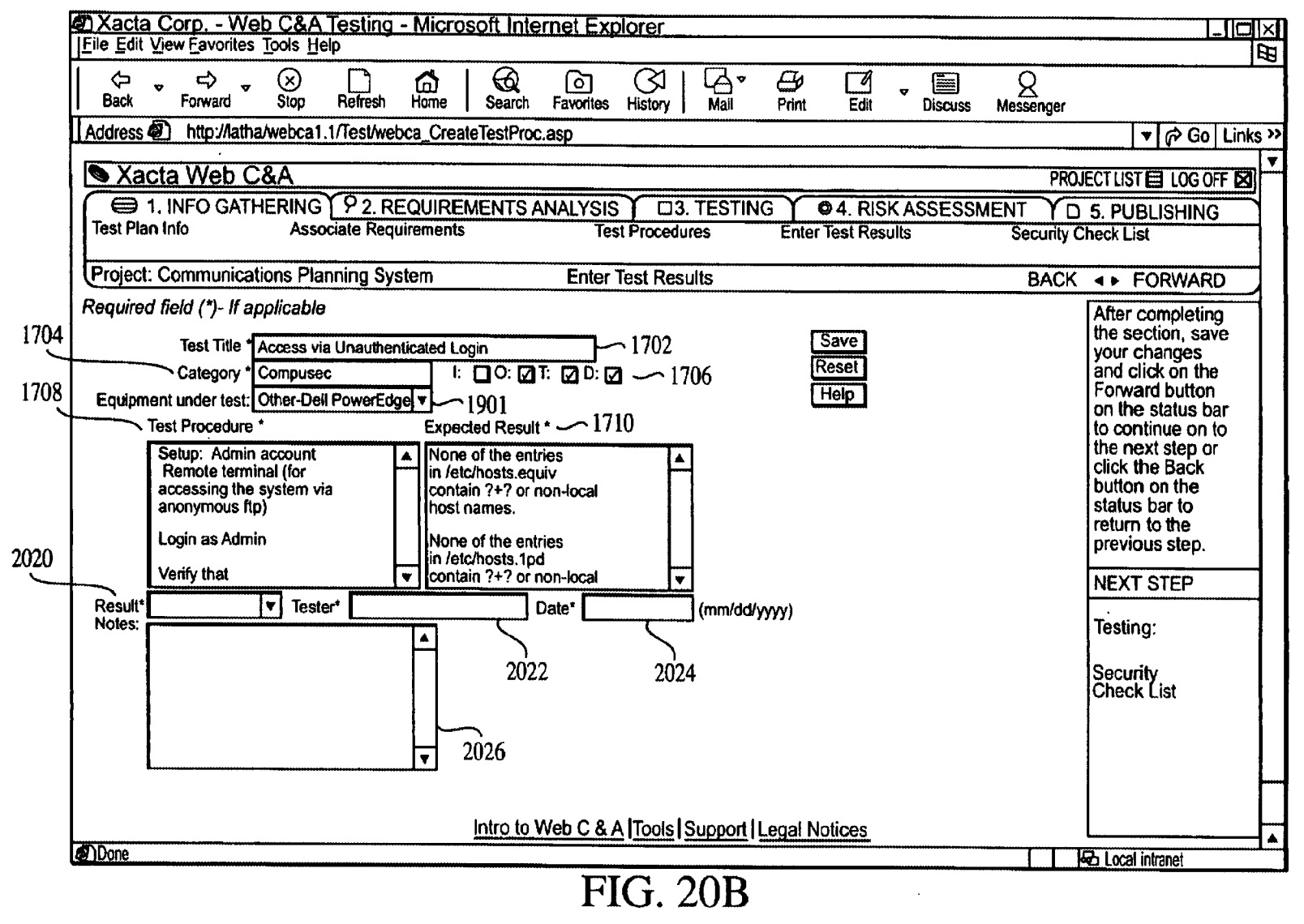

FIG. 20B is an exemplary screen that appears when the Enter Results 2014 icon is pressed that is associated with a particular test procedure. For example, in FIG. 20A, if icon 2014a is pressed, the a screen appearing similar in format to FIG. 20B will appear with the Test Title 1702 corresponding to the test contained in row 2002a of FIG. 20A (e.g., Cannot Log On Directly as Root from Remote System/Terminal). As shown, the Test Title 1702, Category 1704, Equipment Under Test 1901, I, O, T, D 1706, Test Procedure 1708 and/or Expected Result 1710 and fields also preferably appear within this screen. Also, Result field 2020 appears, which allows the user to enter the test result (e.g., pass or fail). Tester field 2022 enables the tester to provide his name, and Date 2024 that the test was conducted. Finally, the tester is able to enter any Notes pertaining to the test 2026.

Risk Assessment

Once the testing step 104 has been completed and the results recorded, the risk assessment step 106 commences, as indicated by sub-headings a–d below.

a) Generate Project Threat Profile (Step 2102)

Figure 21:
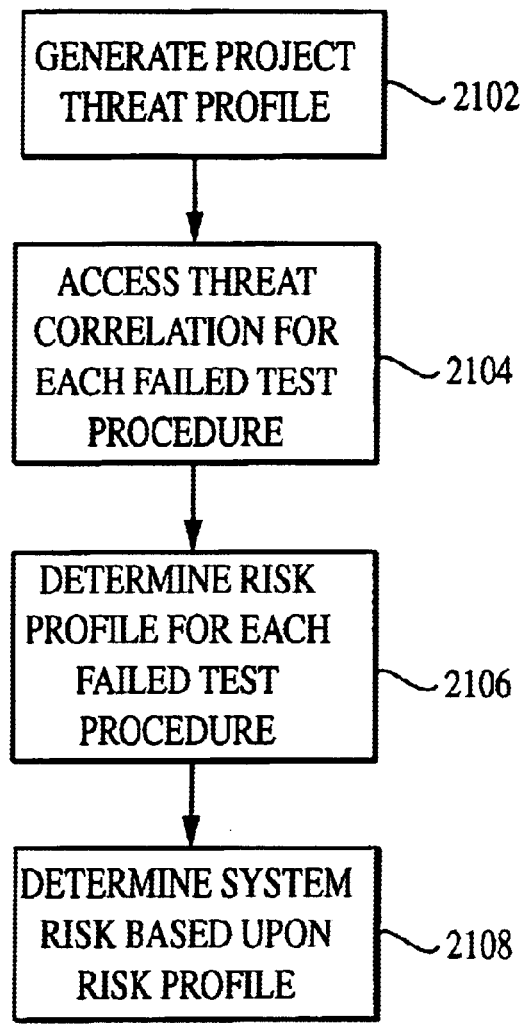
FIG. 21 is an exemplary high level flow diagram of the risk assessment method according to at least some embodiments contemplated by the present invention.

As shown in FIG. 21, at step 2102, at least some embodiments of the present invention generate a project threat profile, which is a score for each of the generic threat elements (e.g., fire, flood, hardware, power, software design error, etc.) as will be discussed in further detail herein. In at least some embodiments, the user performing the C&A is presented with a series of questions pertaining to the environment for which the C&A will be performed. (This information could also be obtained in an automated fashion using any number of known techniques). The present invention will then estimate the threat level based on the operators' answer. The value assigned to each of the generic threat elements is applicable to each test procedure associated with the particular system undergoing C&A. A user can optionally change any of the system determined threat element scores for one or more of the generic threat elements. Exemplary values for generic threat elements are as follows:

| Threat Element Score | Interpretation |
| --- | --- |
| N | Threat element is not applicable to this project or has negligible likelihood of occurrence |
| L | Threat element has low likelihood of occurrence for this project |
| M | Threat element has medium likelihood of occurrence for this project |
| H | Threat element has high likelihood of occurrence for this project |

For example, generic threat elements 1–29, as defined in FIG. 22, may have a project threat profile as follows:

MHNLLLLMMMMMLLLMMMMLLLLLLLLNN corresponding, respectively, to elements 1–29. For this project threat profile, the threat of a flood is thus considered high.

Figure 23:
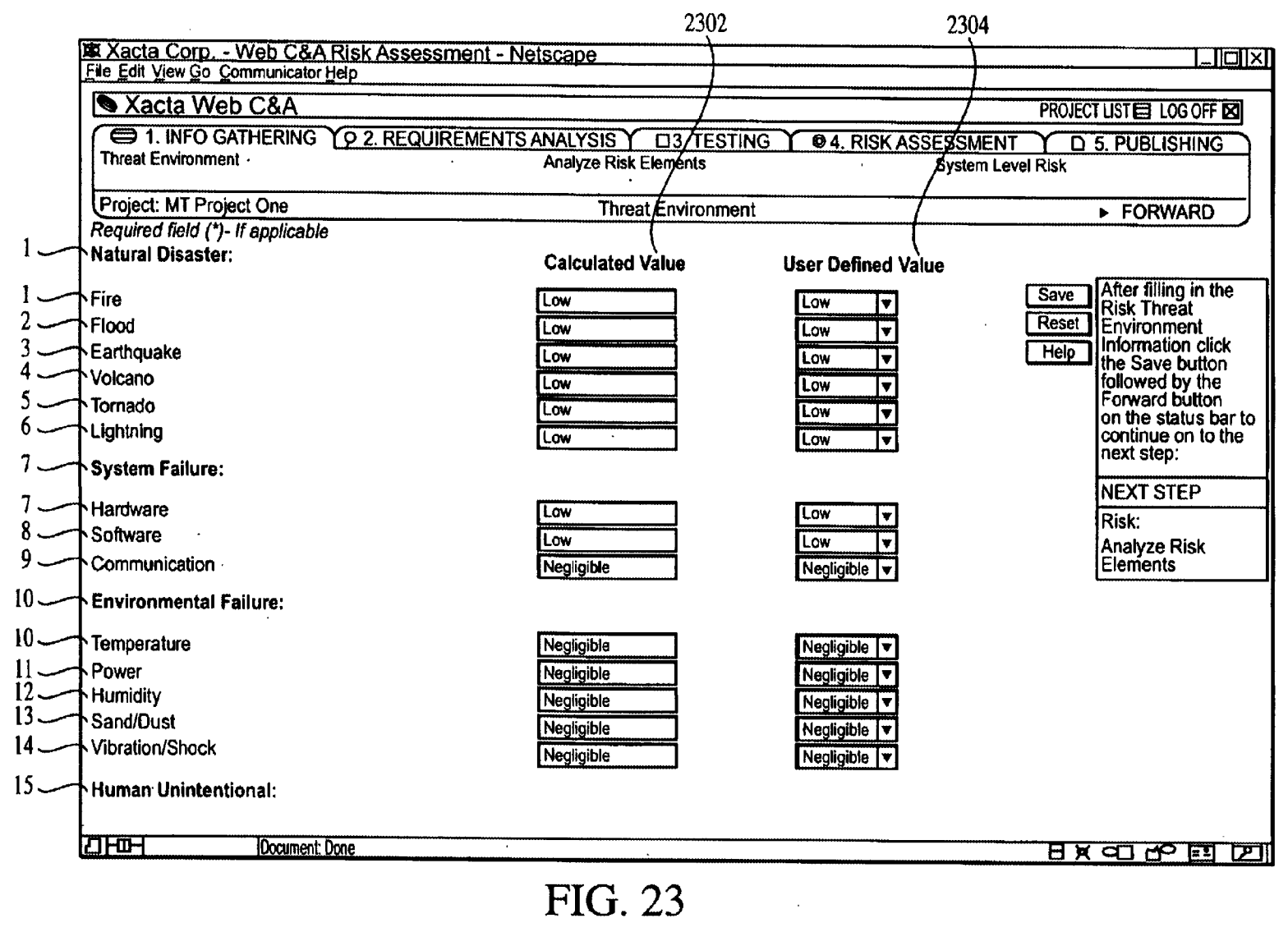

FIG. 23 shows an exemplary Threat Environment screen, which shows the calculated level of risk based on the information that was provided in step 100. As per at least some embodiments, the present invention automatically calculates the risk, which is indicated under the Calculated Value 2302 heading. This could be accomplished in any number of ways based upon data obtained during the current and/or testing phase, as indicated above. The User Defined Value 2234 preferably defaults to the corresponding Calculated Value 2302 for a given threat environment element (e.g., 1, 2, 3, etc.). However the user/analyst has the opportunity to optionally override the calculated risk rating by clicking on the User Defined Value 2204 for each corresponding threat element. As previously discussed, exemplary available choices are negligible, low, medium, or high, although they could also be, e,g., numerical in nature.

b) Threat Correlation String (Step 2104)

In step 2104, a threat correlation for each failed test procedure is accessed. Specifically, each test procedure used in the C&A for the system being evaluated is, in at least some embodiments of the present invention, coded with a threat correlation string, with each character in the string representing one of the generic threat elements in the same order as they exist in the project threat profile as shown, for example, in FIG. 22. The test procedure database preferably contains these codes. Each character in the threat correlation string contains a score that indicates the relative potential of a given threat to exploit a vulnerability caused by failure of this particular test. An exemplary scoring system is as follows:

| Threat Correlation Score | Interpretation |
| --- | --- |
| N | Threat element is not applicable to this vulnerability (or has negligible potential to exploit it) |
| L | Threat element has low potential for exploit of this vulnerability |
| M | Threat element has medium exploit potential for this vulnerability |
| H | Threat element has high exploit potential for this vulnerability |

Thus, for example, failure of a particular test may mean that the system being tested is highly vulnerable to Floods. To indicate this, the character in the threat correlation string corresponding to Floods would contain a score of "H".

c) Determine Risk Profile for Each Failed Test Procedure (Step 2106)

As indicated at step 2106, the risk profile for each test procedure is determined. Specifically, for each test failure, the threat correlation string contained within each test procedure, as determined at step 2104, is applied against the project threat profile as determined at step 2102.

For example, the project threat profile above, given as:

MHNLLLLMMMMMLLLMMMMLLLLLLLLNN may have a test procedure with the following threat correlation sting:

HHNMHLMNHHHMLNNNHLMLHNNLHHLMH

In this case, in accordance with an exemplary process according to at least some embodiments of the present invention, the combined risk profile string as determined in accordance with FIG. 24 would be:

MHNLMLLNMMMMLLLNMLMLMLLMMLNN

For a given row of FIG. 24, and given the first two values contained in the first two columns corresponding to that row, we have discovered and determined that the values contained in the third column of the row can be used a measure or risk.

The highest risk level in the combined string for a given test procedure is preferably used as the risk level for the failure of that test procedure. Thus, for the combined string above, the risk level for a failure of the test procedure is high, since there is an H in the second position. Similarly, if M were the highest risk level that appears in a combined string, then the risk level for a failure of that test procedure would be medium, etc.

d) Determine Overall System Level Risk (Step 2108)

Figure 25:
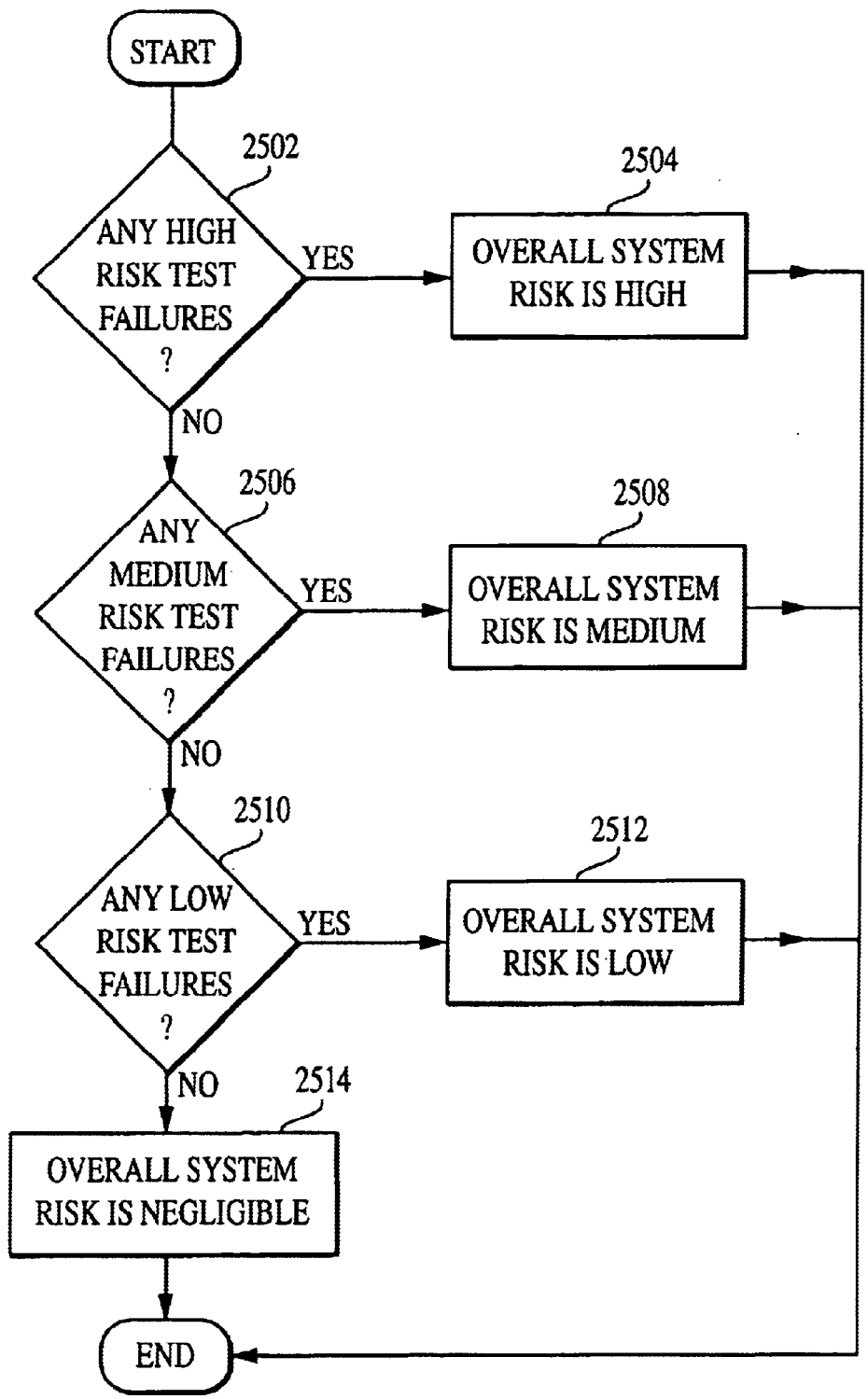
FIG. 25 is an exemplary flow diagram of a method of assessing overall system risk in accordance with at least some embodiments contemplated by the present invention.

In addition to the individual risk level scores for each test failure as determined in step 2106, an overall risk level for the project is also determined as indicated by step 2108. As shown in FIG. 25, in at least some embodiments, of the present invention, the overall system risk level is defined as the highest of the individual risk elements. Thus, if it is determined that any element in the risk profile associated with the failure of any given test procedure is "high" (as indicated by decision block 2502), then the overall risk for the system is high as indicated by a block 2504. If the risk profile associated with the failure of any given test procedure is "medium" (as indicated by decision block 2506), then the overall risk for the system is medium as indicated by a block 2508 when no high risk test failures are present. If the risk profile associated with the failure of any given test procedure is "low" (as indicated by decision block 2510), then the overall risk for the system is low when no high risk or medium risk failures are present, as indicated by a block 2512. If the risk profile associated with the failure of any given test procedure is "negligible" then the overall risk for the system is negligible, as indicated by a block 2514, when no high risk, medium risk, or low risk failures are present. The user also can have the ability to override the overall system risk level as determined in accordance with the above methodology. In such a case, the user will also be able to optionally provide explanatory text to accompany the overall user-defined system risk level.

Publishing

In the publishing step 108, the present invention collates the results of the certification process and optionally generates the documents needed for accreditation. The present invention takes the information gathered during the steps corresponding to blocks 100, 102, 104 and 106, and reformats the information by, for example, organizing it into to appropriate documents, document subsections or subparagraphs, sections and/or appendices, etc.

Figure 26:
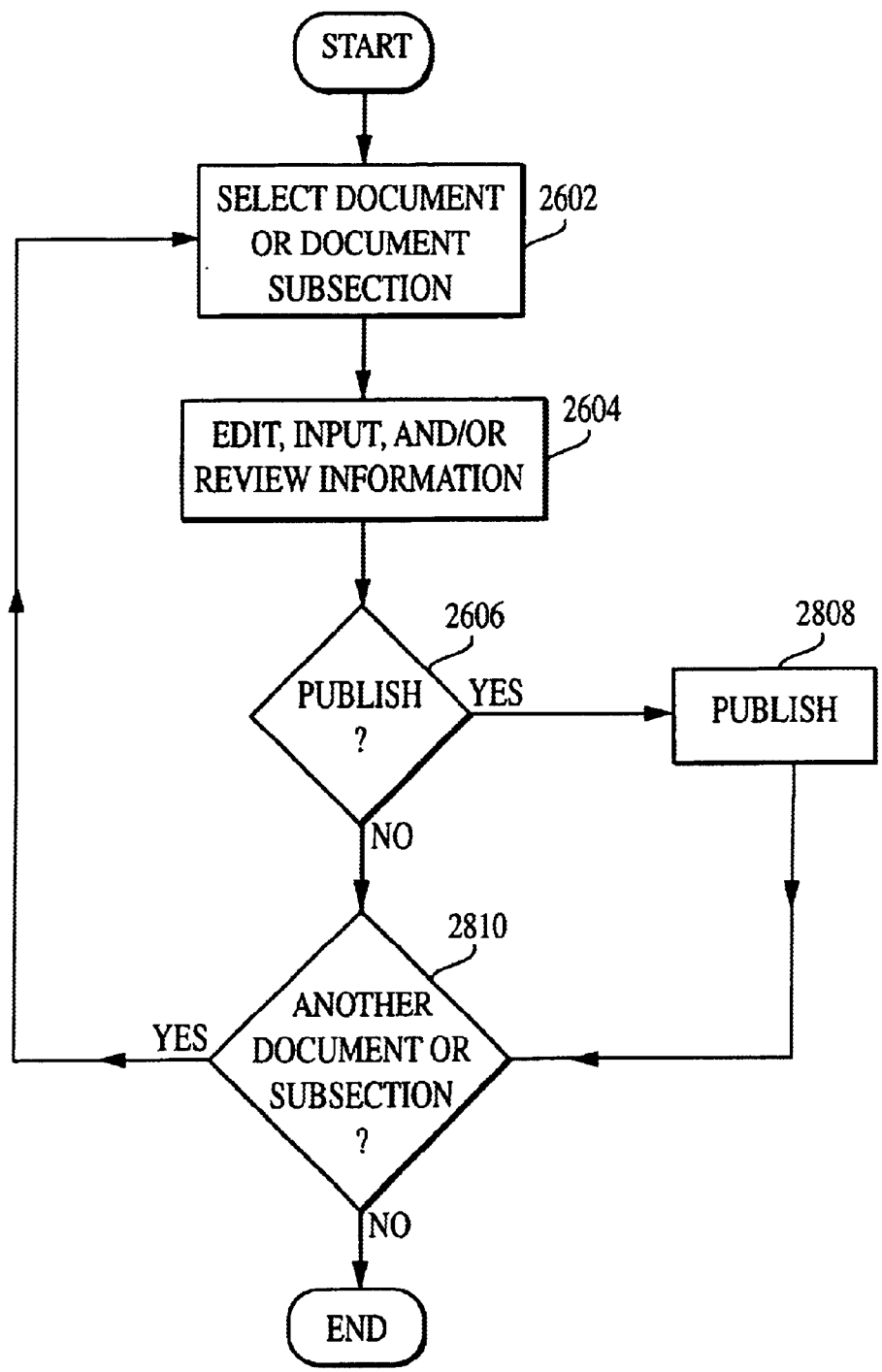
FIG. 26 is an exemplary flow diagram of the publishing process in accordance with at least some embodiments contemplated by the present invention.
Figure 27:
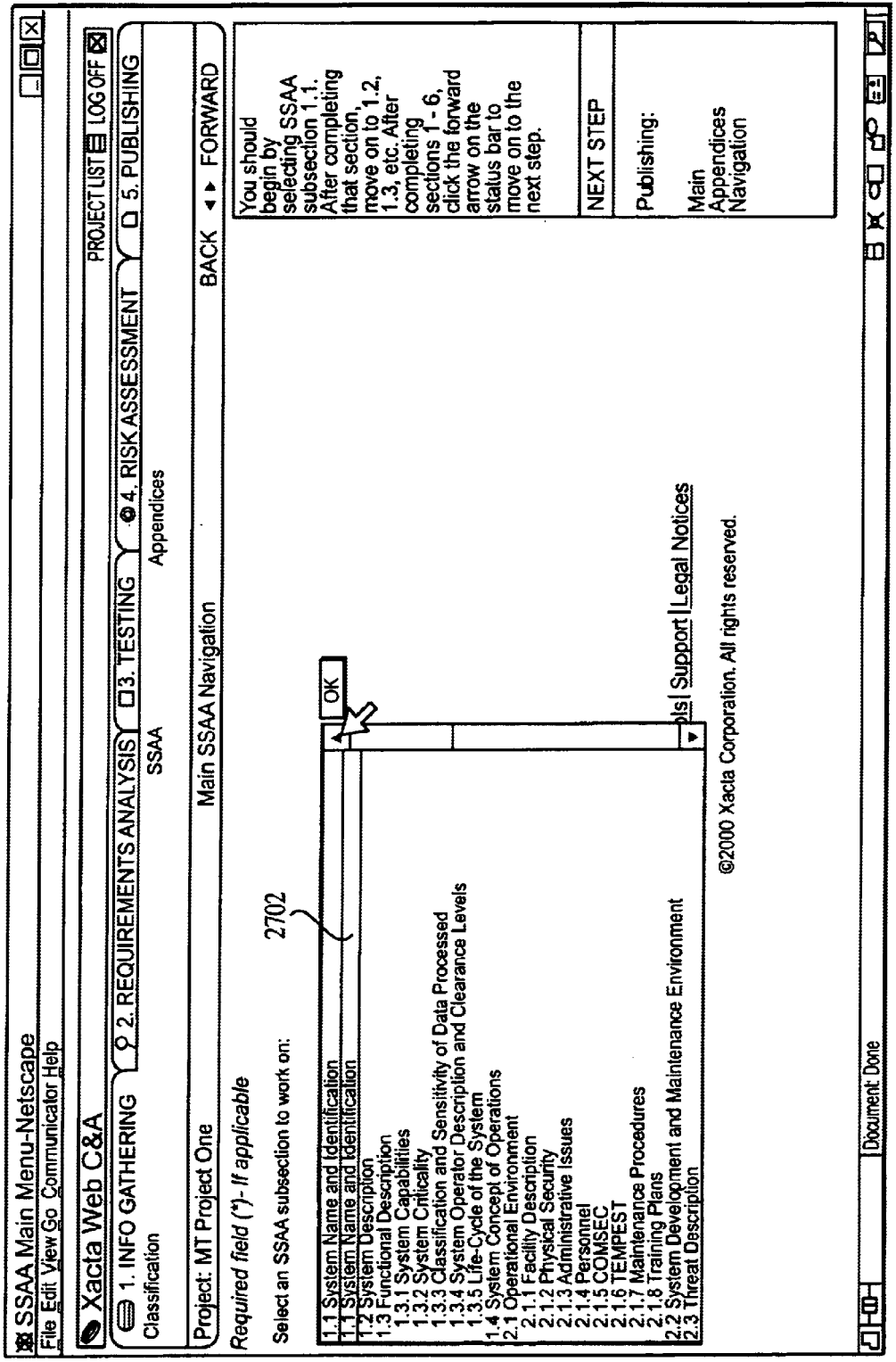
FIG. 27 is an exemplary screen shot showing how a user can select a portion of a document for publishing.
Figure 28:
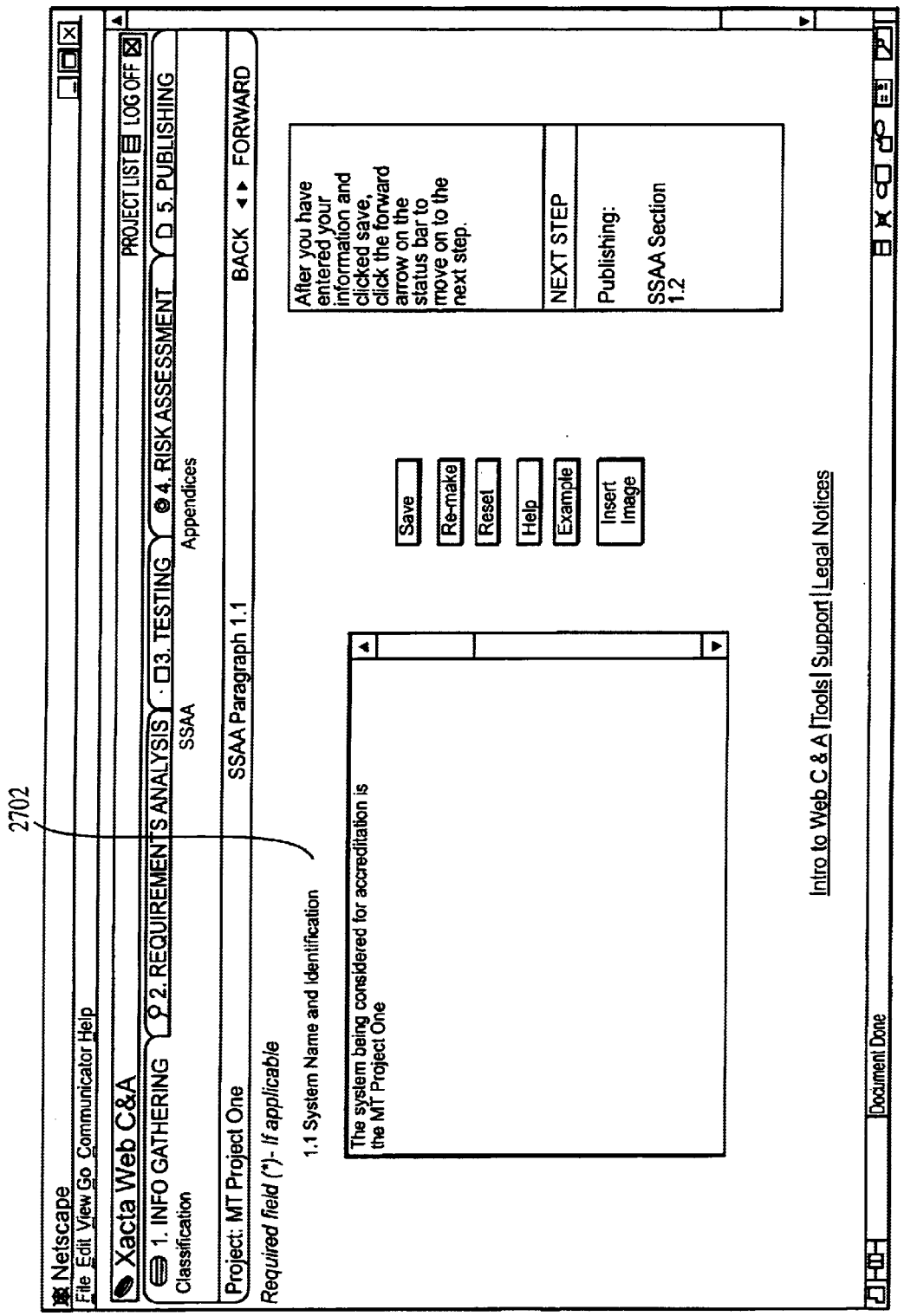
FIG. 28 is an exemplary screen shot that enables a user to edit and/or view a portion of a document prior to publishing.
Figure 29:
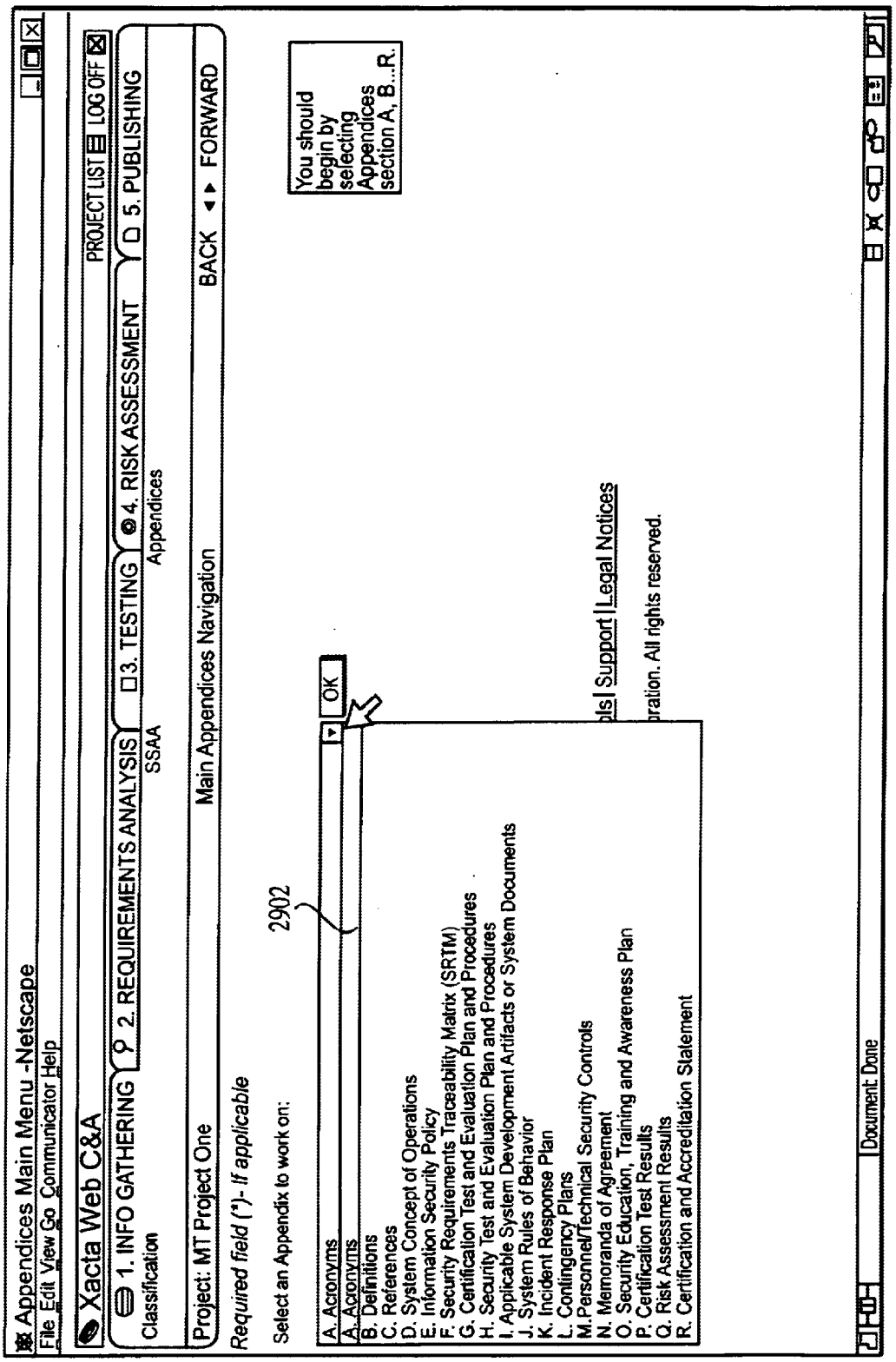
FIG. 29 is an exemplary screen shot showing how a user can select a portion of a document for publishing.
Figure 30:
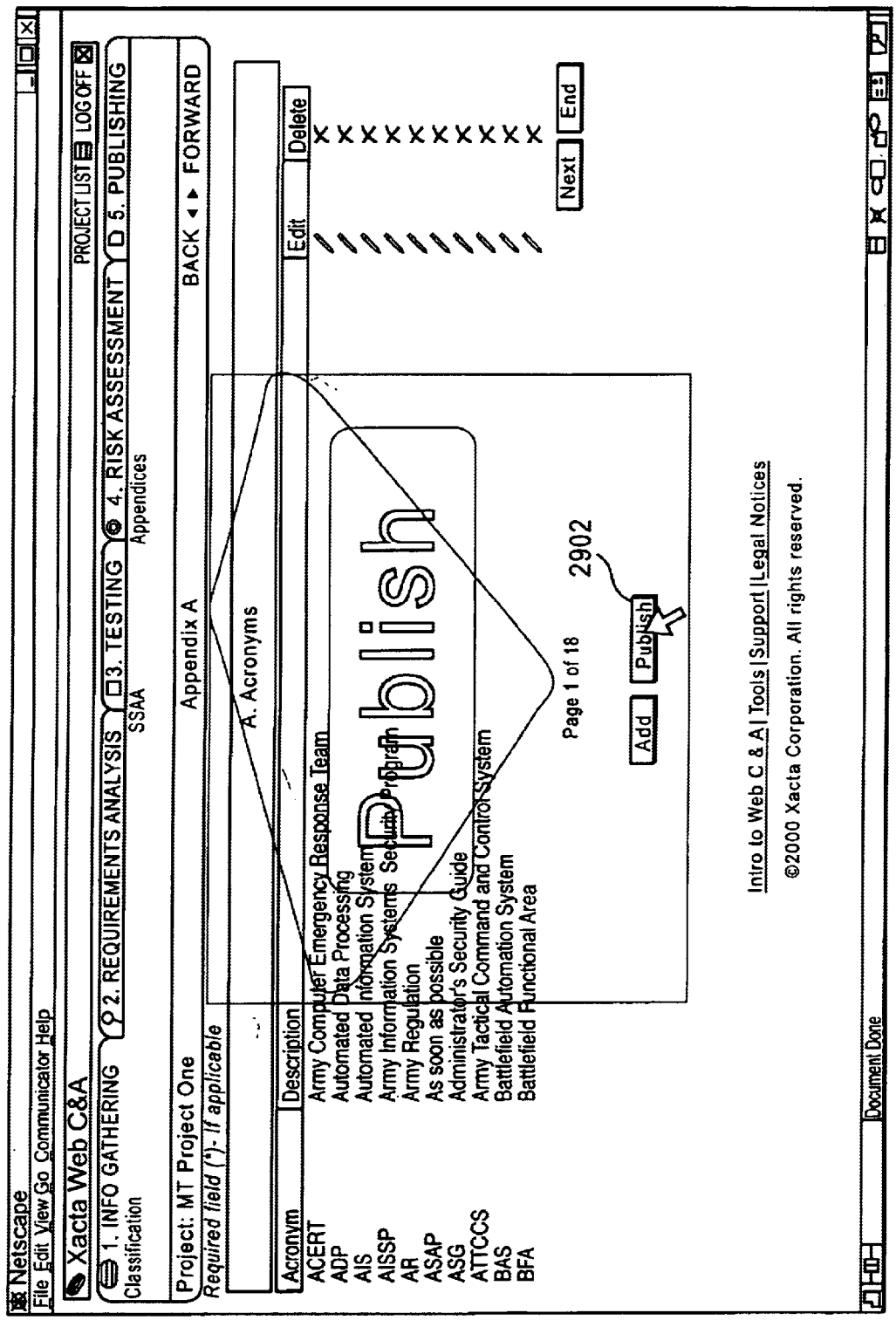
FIG. 30 is an exemplary screen shot illustrating how a user can publish a portion of a document.

As shown in FIG. 26, the invention allows a user to select a document or subsection thereof for publishing 2602, and to optionally input and/or review the information thereof 2604. As shown in FIG. 27, to view the document subsection thereof, the user simply clicks on the section name 2702. As shown in FIG. 28, the user can then edit the selection subsection 2702. The user can optionally edit, input information, or review the existing text 2604 or add to it, or even upload graphics if desired to further customize the final document. If the user chooses to publish the document or subsection under consideration 2606, the publishing function 2808, as shown in FIG. 29, can also, as previously discussed, generate any Appendices desired by the user and/or required by, for example, the DITSCAP (DoD Instruction 5200.40). At decision step 2810, the process can either be repeated for another document or subsection, or terminated. FIG. 30 shows an exemplary screen shot that enables a user to publish 2902 the acronym list 2902 selected in FIG. 29. The present invention also contemplates that accreditation can be automated, so that no accreditation agency is needed. In this embodiment, when sufficient test related results and/or information is provided to the computer 3102, the method according to the present invention can automatically determine that accreditation requirements have been satisfied.

Computer Implementation

Figure 31:
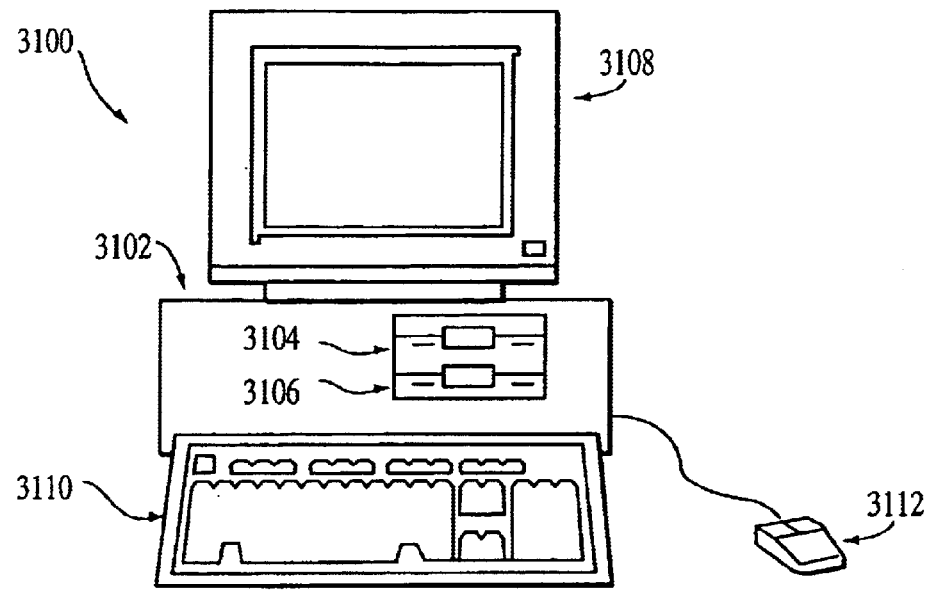
FIG. 31 illustrates one example of a prior art central processing unit for implementing a computer process in accordance with a computer implemented stand-alone embodiment of the present invention.

The techniques of the present invention may be implemented on a computing unit such as that depicted in FIG. 31. In this regard, FIG. 31 is an illustration of a computer system which is also capable of implementing some or all of the computer processing in accordance with computer implemented embodiments of the present invention. The procedures described herein are presented in terms of program procedures executed on, for example, a computer or network of computers.

Viewed externally in FIG. 31, a computer system designated by reference numeral 3100 has a computer portion 3102 having disk drives 3104 and 3106. Disk drive indications 3104 and 3106 are merely symbolic of a number of disk drives which might be accommodated by the computer system. Typically, these could include a floppy disk drive 3104, a hard disk drive (not shown externally) and a CD ROM indicated by slot 3106. The number and type of drives vary, typically with different computer configurations. Disk drives 3104 and 3106 are in fact optional, and for space considerations, are easily omitted from the computer system used in conjunction with the production process/apparatus described herein.

The computer system 3100 also has an optional display 3108 upon which information, such as the screens illustrated in, for example, FIGS. 4–10, etc. may be displayed. In some situations, a keyboard 3110 and a mouse 3112 are provided as input devices through which input may be provided, thus allowing input to interface with the central processing unit 3102. Then again, for enhanced portability, the keyboard 3110 is either a limited function keyboard or omitted in its entirety. In addition, mouse 3112 optionally is a touch pad control device, or a track ball device, or even omitted in its entirety as well, and similarly may be used as an input device. In addition, the computer system 3100 may also optionally include at least one infrared (or radio) transmitter and/or infrared (or radio) receiver for either transmitting and/or receiving infrared signals.

Although computer system 3100 is illustrated having a single processor, a single hard disk drive and a single local memory, the system 3100 is optionally suitably equipped with any multitude or combination of processors or storage devices. Computer system 3100 is, in point of fact, able to be replaced by, or combined with, any suitable processing system operative in accordance with the principles of the present invention, including hand-held, laptop/notebook, mini, mainframe and super computers, as well as processing system network combinations of the same.

Figure 32:
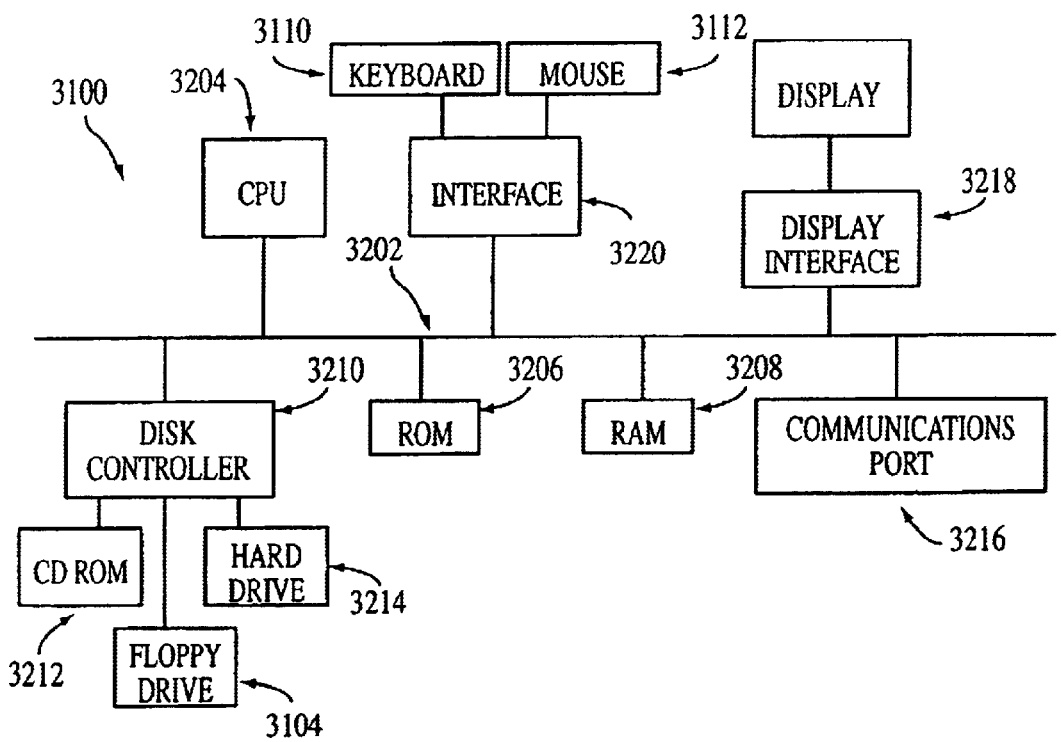
FIG. 32 illustrates one example of a prior art block diagram of internal hardware of the central processing unit of FIG. 31.

FIG. 32 illustrates a block diagram of the internal hardware of the computer system 3100 of FIG. 31. A bus 3202 serves as the main information highway interconnecting the other components of the computer system 3100. CPU 3204 is the central processing unit of the system, performing calculations and logic operations required to execute a program. Read only memory (ROM) 3206 and random access memory (RAM) 3208 constitute the main memory of the computer 3102. Disk controller 3210 interfaces one or more disk drives to the system bus 3202. These disk drives are, for example, floppy disk drives such as 3104 or 3106, or CD ROM or DVD (digital video disks) drive such as 3212, or internal or external hard drives 3214. As indicated previously, these various disk drives and disk controllers are optional devices.

A display interface 3218 interfaces display 3208 and permits information from the bus 3202 to be displayed on the display 3108. Again as indicated, display 3108 is also an optional accessory. For example, display 3108 could be substituted or omitted. Communications with external devices, for example, the other components of the system described herein, occur utilizing communication port 3216. For example, optical fibers and/or electrical cables and/or conductors and/or optical communication (e.g., infrared, and the like) and/or wireless communication (e.g., radio frequency (RF), and the like) can be used as the transport medium between the external devices and communication port 3216. Peripheral interface 3220 interfaces the keyboard 3110 and the mouse 3112, permitting input data to be transmitted to the bus 3202.

In alternate embodiments, the above-identified CPU 3204, may be replaced by or combined with any other suitable processing circuits, including programmable logic devices, such as PALs (programmable array logic) and PLAs (programmable logic arrays). DSPs (digital signal processors), FPGAs (field programmable gate arrays), ASICs (application specific integrated circuits), VLSIs (very large scale integrated circuits) or the like.

Figure 33:
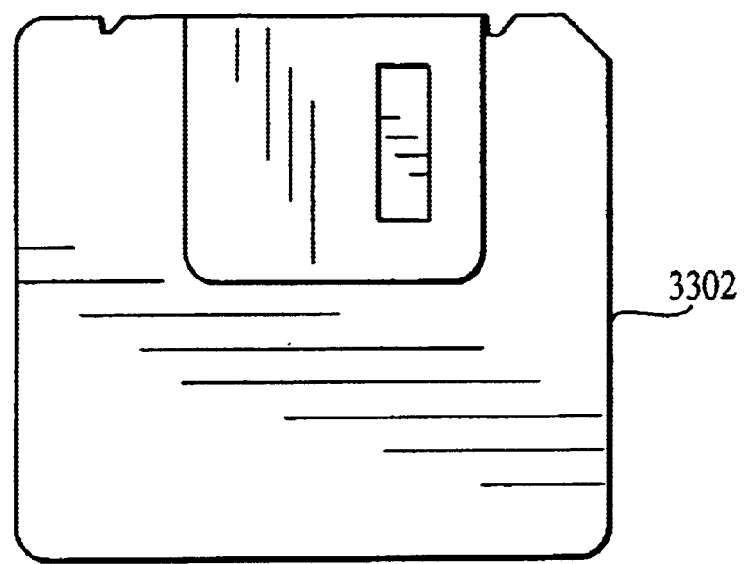
FIG. 33 is an illustrative prior art computer-readable medium upon which computer instructions can be embodied, and FIGS. 34, 34A, 34B, and 34C, taken togather, are an example entity relationship diagram that describes the attributes of entities and the relationship among them.

One of the implementations of the invention is as sets of instructions resident in the random access memory 3208 of one or more computer systems 3100 configured generally as described above. Until required by the computer system, the set of instructions may be stored in another computer readable memory, for example, in the hard disk drive 3214, or in a removable memory such as an optical disk for eventual use in the CD-ROM 3212 or in a floppy disk (e.g., floppy disk 3302 of FIG. 33) for eventual use in a floppy disk drive 3104, 3106. Further, the set of instructions (such as those written in the Java programming language) can be stored in the memory of another computer and transmitted via a transmission medium such as a local area network or a wide area network such as the Internet when desired by the user. One skilled in the art knows that storage or transmission of the computer program medium changes the medium electrically, magnetically, or chemically so that the medium carries computer readable information.

FIG. 34 is an entity relationship diagram (ERD) that describes the attributes of entities and the relationships among them, and illustrates the basic data abstraction of an embodiment of the system. As known to those skilled in the art, an ERD is a conceptual representation of real world objects and the relationships between them. It defines information that the systems create, maintain, process, and delete, as well as the inherent relationships that are supported by the database (i.e., data store).

At least some embodiments of the present invention can utilize a relational database to store and organize all information such as, for example, test procedures, standards/regulations, and user entered information. The design of an embodiment of the database is provided in the ERD shown in FIG. 34. The database is initially populated with security requirements, test procedures and related information to facilitate the operation of the system. As information is entered by the user and calculated by the system, it is also recorded in the database. At least some embodiments of the present invention produce output documentation that can be formatted in accordance with, for example, DITSCAP and/or NIACAP standard(s).

The ERD shown in FIG. 34 uses conventional notation. Each entity, as shown in FIG. 34, comprises a rectangular box. A one-to-one (1:1) relationship indicates that each occurrence of entity A is related to only one of entity B and each occurrence of B is related to only one occurrence of A. A 1:1 relationship is indicated by a single line connecting two entities.

A one-to-many (1:M) relationship indicates that each occurrence of entity A is related to one or more occurrences of entity B, but each occurrence of entity B is related to only one occurrence of entity A. Two vertical lines (as shown, for example, in FIGS. 34A–34C) indicate that entity A is associated only with the second entity. If the two vertical lines are not present, the first entity can be associated with two or more entities.

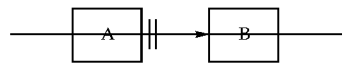

A many-to-many (N:M) relationship shows that each occurrence of entity A is related to one or more occurrences of entity B, and each occurrence of entity B is related to one or more occurrences of entity A. A many-to-many relationship is indicated by an arrow at each end of a solid line.

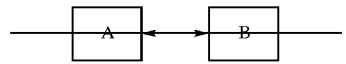

Figure 34A:
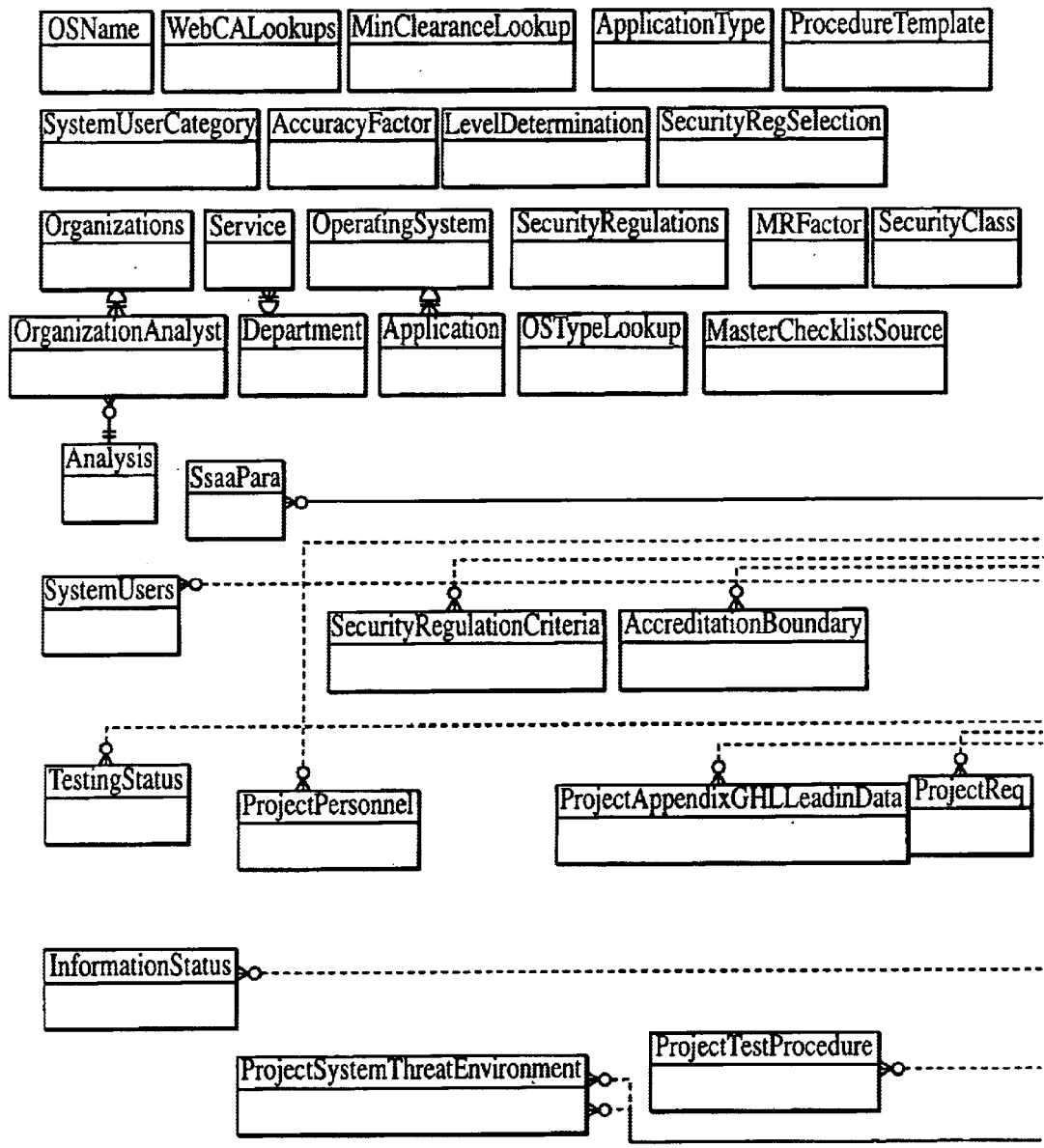
Figure 34:
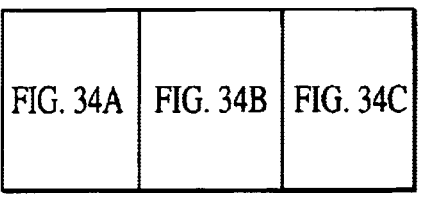
Figure 34B:
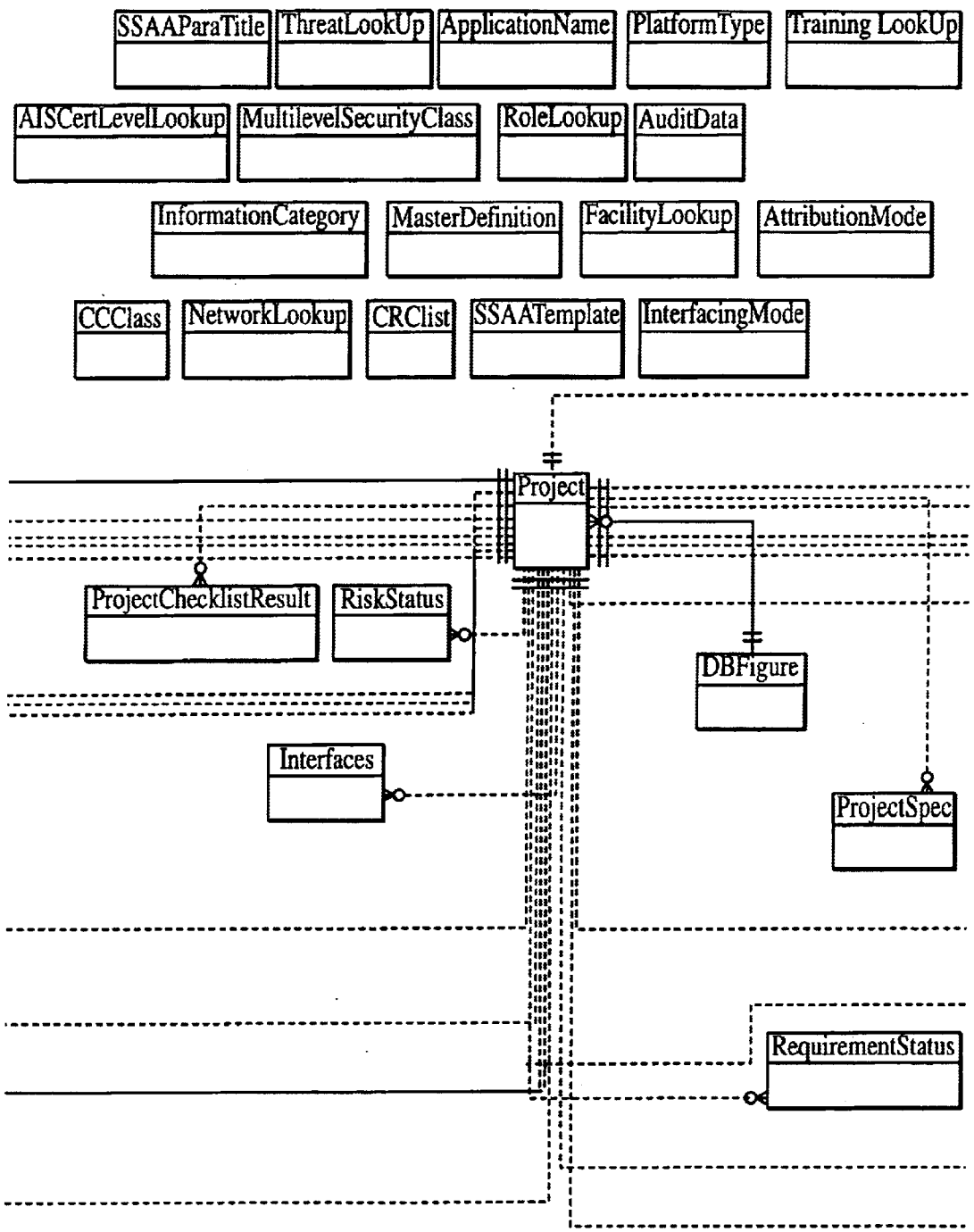
Figure 34C:
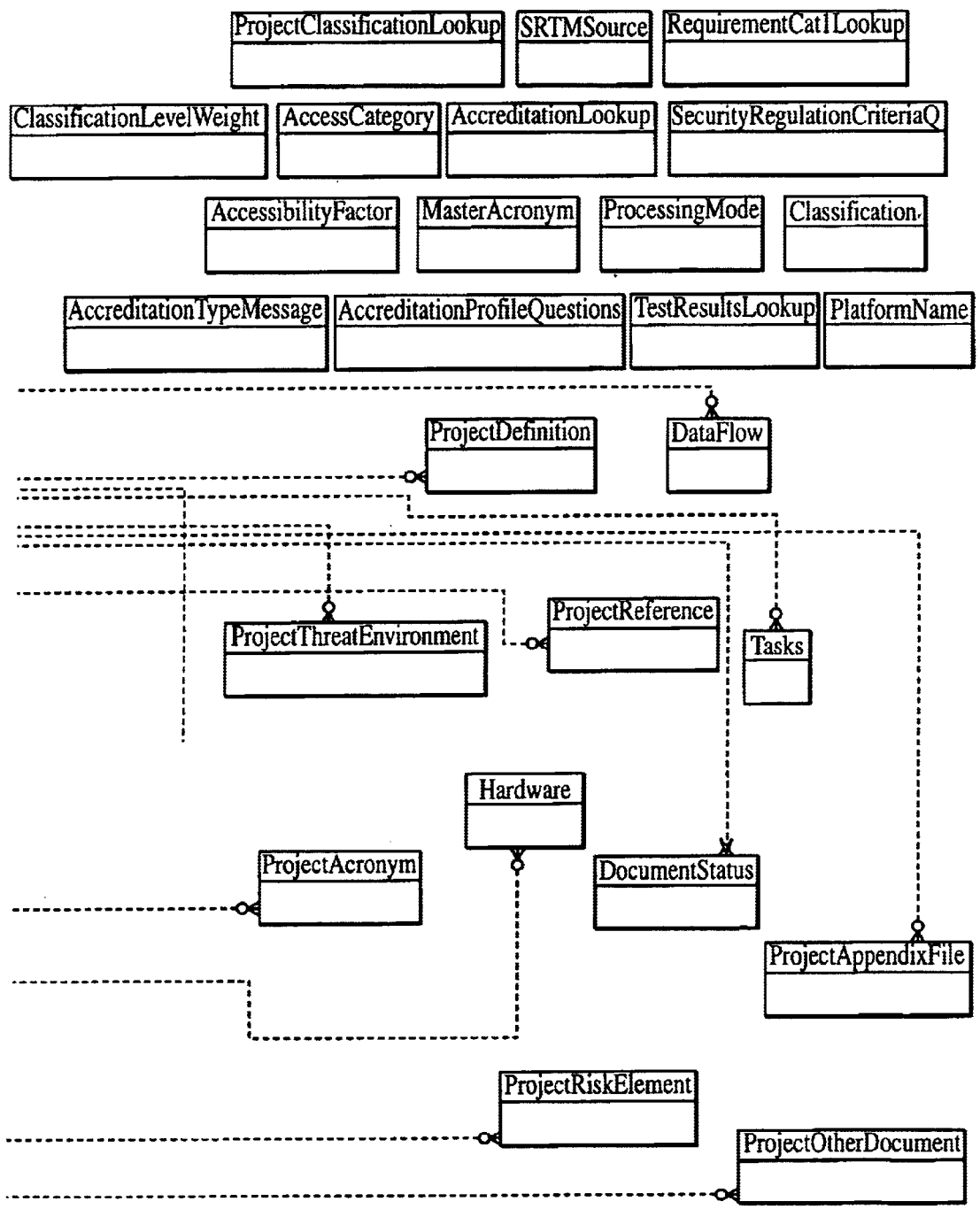

If there can be occurrences of one entity that are not related to at least one occurrence of the other entity, then the relationship is optional and this is shown by the use of a dashed line in FIGS. 34A–34C.

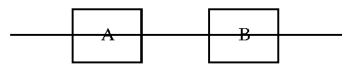

As known to those skilled in the art, a data dictionary, as provided below, defines and specifies the data elements in the system. The data dictionary shown below can be used either as a stand-alone system or as an integral part of the database. Data integrity and accuracy is better ensured in the latter case.

An instance of an entity shown in FIG. 34 will represent one or more lines associated with the Table column in the data dictionary provided below (i.e., an entity shown in FIG. 34 can have many data items/attributes). These data items, representing an attribute of each respective entity to which it belongs, are shown in each line of the data dictionary. The data dictionary also provides the DataType (e.g., varchar, bit, decimal, char, text, int, etc.), and Length (in characters) of the field. The Precision column is applicable only to numerical data and represents the maximum number of significant digits. The Null column indicates whether the field defaults to a null value. FIG. 34 and the data dictionary can be used to produce, for example, the SQL code required to create the data structures in the database.

The table below provides an exemplary data dictionary that can be used with the ERD of FIG. 34.

| Database Table | Column | DataType | Length | Precision | Null |
| --- | --- | --- | --- | --- | --- |
| AccessCategory | | | | | |
| | FormalAccess | int | 4 | 10 | NO |
| | FormalAccessText | varchar | 50 | 0 | YES |
| | Rank | int | 4 | 10 | YES |
| AccessibilityFactor | | | | | |
| | AccessibilityFactor | varchar | 50 | 0 | NO |
| | Rank | int | 4 | 10 | YES |
| AccreditationBoundary | | | | | |
| | PID | decimal | 9 | 18 | NO |
| | Name | varchar | 50 | 0 | YES |
| | Description | text | 16 | 0 | YES |
| | ADID | int | 4 | 10 | YES |

-continued

| Database Table | Column | DataType | Length | Precision | Null |
|---|---|---|---|---|---|
| AccreditationLookup | | | | | |
| | AccreditationCategory | varchar | 50 | 0 | NO |
| | AccreditationType | varchar | 50 | 0 | NO |
| AccreditationProfileQuestions | | | | | |
| | ID | int | 4 | 10 | NO |
| | Message | text | 16 | 0 | YES |
| AccreditationTypeMessage | | | | | |
| | Id | int | 4 | 10 | NO |
| | Choice | varchar | 50 | 0 | YES |
| | Message | varchar | 255 | 0 | YES |
| AccuracyFactor | | | | | |
| | AccuracyFactor | varchar | 50 | 0 | NO |
| | Rank | int | 4 | 10 | YES |
| AISCertLevelLookup | | | | | |
| | CertLevel | varchar | 50 | 0 | NO |
| Analysts | | | | | |
| | AID | int | 4 | 10 | NO |
| | username | varchar | 25 | 0 | NO |
| | Fname | varchar | 20 | 0 | NO |
| | Lname | varchar | 20 | 0 | NO |
| | Telephone | varchar | 20 | 0 | YES |
| | Email | varchar | 50 | 0 | YES |
| | Class | varchar | 10 | 0 | NO |
| | State | varchar | 10 | 0 | NO |
| Application | | | | | |
| | AppID | int | 4 | 10 | NO |
| | ApplicationName | varchar | 50 | 0 | YES |
| | Application-Manufacturer | varchar | 50 | 0 | YES |
| | ApplicationType | varchar | 50 | 0 | YES |
| | OSID | int | 4 | 10 | NO |
| | ApplicationDescription | ntext | 16 | 0 | YES |
| | ApplicationVersion | varchar | 50 | 0 | YES |
| | ApplicationOptions | varchar | 255 | 0 | YES |
| | ApplicationPatches | varchar | 255 | 0 | YES |
| ApplicationName | | | | | |
| | ApplicationName | varchar | 50 | 0 | NO |
| | Application-Manufacturer | varchar | 50 | 0 | NO |
| ApplicationType | | | | | |
| | ApplicationType | varchar | 50 | 0 | YES |
| | Type | char | 1 | 0 | YES |
| AttributionMode | | | | | |
| | AttributionMode | varchar | 50 | 0 | NO |
| | Rank | int | 4 | 10 | YES |
| AuditData | | | | | |
| | AuditDataID | int | 4 | 10 | NO |
| | PID | decimal | 9 | 18 | YES |
| | ProjectName | varchar | 50 | 0 | YES |
| | SectionName | char | 6 | 0 | NO |
| | AspPageName | varchar | 50 | 0 | NO |
| | Action | char | 1 | 0 | NO |
| | TableName | varchar | 50 | 0 | YES |
| | Status | char | 7 | 0 | NO |
| | ErrorMessage | text | 16 | 0 | YES |
| | ErrorNumber | int | 4 | 10 | YES |
| | UserName | varchar | 25 | 0 | NO |
| | DateTimeStamp | datetime | 8 | 23 | NO |
| CCClass | | | | | |
| | Class | varchar | 50 | 0 | YES |
| Classification | | | | | |
| | ID | int | 4 | 10 | NO |
| | ClearanceLevel | varchar | 50 | 0 | YES |

-continued

| Database Table | Column | DataType | Length | Precision | Null |
|---|---|---|---|---|---|
| ClassificationLevelWeight | | | | | |
| | ID | int | 4 | 10 | NO |
| | Characteristic | varchar | 255 | 0 | YES |
| | Alternative | varchar | 255 | 0 | YES |
| | Weight | float | 8 | 53 | YES |
| CRClist | | | | | |
| | FileName | varchar | 250 | 0 | NO |
| | CheckSum | varchar | 50 | 0 | NO |
| | Date | varchar | 50 | 0 | YES |
| | Version | float | 8 | 53 | NO |
| DataFlow | | | | | |
| | DFID | int | 4 | 10 | NO |
| | DataFlowDescription | text | 16 | 0 | YES |
| | PID | decimal | 9 | 18 | NO |
| | ShortName | varchar | 50 | 0 | YES |
| DBFigure | | | | | |
| | ID | int | 4 | 10 | NO |
| | PID | decimal | 9 | 18 | NO |
| | FigureName | varchar | 255 | 0 | NO |
| | FigureNumber | int | 4 | 10 | YES |
| | FigureType | varchar | 50 | 0 | YES |
| | Document | varchar | 50 | 0 | YES |
| | Content | image | 16 | 0 | YES |
| | FigureTitle | varchar | 255 | 0 | YES |
| | Paragraph | varchar | 50 | 0 | YES |
| Department | | | | | |
| | Department | varchar | 50 | 0 | NO |
| | Type | char | 1 | 0 | YES |
| DocumentStatus | | | | | |
| | PID | decimal | 9 | 18 | NO |
| | SSAA | bit | 1 | 1 | NO |
| | AppenA | bit | 1 | 1 | NO |
| | AppenB | bit | 1 | 1 | NO |
| | AppenC | bit | 1 | 1 | NO |
| | AppenD | bit | 1 | 1 | NO |
| | AppenE | bit | 1 | 1 | NO |
| | AppenF | bit | 1 | 1 | NO |
| | AppenG | bit | 1 | 1 | NO |
| | AppenH | bit | 1 | 1 | NO |
| | AppenI | bit | 1 | 1 | NO |
| | AppenJ | bit | 1 | 1 | NO |
| | AppenK | bit | 1 | 1 | NO |
| | AppenL | bit | 1 | 1 | NO |
| | AppenM | bit | 1 | 1 | NO |
| | AppenN | bit | 1 | 1 | NO |
| | AppenO | bit | 1 | 1 | NO |
| | AppenP | bit | 1 | 1 | NO |
| | AppenQ | bit | 1 | 1 | NO |
| | AppenR | bit | 1 | 1 | NO |
| FacilityLookup | | | | | |
| | Rank | int | 4 | 10 | YES |
| | FacilityType | varchar | 50 | 0 | YES |
| Hardware | | | | | |
| | | int | 4 | 10 | NO |
| | PID | decimal | 9 | 18 | NO |
| | PlatformName | varchar | 50 | 0 | YES |
| | PlatformDescription | ntext | 16 | 0 | YES |
| | PlatformType | varchar | 50 | 0 | YES |
| | PlatformDisplay | varchar | 50 | 0 | YES |
| | RAM | varchar | 50 | 0 | YES |
| | PlatformManufacturer | varchar | 50 | 0 | YES |
| | PlatformModel | varchar | 50 | 0 | YES |
| | CPUName | varchar | 50 | 0 | YES |
| | CPUQuantity | varchar | 50 | 0 | YES |
| | CPUSpeed | varchar | 50 | 0 | YES |
| | DiskSpace | varchar | 255 | 0 | YES |
| | DiskDescription | text | 16 | 0 | YES |
| | HardwareOptions | varchar | 255 | 0 | YES |

-continued

| Database Table | Column | DataType | Length | Precision | Null |
|---|---|---|---|---|---|
| | PlatformQuantity | int | 4 | 10 | YES |
| | OtherStorage | varchar | 255 | 0 | YES |
| InformationCategory | | | | | |
| | InformationCatagory | varchar | 50 | 0 | NO |
| | Rank | int | 4 | 10 | YES |
| InformationStatus | | | | | |
| | PID | decimal | 9 | 18 | NO |
| | ProjectDef | char | 1 | 0 | NO |
| | AccredType | char | 1 | 0 | NO |
| | ProjectSec | char | 1 | 0 | NO |
| | SecReqDoc | char | 1 | 0 | NO |
| | ProjectPersonnel | char | 1 | 0 | NO |
| | SystemUsers | char | 1 | 0 | NO |
| | ProjectHardware | char | 1 | 0 | NO |
| | ProjectOS | char | 1 | 0 | NO |
| | ProjectApps | char | 1 | 0 | NO |
| | ProjectSchedule | char | 1 | 0 | NO |
| | ProjectDataFlow | char | 1 | 0 | NO |
| | ProjectInterfaces | char | 1 | 0 | NO |
| | AccredBoundary | char | 1 | 0 | NO |
| | ProjectThreat | char | 1 | 0 | NO |
| | AppendixD | char | 1 | 0 | NO |
| | AppendixE | char | 1 | 0 | NO |
| | AppendixH | char | 1 | 0 | NO |
| | AppendixI | char | 1 | 0 | NO |
| | AppendixJ | char | 1 | 0 | NO |
| | AppendixK | char | 1 | 0 | NO |
| | AppendixL | char | 1 | 0 | NO |
| | AppendixM | char | 1 | 0 | NO |
| | AppendixN | char | 1 | 0 | NO |
| | AppendixO | char | 1 | 0 | NO |
| | AppendixP | char | 1 | 0 | NO |
| | AppendixR | char | 1 | 0 | NO |
| | ProjectHardwareMod | char | 1 | 0 | NO |
| | ProjectOSMod | char | 1 | 0 | NO |
| | ProjectCertLevelMod | char | 1 | 0 | NO |
| Application | | | | | |
| | AppID | int | 4 | 10 | NO |
| | ApplicationName | varchar | 50 | 0 | YES |
| | Application-Manufacturer | varchar | 50 | 0 | YES |
| | ApplicationType | varchar | 50 | 0 | YES |
| | OSID | int | 4 | 10 | NO |
| | ApplicationDescription | ntext | 16 | 0 | YES |
| | ApplicationVersion | varchar | 50 | 0 | YES |
| | ApplicationOptions | varchar | 255 | 0 | YES |
| | ApplicationPatches | varchar | 255 | 0 | YES |
| ApplicationName | | | | | |
| | ApplicationName | varchar | 50 | 0 | NO |
| | Application-Manufacturer | varchar | 50 | 0 | NO |
| ApplicationType | | | | | |
| | ApplicationType | varchar | 50 | 0 | YES |
| | Type | char | 1 | 0 | YES |
| AttributionMode | | | | | |
| | AttributionMode | varchar | 50 | 0 | NO |
| | Rank | int | 4 | 10 | YES |
| AuditData | | | | | |
| | AuditDataID | int | 4 | 10 | NO |
| | PID | decimal | 9 | 18 | YES |
| | ProjectName | varchar | 50 | 0 | YES |
| | SectionName | char | 6 | 0 | NO |
| | AspPageName | varchar | 50 | 0 | NO |
| | Action | char | 1 | 0 | NO |
| | TableName | varchar | 50 | 0 | YES |
| | Status | char | 7 | 0 | NO |
| | ErrorMessage | text | 16 | 0 | YES |
| | ErrorNumber | int | 4 | 10 | YES |
| | UserName | varchar | 25 | 0 | NO |
| | DateTimeStamp | datetime | 8 | 23 | NO |

-continued

| Database Table | Column | DataType | Length | Precision | Null |
|---|---|---|---|---|---|
| CCClass | | | | | |
| | Class | varchar | 50 | 0 | YES |
| Classification | | | | | |
| | ID | int | 4 | 10 | NO |
| | ClearanceLevel | varchar | 50 | 0 | YES |
| ClassificationLevelWeight | | | | | |
| | ID | int | 4 | 10 | NO |
| | Characteristic | varchar | 255 | 0 | YES |
| | Alternative | varchar | 255 | 0 | YES |
| | Weight | float | 8 | 53 | YES |
| CRClist | | | | | |
| | FileName | varchar | 250 | 0 | NO |
| | CheckSum | varchar | 50 | 0 | NO |
| | Date | varchar | 50 | 0 | YES |
| | Version | float | 8 | 53 | NO |
| DataFlow | | | | | |
| | DFID | int | 4 | 10 | NO |
| | DataFlowDescription | text | 16 | 0 | YES |
| | PID | decimal | 9 | 18 | NO |
| | ShortName | varchar | 50 | 0 | YES |
| DBFigure | | | | | |
| | ID | int | 4 | 10 | NO |
| | PID | decimal | 9 | 18 | NO |
| | FigureName | varchar | 255 | 0 | NO |
| | FigureNumber | int | 4 | 10 | YES |
| | FigureType | varchar | 50 | 0 | YES |
| | Document | varchar | 50 | 0 | YES |
| | Content | image | 16 | 0 | YES |
| | FigureTitle | varchar | 255 | 0 | YES |
| | Paragraph | varchar | 50 | 0 | YES |
| Department | | | | | |
| | Department | varchar | 50 | 0 | NO |
| | Type | char | 1 | 0 | YES |
| DocumentStatus | | | | | |
| | PID | decimal | 9 | 18 | NO |
| | SSAA | bit | 1 | 1 | NO |
| | AppenA | bit | 1 | 1 | NO |
| | AppenB | bit | 1 | 1 | NO |
| | AppenC | bit | 1 | 1 | NO |
| | AppenD | bit | 1 | 1 | NO |
| | AppenE | bit | 1 | 1 | NO |
| | AppenF | bit | 1 | 1 | NO |
| | AppenG | bit | 1 | 1 | NO |
| | AppenH | bit | 1 | 1 | NO |
| | AppenI | bit | 1 | 1 | NO |
| | AppenJ | bit | 1 | 1 | NO |
| | AppenK | bit | 1 | 1 | NO |
| | AppenL | bit | 1 | 1 | NO |
| | AppenM | bit | 1 | 1 | NO |
| | AppenN | bit | 1 | 1 | NO |
| | AppenO | bit | 1 | 1 | NO |
| | AppenP | bit | 1 | 1 | NO |
| | AppenQ | bit | 1 | 1 | NO |
| | AppenR | bit | 1 | 1 | NO |
| FacilityLookup | | | | | |
| | Rank | int | 4 | 10 | YES |
| | FacilityType | varchar | 50 | 0 | YES |
| Hardware | | | | | |
| | EUTID | int | 4 | 10 | NO |
| | PID | decimal | 9 | 18 | NO |
| | PlatformName | varchar | 50 | 0 | YES |
| | PlatformDescription | ntext | 16 | 0 | YES |
| | PlatformType | varchar | 50 | 0 | YES |
| | PlatformDisplay | varchar | 50 | 0 | YES |
| | RAM | varchar | 50 | 0 | YES |
| | PlatformManufacturer | varchar | 50 | 0 | YES |
| | PlatformModel | varchar | 50 | 0 | YES |

-continued

| Database Table | Column | DataType | Length | Precision | Null |
|---|---|---|---|---|---|
| | CPUName | varchar | 50 | 0 | YES |
| | CPUQuantity | varchar | 50 | 0 | YES |
| | CPUSpeed | varchar | 50 | 0 | YES |
| | DiskSpace | varchar | 255 | 0 | YES |
| | DiskDescription | text | 16 | 0 | YES |
| | HardwareOptions | varchar | 255 | 0 | YES |
| | PlatformQuantity | int | 4 | 10 | YES |
| | OtherStorage | varchar | 255 | 0 | YES |
| InformationCategory | | | | | |
| | InformationCatagory | varchar | 50 | 0 | NO |
| | Rank | int | 4 | 10 | YES |
| InformationStatus | | | | | |
| | PID | decimal | 9 | 18 | NO |
| | ProjectDef | char | 1 | 0 | NO |
| | AccredType | char | 1 | 0 | NO |
| | ProjectSec | char | 1 | 0 | NO |
| | SecReqDoc | char | 1 | 0 | NO |
| | ProjectPersonnel | char | 1 | 0 | NO |
| | SystemUsers | char | 1 | 0 | NO |
| | ProjectHardware | char | 1 | 0 | NO |
| | ProjectOS | char | 1 | 0 | NO |
| | ProjectApps | char | 1 | 0 | NO |
| | ProjectSchedule | char | 1 | 0 | NO |
| | ProjectDataFlow | char | 1 | 0 | NO |
| | ProjectInterfaces | char | 1 | 0 | NO |
| | AccredBoundary | char | 1 | 0 | NO |
| | ProjectThreat | char | 1 | 0 | NO |
| | AppendixD | char | 1 | 0 | NO |
| | AppendixE | char | 1 | 0 | NO |
| | AppendixH | char | 1 | 0 | NO |
| | AppendixI | char | 1 | 0 | NO |
| | AppendixJ | char | 1 | 0 | NO |
| | AppendixK | char | 1 | 0 | NO |
| | AppendixL | char | 1 | 0 | NO |
| | AppendixM | char | 1 | 0 | NO |
| | AppendixN | char | 1 | 0 | NO |
| | AppendixO | char | 1 | 0 | NO |
| | AppendixP | char | 1 | 0 | NO |
| | AppendixR | char | 1 | 0 | NO |
| | ProjectHardwareMod | char | 1 | 0 | NO |
| | ProjectOSMod | char | 1 | 0 | NO |
| | ProjectCertLevelMod | char | 1 | 0 | NO |
| Interfaces | | | | | |
| | IID | int | 4 | 10 | NO |
| | InterfaceName | varchar | 50 | 0 | YES |
| | InterfaceAcronym | varchar | 50 | 0 | YES |
| | InterfaceDescription | text | 16 | 0 | YES |
| | PID | decimal | 9 | 18 | NO |
| InterfacingMode | | | | | |
| | InterfaceMode | varchar | 50 | 0 | NO |
| | Rank | int | 4 | 10 | YES |
| LevelDetermination | | | | | |
| | ID | int | 4 | 10 | YES |
| | WeightedTotalMin | float | 8 | 53 | YES |
| | WeightedTotalMax | float | 8 | 53 | YES |
| | Class | int | 4 | 10 | YES |
| | Description | varchar | 255 | 0 | YES |
| MasterAcronym | | | | | |
| | Acronym | varchar | 50 | 0 | YES |
| | Description | text | 16 | 0 | YES |
| | Service | varchar | 50 | 0 | YES |
| MasterChecklistSource | | | | | |
| | SectionName | varchar | 255 | 0 | NO |
| | Question | varchar | 50 | 0 | NO |
| | Text | text | 16 | 0 | YES |
| | QuestionSort | int | 4 | 10 | YES |
| MasterDefinition | | | | | |
| | Term | varchar | 50 | 0 | YES |
| | Definition | text | 16 | 0 | YES |

| Database Table | Column | DataType | Length | Precision | Null |
|---|---|---|---|---|---|
| MinClearanceLookup | | | | | |
| | Clearance | varchar | 50 | 0 | NO |
| | Rank | int | 4 | 10 | YES |
| MRFactor | | | | | |
| | MissionRelianceFactor | varchar | 50 | 0 | NO |
| | Rank | int | 4 | 10 | YES |
| MultilevelSecurityClass | | | | | |
| | ID | int | 4 | 10 | YES |
| | MaxDataClass | varchar | 255 | 0 | YES |
| | MinUserClear | varchar | 255 | 0 | YES |
| | Case1 | varchar | 255 | 0 | YES |
| | Case2 | varchar | 255 | 0 | YES |
| | Case3 | varchar | 255 | 0 | YES |
| NetworkLookup | | | | | |
| | Rank | int | 4 | 10 | YES |
| | Network | varchar | 50 | 0 | YES |
| OperatingSystem | | | | | |
| | OSID | int | 4 | 10 | NO |
| | OSName | varchar | 50 | 0 | YES |
| | OSType | varchar | 50 | 0 | NO |
| | OSVersion | varchar | 50 | 0 | YES |
| | OSManufacturer | varchar | 50 | 0 | YES |
| | OSDescription | text | 16 | 0 | YES |
| | OSOptions | varchar | 255 | 0 | YES |
| | OSPatches | varchar | 255 | 0 | YES |
| | Fixes | varchar | 50 | 0 | YES |
| | ServicePack | varchar | 50 | 0 | YES |
| | EUTID | int | 4 | 10 | NO |
| OrganizationAnalyst | | | | | |
| | OrgID | int | 4 | 10 | NO |
| | AID | int | 4 | 10 | NO |
| Organizations | | | | | |
| | OrgID | int | 4 | 10 | NO |
| | OrganizationName | varchar | 50 | 0 | NO |
| | Organization-Description | varchar | 500 | 0 | YES |
| OSName | | | | | |
| | OSName | varchar | 50 | 0 | NO |
| | OSManufacturer | varchar | 50 | 0 | NO |
| | Type | char | 1 | 0 | YES |
| OSTypeLookup | | | | | |
| | Rank | int | 4 | 10 | NO |
| | OSType | varchar | 50 | 0 | NO |
| PlatformName | | | | | |
| | PlatformManufacturer | varchar | 50 | 0 | NO |
| | Type | char | 1 | 0 | YES |
| PlatformType | | | | | |
| | PlatformType | varchar | 50 | 0 | YES |
| | Type | char | 1 | 0 | YES |
| ProcedureTemplate | | | | | |
| | ID | int | 4 | 10 | YES |
| | Cat1 | varchar | 50 | 0 | YES |
| | Cat2 | varchar | 50 | 0 | YES |
| | Cat3 | varchar | 50 | 0 | YES |
| | Platform | varchar | 50 | 0 | YES |
| | Text | text | 16 | 0 | YES |
| | ExpectedResult | text | 16 | 0 | YES |
| | Instance | varchar | 50 | 0 | YES |
| | TestTitle | varchar | 100 | 0 | YES |
| | TestNumber | varchar | 50 | 0 | NO |
| | CertAnalysisLevel | int | 4 | 10 | YES |
| | Threat | varchar | 50 | 0 | YES |
| | ImpactStatement | text | 16 | 0 | YES |
| | I | char | 1 | 0 | YES |
| | O | char | 1 | 0 | YES |

-continued

| Database Table | Column | DataType | Length | Precision | Null |
|---|---|---|---|---|---|
| | T | char | 1 | 0 | YES |
| | D | char | 1 | 0 | YES |
| | TemplateID | int | 4 | 10 | NO |
| ProcessingMode | | | | | |
| | ProcessMode | varchar | 50 | 0 | NO |
| | Rank | int | 4 | 10 | YES |
| Project | | | | | |
| | PID | decimal | 9 | 18 | NO |
| | ProjectName | varchar | 50 | 0 | NO |
| | ProjectDescription | text | 16 | 0 | YES |
| | ProjectClassification | varchar | 50 | 0 | NO |
| | InterfaceMode | varchar | 50 | 0 | YES |
| | InformationCategory | varchar | 50 | 0 | YES |
| | AccreditationType | varchar | 50 | 0 | YES |
| | ProcessingMode | varchar | 50 | 0 | YES |
| | AttributionMode | varchar | 50 | 0 | YES |
| | MRFactor | varchar | 50 | 0 | YES |
| | AccessibilityFactor | varchar | 50 | 0 | YES |
| | AccuracyFactor | varchar | 50 | 0 | YES |
| | OrgID | int | 4 | 10 | NO |
| | SecurityMode | varchar | 50 | 0 | YES |
| | ProjectAcronym | varchar | 50 | 0 | YES |
| | MinClearance | varchar | 50 | 0 | YES |
| | FormalAccess | varchar | 50 | 0 | YES |
| | ProjectVersion | varchar | 50 | 0 | YES |
| | Environment | varchar | 50 | 0 | YES |
| | SecurityClass | varchar | 50 | 0 | YES |
| | MaxLevel | varchar | 50 | 0 | YES |
| | AccreditationSubType | varchar | 50 | 0 | YES |
| | IMVal | int | 4 | 10 | YES |
| | PMVal | int | 4 | 10 | YES |
| | AMVal | int | 4 | 10 | YES |
| | MRFVal | int | 4 | 10 | YES |
| | AF1Val | int | 4 | 10 | YES |
| | AF2Val | int | 4 | 10 | YES |
| | ICVal | int | 4 | 10 | YES |
| | TotalVal | int | 4 | 10 | YES |
| | CertLevel | int | 4 | 10 | YES |
| | ThreatString | varchar | 50 | 0 | YES |
| | InformationSub-Category | varchar | 50 | 0 | YES |
| | CCClass | varchar | 50 | 0 | YES |
| | Department | varchar | 50 | 0 | YES |
| | Service | varchar | 50 | 0 | YES |
| | SecRegChange | varchar | 50 | 0 | YES |
| | SRTMChange | varchar | 50 | 0 | YES |
| | ProjectCalcRisk | varchar | 50 | 0 | YES |
| | ProjectUserRisk | varchar | 50 | 0 | YES |
| | ProjectRiskDescription | text | 16 | 0 | YES |
| | Status | varchar | 50 | 0 | YES |
| | SubscriptionKey | varchar | 50 | 0 | NO |
| | OpSysFolder | varchar | 50 | 0 | YES |
| | Criteria | varchar | 50 | 0 | YES |
| ProjectAcronym | | | | | |
| | ID | int | 4 | 10 | NO |
| | PID | decimal | 9 | 18 | NO |
| | Acronym | varchar | 50 | 0 | YES |
| | Description | text | 16 | 0 | YES |
| ProjectAppendixFile | | | | | |
| | PID | decimal | 9 | 18 | NO |
| | Appendix | varchar | 50 | 0 | NO |
| | Instance | int | 4 | 10 | NO |
| | PrintOrder | int | 4 | 10 | YES |
| | Title | varchar | 255 | 0 | YES |
| | ShortTitle | varchar | 50 | 0 | YES |
| | Author | varchar | 50 | 0 | YES |
| | Date | varchar | 50 | 0 | YES |
| | Version | varchar | 50 | 0 | YES |
| | Url | varchar | 255 | 0 | YES |
| | Status | char | 1 | 0 | YES |
| | AppendixCFlag | char | 1 | 0 | YES |
| | FileImage | image | 16 | 0 | YES |

-continued

| Database Table | Column | DataType | Length | Precision | Null |
|---|---|---|---|---|---|
| | FileName | varchar | 50 | 0 | YES |
| | FileType | varchar | 50 | 0 | YES |
| ProjectAppendix-GHLeadinD | | | | | |
| | PID | decimal | 9 | 18 | NO |
| | Appendix | varchar | 50 | 0 | YES |
| | ExpectedDate | text | 16 | 0 | YES |
| | PlannedLocation | text | 16 | 0 | YES |
| | TestPersonnel | text | 16 | 0 | YES |
| | TestResources | text | 16 | 0 | YES |
| | TestPlanRemarks | text | 16 | 0 | YES |
| ProjectChecklistResult | | | | | |
| | PID | decimal | 9 | 18 | NO |
| | SectionName | varchar | 255 | 0 | YES |
| | Question | varchar | 50 | 0 | YES |
| | Result | varchar | 50 | 0 | YES |
| Project-ClassificationLookup | | | | | |
| | Rank | int | 4 | 10 | NO |
| | ProjectClassification | varchar | 50 | 0 | YES |
| ProjectDefinition | | | | | |
| | ID | int | 4 | 10 | NO |
| | PID | decimal | 9 | 18 | NO |
| | Term | varchar | 255 | 0 | YES |
| | Definition | text | 16 | 0 | YES |
| ProjectOtherDocument | | | | | |
| | DocID | int | 4 | 10 | NO |
| | PID | decimal | 9 | 18 | NO |
| | Title | varchar | 255 | 0 | YES |
| | ShortTitle | varchar | 50 | 0 | YES |
| | Author | varchar | 50 | 0 | YES |
| | Version | varchar | 50 | 0 | YES |
| | Date | varchar | 50 | 0 | YES |
| | Url | varchar | 255 | 0 | YES |
| ProjectPersonnel | | | | | |
| | RoleID | int | 4 | 10 | NO |
| | RoleName | varchar | 50 | 0 | YES |
| | Title | varchar | 50 | 0 | YES |
| | FName | varchar | 50 | 0 | YES |
| | MI | varchar | 50 | 0 | YES |
| | LName | varchar | 50 | 0 | YES |
| | Office | varchar | 50 | 0 | YES |
| | Organization | varchar | 50 | 0 | YES |
| | Address1 | varchar | 50 | 0 | YES |
| | Address2 | varchar | 50 | 0 | YES |
| | City | varchar | 50 | 0 | YES |
| | State | varchar | 50 | 0 | YES |
| | Zip | varchar | 50 | 0 | YES |
| | Phone | varchar | 50 | 0 | YES |
| | OfficeDesignation | varchar | 50 | 0 | YES |
| | PID | decimal | 9 | 18 | NO |
| | Fax | varchar | 50 | 0 | YES |
| | Email | varchar | 50 | 0 | YES |
| ProjectReference | | | | | |
| | RefID | int | 4 | 10 | NO |
| | PID | decimal | 9 | 18 | NO |
| | Title | varchar | 255 | 0 | YES |
| | ShortTitle | varchar | 255 | 0 | YES |
| | Author | varchar | 50 | 0 | YES |
| | Date | varchar | 50 | 0 | YES |
| | Version | varchar | 50 | 0 | YES |
| | Url | varchar | 255 | 0 | YES |
| | Type | char | 1 | 0 | YES |
| | SpecID | int | 4 | 10 | YES |
| | Appendix | varchar | 50 | 0 | YES |
| | Instance | int | 4 | 10 | YES |
| ProjectReq | | | | | |
| | PRID | int | 4 | 10 | NO |
| | PID | decimal | 9 | 18 | NO |

-continued

| Database Table | Column | DataType | Length | Precision | Null |
|---|---|---|---|---|---|
| | SPECID | int | 4 | 10 | YES |
| | SourceDoc | varchar | 50 | 0 | NO |
| | ReqID | int | 4 | 10 | YES |
| | Paragraph | varchar | 255 | 0 | NO |
| | Title | varchar | 255 | 0 | NO |
| | Category1 | varchar | 255 | 0 | YES |
| | Category2 | varchar | 255 | 0 | YES |
| | Stated Requirement | varchar | 2000 | 0 | NO |
| | Interview | varchar | 255 | 0 | YES |
| | Demonstration | varchar | 255 | 0 | YES |
| | Test | varchar | 255 | 0 | YES |
| | Observation | varchar | 255 | 0 | YES |
| | Result | varchar | 255 | 0 | YES |
| | CertReport Reference | varchar | 255 | 0 | YES |
| | Requirement Type | varchar | 255 | 0 | YES |
| | Reference Requirement Doc | varchar | 255 | 0 | YES |
| | Reference Requirement Par | varchar | 255 | 0 | YES |
| | Cat1 | char | 255 | 0 | YES |
| | Cat2 | char | 255 | 0 | YES |
| | Cat3 | char | 255 | 0 | YES |
| | TestNumber | varchar | 50 | 0 | YES |
| | AlreadyPulled | varchar | 255 | 0 | YES |
| | TemplateID | int | 4 | 10 | YES |
| | Type | char | 1 | 0 | NO |
| ProjectRiskElement | | | | | |
| | PID | decimal | 9 | 18 | NO |
| | TestId | int | 4 | 10 | NO |
| | TestFailure | varchar | 100 | 0 | NO |
| | Associated-Requirement | text | 16 | 0 | YES |
| | StatementofIssue | text | 16 | 0 | YES |
| | ImpactStatement | text | 16 | 0 | YES |
| | Safeguard | text | 16 | 0 | YES |
| | RiskAssessment | text | 16 | 0 | YES |
| | CalcRiskLevel | varchar | 50 | 0 | YES |
| | UserRiskLevel | varchar | 50 | 0 | YES |
| | ThreatCorrelation | varchar | 50 | 0 | YES |
| ProjectSpec | | | | | |
| | PID | decimal | 9 | 18 | NO |
| | specid | int | 4 | 10 | NO |
| Project-SystemThreatEnviron | | | | | |
| | PID | decimal | 9 | 18 | YES |
| | ThreatElement | varchar | 50 | 0 | YES |
| | CalcValue | varchar | 50 | 0 | YES |
| | UserDefinedValue | varchar | 50 | 0 | YES |
| | ThreatCategory | varchar | 50 | 0 | YES |
| ProjectTestProcedure | | | | | |
| | PID | decimal | 9 | 18 | NO |
| | TestID | int | 4 | 10 | NO |
| | Cat1 | varchar | 50 | 0 | YES |
| | Cat2 | varchar | 50 | 0 | YES |
| | Cat3 | varchar | 50 | 0 | YES |
| | Text | text | 16 | 0 | YES |
| | ExpectedResult | text | 16 | 0 | YES |
| | Result | varchar | 50 | 0 | YES |
| | Notes | text | 16 | 0 | YES |
| | Tester | varchar | 50 | 0 | YES |
| | Date | datetime | 8 | 23 | YES |
| | HWPlatform | varchar | 50 | 0 | YES |
| | TestNumber | varchar | 50 | 0 | YES |
| | TestNumberType | varchar | 50 | 0 | YES |
| | Threat | varchar | 50 | 0 | YES |
| | ImpactStatement | text | 16 | 0 | YES |
| | TestTitle | varchar | 100 | 0 | YES |
| | I | char | 1 | 0 | YES |

-continued

| Database Table | Column | DataType | Length | Precision | Null |
|---|---|---|---|---|---|
| | O | char | 1 | 0 | YES |
| | T | char | 1 | 0 | YES |
| | D | char | 1 | 0 | YES |
| | EUTID | int | 4 | 10 | YES |
| | AssociatedRequirement | text | 16 | 0 | YES |
| | TemplateID | int | 4 | 10 | YES |
| | Type | char | 1 | 0 | NO |
| | OSType | varchar | 50 | 0 | YES |
| ProjectThreatEnvironment | | | | | |
| | PID | decimal | 9 | 18 | NO |
| | Location | varchar | 50 | 0 | YES |
| | Network | varchar | 50 | 0 | YES |
| | Wireless | varchar | 50 | 0 | YES |
| | Dialup | varchar | 50 | 0 | YES |
| | PDS | varchar | 50 | 0 | YES |
| | AdminTraining | varchar | 50 | 0 | YES |
| | MaintTraining | varchar | 50 | 0 | YES |
| | UserTraining | varchar | 50 | 0 | YES |
| | InstallationFacility | varchar | 50 | 0 | YES |
| | Flood | varchar | 50 | 0 | YES |
| | Fire | varchar | 50 | 0 | YES |
| | Lightning | varchar | 50 | 0 | YES |
| | Tornado | varchar | 50 | 0 | YES |
| | Volcano | varchar | 50 | 0 | YES |
| | Earthquake | varchar | 50 | 0 | YES |
| | CustomHardware | varchar | 50 | 0 | YES |
| | CustomSoftware | varchar | 50 | 0 | YES |
| | ProjectThreatEnvCalc | varchar | 50 | 0 | YES |
| | ProjectThreatEnvUser | varchar | 50 | 0 | YES |
| RequirementCat1Lookup | | | | | |
| | Rank | int | 4 | 10 | YES |
| | Category | varchar | 50 | 0 | YES |
| | Type | varchar | 50 | 0 | YES |
| RequirementStatus | | | | | |
| | SRTMGenerated | bit | 1 | 1 | NO |
| | PID | decimal | 9 | 18 | NO |
| | ReqCustomized | bit | 1 | 1 | NO |
| | UDRAdded | bit | 1 | 1 | NO |
| | BaselineMod | bit | 1 | 1 | NO |
| RiskStatus | | | | | |
| | PID | decimal | 9 | 18 | NO |
| | Failurespulled | char | 1 | 0 | NO |
| | RiskAnalyzed | char | 1 | 0 | NO |
| | ThreatOverride | char | 1 | 0 | NO |
| RoleLookup | | | | | |
| | RoleName | varchar | 50 | 0 | YES |
| SecurityClass | | | | | |
| | ID | int | 4 | 10 | NO |
| | Cls | varchar | 50 | 0 | YES |
| SecurityRegSelection | | | | | |
| | Department | varchar | 50 | 0 | NO |
| | Service | varchar | 50 | 0 | NO |
| | SpecId | int | 4 | 10 | NO |
| SecurityRegulationCriteria | | | | | |
| | PID | decimal | 9 | 18 | NO |
| | F1 | char | 10 | 0 | YES |
| | F2 | char | 10 | 0 | YES |
| | F3 | char | 10 | 0 | YES |
| | F4 | char | 10 | 0 | YES |
| | F5 | char | 10 | 0 | YES |
| | F6 | char | 10 | 0 | YES |
| | F7 | char | 10 | 0 | YES |
| | F8 | char | 10 | 0 | YES |
| | F9 | char | 10 | 0 | YES |
| | F10 | char | 10 | 0 | YES |
| | F11 | char | 10 | 0 | YES |
| | F12 | char | 10 | 0 | YES |

-continued

| Database Table | Column | DataType | Length | Precision | Null |
|---|---|---|---|---|---|
| Security-RegulationCriteriaQ | | | | | |
| | SecurityRegulationCriteriaQuestID | int | 4 | 10 | YES |
| | Code | varchar | 255 | 0 | YES |
| | Message | varchar | 255 | 0 | YES |
| SecurityRegulations | | | | | |
| | SpecID | int | 4 | 10 | NO |
| | SecurityRegulations | varchar | 255 | 0 | YES |
| | Title | varchar | 255 | 0 | YES |
| | SourceDoc | varchar | 50 | 0 | YES |
| | Service | varchar | 50 | 0 | YES |
| | Department | varchar | 50 | 0 | YES |
| | Qualifier | varchar | 50 | 0 | YES |
| | Author | varchar | 50 | 0 | YES |
| | Date | varchar | 50 | 0 | YES |
| | Version | varchar | 50 | 0 | YES |
| | Url | varchar | 255 | 0 | YES |
| | Type | char | 1 | 0 | YES |
| Service | | | | | |
| | Service | varchar | 50 | 0 | NO |
| | Department | varchar | 50 | 0 | NO |
| | Type | char | 1 | 0 | YES |
| SRTMSource | | | | | |
| | ID | int | 4 | 10 | NO |
| | SPECID | int | 4 | 10 | NO |
| | SourceDoc | varchar | 255 | 0 | NO |
| | Paragraph | varchar | 255 | 0 | YES |
| | Title | varchar | 255 | 0 | YES |
| | Category | varchar | 255 | 0 | YES |
| | StatedRequirement | varchar | 2000 | 0 | NO |
| | Class | varchar | 255 | 0 | YES |
| | SubCategory | varchar | 255 | 0 | YES |
| | I | varchar | 255 | 0 | YES |
| | D | varchar | 255 | 0 | YES |
| | T | varchar | 255 | 0 | YES |
| | O | varchar | 255 | 0 | YES |
| | AccreditationType | varchar | 255 | 0 | YES |
| | Criteria | varchar | 255 | 0 | YES |
| | RequirementType | varchar | 255 | 0 | YES |
| | ReferenceRequirementDoc | varchar | 255 | 0 | YES |
| | ReferenceRequirementPar | varchar | 255 | 0 | YES |
| | Method | varchar | 255 | 0 | YES |
| | Cat1 | varchar | 255 | 0 | YES |
| | Cat2 | varchar | 255 | 0 | YES |
| | Cat3 | varchar | 255 | 0 | YES |
| | TestNumber | varchar | 50 | 0 | YES |
| SsaaPara | | | | | |
| | PID | decimal | 9 | 18 | NO |
| | ParaNumber | varchar | 255 | 0 | NO |
| | ParaDescription | text | 16 | 0 | YES |
| | ID | int | 4 | 10 | NO |
| | Document | varchar | 50 | 0 | NO |
| SSAAParaTitle | | | | | |
| | ID | int | 4 | 10 | NO |
| | Title | varchar | 60 | 0 | NO |
| | Paragraph | varchar | 50 | 0 | NO |
| | Document | varchar | 50 | 0 | NO |
| | Service | varchar | 50 | 0 | YES |
| | Command | varchar | 50 | 0 | YES |
| SSAAStatus | | | | | |
| | PID | decimal | 9 | 18 | NO |
| | Par1_1 | bit | 1 | 1 | NO |
| | Par1_2 | bit | 1 | 1 | NO |

-continued

| Database Table | Column | DataType | Length | Precision | Null |
|---|---|---|---|---|---|
| | Par1_3 | bit | 1 | 1 | NO |
| | Par1_3_1 | bit | 1 | 1 | NO |
| | Par1_3_2 | bit | 1 | 1 | NO |
| | Par1_3_3 | bit | 1 | 1 | NO |
| | Par1_3_4 | bit | 1 | 1 | NO |
| | Par1_3_5 | bit | 1 | 1 | NO |
| | Par1_4 | bit | 1 | 1 | NO |
| | Par2_1 | bit | 1 | 1 | NO |
| | Par2_1_1 | bit | 1 | 1 | NO |
| | Par2_1_2 | bit | 1 | 1 | NO |
| | Par2_1_3 | bit | 1 | 1 | NO |
| | Par2_1_4 | bit | 1 | 1 | NO |
| | Par2_1_5 | bit | 1 | 1 | NO |
| | Par2_1_6 | bit | 1 | 1 | NO |
| | Par2_1_7 | bit | 1 | 1 | NO |
| | Par2_1_8 | bit | 1 | 1 | NO |
| | Par2_2 | bit | 1 | 1 | NO |
| | Par2_3 | bit | 1 | 1 | NO |
| | Par3_1 | bit | 1 | 1 | NO |
| | Par3_2 | bit | 1 | 1 | NO |
| | Par3_3 | bit | 1 | 1 | NO |
| | Par3_4 | bit | 1 | 1 | NO |
| | Par6_4_1 | bit | 1 | 1 | NO |
| | Par6_4_2 | bit | 1 | 1 | NO |
| | Par6_4_3 | bit | 1 | 1 | NO |
| | Par6_4_4 | bit | 1 | 1 | NO |
| | Par6_4_5 | bit | 1 | 1 | NO |
| | Par6_4_6 | bit | 1 | 1 | NO |
| | Par6_4_7 | bit | 1 | 1 | NO |
| | Par6_4_8 | bit | 1 | 1 | NO |
| | Par6_4_9 | bit | 1 | 1 | NO |
| | Par4_1 | bit | 1 | 1 | NO |
| | Par4_2 | bit | 1 | 1 | NO |
| | Par4_3 | bit | 1 | 1 | NO |
| | Par4_4 | bit | 1 | 1 | NO |
| | Par4_5 | bit | 1 | 1 | NO |
| | Par4_5_1 | bit | 1 | 1 | NO |
| | Par4_5_2 | bit | 1 | 1 | NO |
| | Par4_6 | bit | 1 | 1 | NO |
| | Par4_7 | bit | 1 | 1 | NO |
| | Par4_8 | bit | 1 | 1 | NO |
| | Par5_1 | bit | 1 | 1 | NO |
| | Par5_1_1 | bit | 1 | 1 | NO |
| | Par5_1_2 | bit | 1 | 1 | NO |
| | Par5_1_3 | bit | 1 | 1 | NO |
| | Par5_1_4 | bit | 1 | 1 | NO |
| | Par5_1_5 | bit | 1 | 1 | NO |
| | Par5_1_6 | bit | 1 | 1 | NO |
| | Par5_2 | bit | 1 | 1 | NO |
| | Par5_2_1 | bit | 1 | 1 | NO |
| | Par5_2_2 | bit | 1 | 1 | NO |
| | Par5_3 | bit | 1 | 1 | NO |
| | Par5_4 | bit | 1 | 1 | NO |
| | Par5_5 | bit | 1 | 1 | NO |
| | Par6_1 | bit | 1 | 1 | NO |
| | Par6_1_1 | bit | 1 | 1 | NO |
| | Par6_1_2 | bit | 1 | 1 | NO |
| | Par6_1_3 | bit | 1 | 1 | NO |
| | Par6_1_4 | bit | 1 | 1 | NO |
| | Par6_2 | bit | 1 | 1 | NO |
| | Par6_3 | bit | 1 | 1 | NO |
| | Par6_4 | bit | 1 | 1 | NO |
| | Par6_5 | bit | 1 | 1 | NO |
| | Sec1_0 | bit | 1 | 1 | NO |
| | Sec2_0 | bit | 1 | 1 | NO |
| | Sec3_0 | bit | 1 | 1 | NO |
| | Sec4_0 | bit | 1 | 1 | NO |
| | Sec5_0 | bit | 1 | 1 | NO |
| | Sec6_0 | bit | 1 | 1 | NO |
| | SSAA | bit | 1 | 1 | NO |
| | AppenD_0 | bit | 1 | 1 | NO |
| | AppenD_1 | bit | 1 | 1 | NO |
| | AppenD_3 | bit | 1 | 1 | NO |
| | AppenD_5 | bit | 1 | 1 | NO |
| | AppenE_0 | bit | 1 | 1 | NO |
| | AppenE_1 | bit | 1 | 1 | NO |
| | AppenE_3 | bit | 1 | 1 | NO |

-continued

| Database Table | Column | DataType | Length | Precision | Null |
|---|---|---|---|---|---|
| | AppenE_5 | bit | 1 | 1 | NO |
| | AppenF_1 | bit | 1 | 1 | NO |
| | AppenF_5 | bit | 1 | 1 | NO |
| | AppenG_1 | bit | 1 | 1 | NO |
| | AppenG_2 | bit | 1 | 1 | NO |
| | AppenG_6 | bit | 1 | 1 | NO |
| | AppenH_1 | bit | 1 | 1 | NO |
| | AppenH_3 | bit | 1 | 1 | NO |
| | AppenH_5 | bit | 1 | 1 | NO |
| | AppenI_1 | bit | 1 | 1 | NO |
| | AppenI_3 | bit | 1 | 1 | NO |
| | AppenI_5 | bit | 1 | 1 | NO |
| | AppenJ_0 | bit | 1 | 1 | NO |
| | AppenJ_1 | bit | 1 | 1 | NO |
| | AppenJ_3 | bit | 1 | 1 | NO |
| | AppenJ_5 | bit | 1 | 1 | NO |
| | AppenK_0 | bit | 1 | 1 | NO |
| | AppenK_1 | bit | 1 | 1 | NO |
| | AppenK_3 | bit | 1 | 1 | NO |
| | AppenK_5 | bit | 1 | 1 | NO |
| | AppenL_0 | bit | 1 | 1 | NO |
| | AppenL_1 | bit | 1 | 1 | NO |
| | AppenL_3 | bit | 1 | 1 | NO |
| | AppenL_5 | bit | 1 | 1 | NO |
| | AppenM_0 | bit | 1 | 1 | NO |
| | AppenM_1 | bit | 1 | 1 | NO |
| | AppenM_3 | bit | 1 | 1 | NO |
| | AppenM_5 | bit | 1 | 1 | NO |
| | AppenN_0 | bit | 1 | 1 | NO |
| | AppenN_1 | bit | 1 | 1 | NO |
| | AppenN_3 | bit | 1 | 1 | NO |
| | AppenN_5 | bit | 1 | 1 | NO |
| | AppenO_0 | bit | 1 | 1 | NO |
| | AppenO_1 | bit | 1 | 1 | NO |
| | AppenO_3 | bit | 1 | 1 | NO |
| | AppenO_5 | bit | 1 | 1 | NO |
| | AppenP_1 | bit | 1 | 1 | NO |
| | AppenP_3 | bit | 1 | 1 | NO |
| | AppenP_5 | bit | 1 | 1 | NO |
| | AppenQ_1 | bit | 1 | 1 | NO |
| | AppenQ_2 | bit | 1 | 1 | NO |
| | AppenQ_6 | bit | 1 | 1 | NO |
| | AppenR_0 | bit | 1 | 1 | NO |
| | AppenR_1 | bit | 1 | 1 | NO |
| | AppenR_3 | bit | 1 | 1 | NO |
| | AppenR_5 | bit | 1 | 1 | NO |
| | Par3_5 | bit | 1 | 1 | NO |
| SSAATemplate | | | | | |
| | Paragraph97 | varchar | 255 | 0 | YES |
| | Instance | int | 4 | 10 | YES |
| | Text | text | 16 | 0 | YES |
| | Notes | varchar | 50 | 0 | YES |
| | Document | varchar | 50 | 0 | YES |
| | Service | varchar | 50 | 0 | YES |
| | Command | varchar | 50 | 0 | YES |
| | Paragraph | varchar | 255 | 0 | YES |
| SystemUserCategory | | | | | |
| | Category | varchar | 50 | 0 | NO |
| | Type | char | 1 | 0 | YES |
| SystemUsers | | | | | |
| | PID | decimal | 9 | 18 | NO |
| | Category | varchar | 50 | 0 | NO |
| | MinClearance | varchar | 50 | 0 | NO |
| | AISCertLevel | varchar | 50 | 0 | YES |
| | ForeignNational | varchar | 50 | 0 | YES |
| | Description | text | 16 | 0 | YES |
| | CatID | int | 4 | 10 | NO |
| | Rank | int | 4 | 10 | NO |
| Tasks | | | | | |
| | PID | decimal | 9 | 18 | NO |
| | TaskID | int | 4 | 10 | NO |
| | Title | varchar | 50 | 0 | YES |
| | Date | varchar | 50 | 0 | YES |

-continued

| Database Table | Column | DataType | Length | Precision | Null |
|---|---|---|---|---|---|
| | Milestone | text | 16 | 0 | YES |
| | NewDate | datetime | 8 | 23 | YES |
| TestingStatus | | | | | |
| | PID | decimal | 9 | 18 | NO |
| | BaselineGenerated | bit | 1 | 1 | NO |
| | TestCustomized | bit | 1 | 1 | NO |
| | UDTAdded | bit | 1 | 1 | NO |
| | AppendixGLeadinData | bit | 1 | 1 | NO |
| | AppendixHLeadinData | bit | 1 | 1 | NO |
| TestResultsLookup | | | | | |
| | Rank | int | 4 | 10 | YES |
| | Result | varchar | 50 | 0 | YES |
| ThreatLookUp | | | | | |
| | CategoryRank | int | 4 | 10 | NO |
| | Rank | int | 4 | 10 | NO |
| | ThreatCategory | varchar | 50 | 0 | NO |
| | ThreatElement | varchar | 50 | 0 | NO |
| TrainingLookup | | | | | |
| | Rank | int | 4 | 10 | YES |
| | TrainingLevel | varchar | 50 | 0 | YES |
| WebCALookups | | | | | |
| | WebcaLookupsId | int | 4 | 10 | NO |
| | TableName | varchar | 50 | 0 | NO |
| | ColumnName | varchar | 50 | 0 | NO |
| | Description | varchar | 50 | 0 | YES |
| | Size | int | 4 | 10 | YES |

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention. While the foregoing invention has been described in detail by way of illustration and example of preferred embodiments, numerous modifications, substitutions, and alterations are possible without departing from the scope of the invention defined in the following claims.

What is claimed is:

1. A computer-assisted method of assessing the risk of and/or determining the suitability of a target system to comply with at least one predefined standard, regulation and/or requirement, the target system including hardware and/or software, the method comprising the steps of:
   a) collecting information descriptive of at least one aspect of the target system hardware and/or software, and/or a physical environment in which the target system operates;
   b) selecting at least one predefined standard, regulation and/or requirement with which the target system is to comply;
   c) generating a score for each of a plurality of threat elements, each score indicating a likelihood of that threat element affecting and/or impacting the target system;
   d) selecting at least one test procedure against which the target system is tested to satisfy the at least one predefined standard, regulation and/or requirement;
   e) performing the steps associated with said at least one test procedure in said step d) to determine whether the target system passes or fails said at least one test procedure; and
   f) (1) obtaining a threat correlation indication associated with said at least one test procedure, wherein said threat correlation indication indicates a relative potential of one or more threat elements to exploit a vulnerability caused by a failure of said at least one test procedure, and
   (2) determining a risk assessment by comparing each score generated in said step c) with a corresponding threat correlation indication of said step f) (1).

2. The computer-assisted method according to claim 1 wherein the information collected in said step a) comprises at least one of central processing unit (CPU) manufacturer, CPU clock speed, operating system (OS) manufacturer, OS version, and OS patches.

3. The computer-assisted method according to claim 1 wherein said selecting step b) is initially performed by the computer.

4. The computer-assisted method according to claim 3, further comprising the step of enabling a user to optionally input at least one standard, regulation and/or requirement.

5. The computer-assisted method according to claim 3, further comprising the step of enabling a user to optionally edit at least one standard, regulation and/or requirement.

6. The computer-assisted method according to claim 1 wherein said scores for said step c) comprise at least one of:
   a) negligible, wherein negligible indicates that the threat element is not applicable or has negligible likelihood of occurrence;
   b) low, wherein low indicates that the threat element has a relatively low likelihood of occurrence;
   c) medium, wherein medium indicates that the threat element has a medium likelihood of occurrence; and d) high, wherein high indicates that the threat element has a relatively high likelihood of occurrence.

7. The computer-assisted method according to claim 1 wherein said score of said step c) is generated in response to one or more inputs provided by a user.

8. The computer-assisted method according to claim 7 wherein the user can modify and/or edit said score as determined in said step c).

9. The computer-assisted method according to claim 1 wherein said step c) plurality of threat elements comprise at least one of natural disaster elements, target system failure elements, environmental failure elements, unintentional human elements, and intentional human elements.

10. The computer-assisted method according to claim 9 wherein the natural disaster threat elements comprise at least one of fire, flood, earthquake, volcano, tornado and lighting elements.

11. The computer-assisted method according to claim 9 wherein the target system failure threat elements comprise at least one of a hardware failure, a power failure, and a communication link failure.

12. The computer-assisted method according to claim 9 wherein the environmental failure threat elements comprise at least one of temperature, power, humidity, sand, dust, shock, and vibration.

13. The computer-assisted method according to claim 9 wherein the human unintentional threat element comprises at least one of a software design error, a target system design error, and an operator error.

14. The computer-assisted method according to claim 9 wherein the human intentional threat elements comprise at least one of an authorized target system administrator, an authorized maintenance personnel, an authorized user, a terrorist, a hacker, a saboteur, a thief, and a vandal.

15. The computer-assisted method according to claim 1 wherein said step f1) threat correlation indication comprises at least one of the following scores:
   negligible, wherein negligible indicates that the threat element is not applicable to the vulnerability;
   low, wherein low indicates that the threat element has a low potential to exploit the vulnerability;
   medium, wherein medium indicates that the threat element has a potential to exploit the vulnerability; and
   high, wherein high indicates that the threat element has a relatively high potential to exploit the vulnerability.

16. The computer-assisted method according to claim 15 wherein the risk assessment in said step f2) is determined in accordance with the following steps:
   a) for each threat element in a project threat profile and corresponding threat element in a threat correlation pattern:
      1) if a threat element as determined in said step c) is negligible and a corresponding threat element in the threat correlation indication as determined in said step f1) is anything, then the overall risk of the element is negligible;
      2) if a threat element as determined in said step c) is low and the corresponding threat element in the threat correlation indication as determined in said step f1) is negligible, then the overall risk of the element is low;
      3) if a threat element as determined in said step c) is low and the corresponding threat element in the threat correlation indication as determined in said step f1) is low, then the overall risk of the element is low;
      4) if a threat element as determined in said step c) is low and the corresponding threat element in the threat correlation indication as determined in said step f1) is medium, then the overall risk of the element is low;
      5) if a threat element as determined in said step c) is low and the corresponding threat element in the threat correlation indication as determined in said step f1) is high, then the overall risk of the element is medium;
      6) if a threat element as determined in said step c) is medium and the corresponding threat element in the threat correlation indication as determined in said step f1) is negligible, then the overall risk of the element is negligible;
      7) if a threat element as determined in said step c) is medium and the corresponding threat element in the threat correlation indication as determined in said step f1) is low, then the overall risk of the element is low;
      8) if a threat element as determined in said step c) is medium and the corresponding threat element in the threat correlation indication as determined in said step f1) is medium, then the overall risk of the element is medium;
      9) if a threat element as determined in said step c) is medium and the corresponding threat element in the threat correlation indication as determined in said step f1) is high, then the overall risk of the element is medium;
      10) if a threat element as determined in said step c) is high and the corresponding threat element in the threat correlation indication as determined in said step f1) is negligible, then the overall risk of the element is negligible;
      11) if a threat element as determined in said step c) is high and the corresponding threat element in the threat correlation indication as determined in said step f1) is low, then the overall risk of the element is medium;
      12) if a threat element as determined in said step c) is high and the corresponding threat element in the threat correlation indication as determined in said step f1) is medium, then the overall risk of the element is high; and
      13) if a threat element as determined in said step c) is high and the corresponding threat element in the threat correlation indication as determined in said step f1) is high, then the overall risk of the element is high; and
   b) selecting a risk profile for a failed test procedure as being the highest overall risk element.

17. The computer-assisted method according to claim 16, further comprising the step of determining an overall target system risk.

18. The computer-assisted method according to claim 17 wherein the overall target system risk is the highest overall risk element of each of one or more failed test procedures.

19. The computer-assisted method according to claim 17, further comprising the step of printing a documentation package that will enable a determination to be made whether the target system complies with the at least one predefined standard, regulation and/or requirement selected in said step b).

20. The computer-assisted method according to claim 19 wherein the documentation package includes a risk assessment for at least one failed test procedure.

21. The computer-assisted method according to claim 19 wherein the documentation package includes an overall target system risk.

22. A general purpose computing system for implementing a method for assessing the risk of and/or determining the suitability of a target system to comply with at least one predefined standard, regulation and/or requirement, the target system including hardware and/or software, the general purpose computing system interacting with a user to implement the method comprising the steps of:
   a) collecting and/or receiving information descriptive of at least one aspect of the target system hardware and/or software, and/or a physical environment in which the target system operates;
   b) selecting at least one predefined standard, regulation and/or requirement with which the target system is to comply;
   c) generating a score for each of a plurality of threat elements, each score indicating a likelihood of that threat element affecting and/or impacting the target system;
   d) selecting at least one test procedure against which the target system is tested to satisfy the at least one predefined standard, regulation and/or requirement;
   e) performing the steps associated with said at least one test procedure in said step d) to determine whether the target system passes or fails said at least one test procedure; and
   f) (1) obtaining a threat correlation indication associated with said at least one test procedure, wherein said threat correlation indication indicates a relative potential of one or more threat elements to exploit a vulnerability caused by a failure of said at least one test procedure, and
   (2) determining a risk assessment by comparing each score generated in said step c) with a corresponding threat correlation indication of said step f) (1).

23. The general purpose computing system according to claim 22 wherein the information collected in said step a) comprises at least one of central processing unit (CPU) manufacturer, CPU clock speed, operating system (OS) manufacturer, OS version, and OS patches.

24. The general purpose computing system according to claim 23, wherein the user can optionally input at least one standard, regulation and/or requirement.

25. The general purpose computing system according to claim 23, wherein the user can optionally edit at least one standard, regulation and/or requirement.

26. The general purpose computing system according to claim 22 wherein said scores for said step c) comprise at least one of:
   a) negligible, wherein negligible indicates that the threat element is not applicable or has negligible likelihood of occurrence;
   b) low, wherein low indicates that the threat element has a relatively low likelihood of occurrence;
   c) medium, wherein medium indicates that the threat element has a medium likelihood of occurrence; and
   d) high, wherein high indicates that the threat element has a relatively high likelihood of occurrence.

27. The general purpose computing system according to claim 22 wherein said score of said step c) is generated in response to one or more user provided inputs.

28. The general purpose computing system according to claim 27 wherein the user can modify and/or edit said score as determined in said step c).

29. The general purpose computing system according to claim 22 wherein said step c) plurality of threat elements comprise at least one of natural disaster elements, target system failure elements, environmental failure elements, unintentional human elements, and intentional human elements.

30. The general purpose computing system according to claim 29 wherein the natural disaster threat elements comprise at least one of fire, flood, earthquake, volcano, tornado and lighting elements.

31. The general purpose computing system according to claim 29 wherein the target system failure threat elements comprise at least one of a hardware failure, a power failure, and a communication link failure.

32. The general purpose computing system according to claim 29 wherein the environmental failure threat elements comprise at least one of temperature, power, humidity, sand, dust, shock, and vibration.

33. The general purpose computing system according to claim 29 wherein the human unintentional threat element comprises at least one of a software design error, a target system design error, and an operator error.

34. The general purpose computing system according to claim 29 wherein the human intentional threat elements comprise at least one of an authorized target system administrator, an authorized maintenance personnel, an authorized user, a terrorist, a hacker, a saboteur, a thief, and a vandal.

35. The general purpose computing system according to claim 22 wherein said step f1) threat correlation indication comprises at least one of the following scores:
   negligible, wherein negligible indicates that the threat element is not applicable to the vulnerability;
   low, wherein low indicates that the threat element has a low potential to exploit the vulnerability;
   medium, wherein medium indicates that the threat element has a potential to exploit the vulnerability; and
   high, wherein high indicates that the threat element has a relatively high potential to exploit the vulnerability.

36. The general purpose computing system according to claim 35 wherein the risk assessment in said step f2) is determined in accordance with the following steps:
   a) for each threat element in a project threat profile and corresponding element in a threat correlation pattern:
      1) if a threat element as determined in said step c) is negligible and a corresponding threat element in the threat correlation indication as determined in said step f1) is anything, then the overall risk of the element is negligible;
      2) if a threat element as determined in said step c) is low and the corresponding threat element in the threat correlation indication as determined in said step f1) is negligible, then the overall risk of the element is low;
      3) if a threat element as determined in said step c) is low and the corresponding threat element in the threat correlation indication as determined in said step f1) is low, then the overall risk of the element is low;
      4) if a threat element as determined in said step c) is low and the corresponding threat element in the threat correlation indication as determined in said step f1) is medium, then the overall risk of the element is low;
      5) if a threat element as determined in said step c) is low and the corresponding threat element in the threat correlation indication as determined in said step f1) is high, then the overall risk of the element is medium;

6) if a threat element as determined in said step c) is medium and the corresponding threat element in the threat correlation indication as determined in said step f1) is negligible, then the overall risk of the element is negligible;

7) if a threat element as determined in said step c) is medium and the corresponding threat element in the threat correlation indication as determined in said step f1) is low, then the overall risk of the element is low;

8) if a threat element as determined in said step c) is medium and the corresponding threat element in the threat correlation indication as determined in said step f1) is medium, then the overall risk of the element is medium;

9) if a threat element as determined in said step c) is medium and the corresponding threat element in the threat correlation indication as determined in said step f1) is high, then the overall risk of the element is medium;

10) if a threat element as determined in said step c) is high and the corresponding threat element in the threat correlation indication as determined in said step f1) is negligible, then the overall risk of the element is negligible;

11) if a threat element as determined in said step c) is high and the corresponding threat element in the threat correlation indication as determined in said step f1) is low, then the overall risk of the element is medium;

12) if a threat element as determined in said step c) is high and the corresponding threat element in the threat correlation indication as determined in said step f1) is medium, then the overall risk of the element is high; and 13) if a threat element as determined in said step c) is high and the corresponding threat element in the threat correlation indication as determined in said step f1) is high, then the overall risk of the element is high; and b) selecting a risk profile for a failed test procedure as being the highest overall risk element.

37. The general purpose computing system according to claim 36, further comprising the step of determining an overall target system risk.

38. The general purpose computing system according to claim 37 wherein the overall target system risk is the highest overall risk element of each of one or more failed test procedures.

39. The general purpose computing system according to claim 37, wherein the general purpose computing system prints a documentation package that will enable a determination to be made whether the target system complies with the at least one selected predefined standard, regulation and/or requirement.

40. The general purpose computing system according to claim 39 wherein the documentation package includes a risk assessment for at least one failed test procedure.

41. The general purpose computing system according to claim 39 wherein the documentation package includes an overall target system risk.

42. A computer program medium storing computer instructions therein for instructing a computer to perform a computer-implemented and user assisted process for assessing the risk of and/or determining the suitability of a target system to comply with at least one predefined standard, regulation and/or requirement, the target system including hardware and/or software, the program medium comprising:

a recording medium readable by the computer; and the computer instructions stored on said recording medium instructing the computer to perform the computer-implemented and user assisted process, the instructions including:

a) collecting and/or receiving information descriptive of at least one aspect of the target system hardware and/or software, and/or a physical environment in which the target system operates;

b) selecting at least one predefined standard, regulation and/or requirement with which the target system is to comply;

c) generating a score for each of a plurality of threat elements, each score indicating a likelihood of that threat elements affecting and/or impacting the target system;

d) selecting at least one test procedure against which the target system is tested to satisfy the at least one predefined standard, regulation and/or requirement;

e) performing the steps associated with said at least one test procedure in said step d) to determine whether the target system passes or fails said at least one test procedure; and f) (1) obtaining a threat correlation indication associated with said at least one test procedure, wherein said threat correlation indication indicates a relative potential of one or more threat elements to exploit a vulnerability caused by a failure of said at least one test procedure, and (2) determining a risk assessment by comparing each threat element generated in said step c) with said threat correlation indication of said step f) (1).

43. The computer program medium according to claim 42 wherein the information collected in said instruction a) comprises at least one of central processing unit (CPU) manufacturer, CPU clock speed, operating system (OS) manufacturer, OS version, and OS patches.

44. The computer program medium according to claim 43, further comprising instructions that enable the user to optionally input at least one standard, regulation and/or requirement.

45. The computer program medium according to claim 43, further comprising instructions that enable the user to optionally edit at least one standard, regulation and/or requirement.

46. The computer program medium according to claim 42 wherein said scores for said step c) comprise at least one of:

a) negligible, wherein negligible indicates that the threat element is not applicable or has negligible likelihood of occurrence;

b) low, wherein low indicates that the threat element has a relatively low likelihood of occurrence;

c) medium, wherein medium indicates that the threat element has a medium likelihood of occurrence; and d) high, wherein high indicates that the threat element has a relatively high likelihood of occurrence.

47. The computer program medium according to claim 42 wherein said score of said step c) is generated in response to one or more user provided inputs.

48. The computer program medium according to claim 47 wherein the user can modify and/or edit said score as determined in said step c).

49. The computer program medium according to claim 42 wherein said instruction c) threat elements comprise at least one of natural disaster elements, target system failure elements, environmental failure elements, unintentional human elements, and intentional human elements.

50. The computer program medium according to claim 49 wherein the natural disaster threat elements comprise at least one of fire, flood, earthquake, volcano, tornado and lighting elements.

51. The computer program medium according to claim 49 wherein the target system failure threat elements comprise at least one of a hardware failure, a power failure, and a communication link failure.

52. The computer program medium according to claim 49 wherein the environmental failure threat elements comprise at least one of temperature, power, humidity, sand, dust, shock, and vibration.

53. The computer program medium according to claim 49 wherein the human unintentional threat elements comprise at least one of a software design error, a target system design error, and an operator error.

54. The computer program medium according to claim 49 wherein the human intentional threat elements comprise at least one of an authorized target system administrator, an authorized maintenance personnel, an authorized user, a terrorist, a hacker, a saboteur, a thief, and a vandal.

55. The computer program medium according to claim 42 wherein said instruction f1) threat correlation indication comprises at least one of the following scores:

negligible, wherein negligible indicates that the threat element is not applicable to the vulnerability;

low, wherein low indicates that the threat element has a low potential to exploit the vulnerability;

medium, wherein medium indicates that the threat element has a potential to exploit the vulnerability; and high, wherein high indicates that the threat element has a relatively high potential to exploit the vulnerability.

56. The computer program medium according to claim 55 wherein the risk assessment in said instruction f2) is determined in accordance with the following steps:

a) for each element in a project threat profile and corresponding element in a threat correlation pattern:
1) if a threat element as determined in said step c) is negligible and a corresponding threat element in the threat correlation indication as determined in said step f1) is anything, then the overall risk of the element is negligible;
2) if a threat element as determined in said step c) is low and the corresponding threat element in the threat correlation indication as determined in said step f1) is negligible, then the overall risk of the element is low;
3) if a threat element as determined in said step c) is low and the corresponding threat element in the threat correlation indication as determined in said step f1) is low, then the overall risk of the element is low;
4) if a threat element as determined in said step c) is low and the corresponding threat element in the threat correlation indication as determined in said step f1) is medium, then the overall risk of the element is low;
5) if a threat element as determined in said step c) is low and the corresponding threat element in the threat correlation indication as determined in said step f1) is high, then the overall risk of the element is medium;
6) if a threat element as determined in said step c) is medium and the corresponding threat element in the threat correlation indication as determined in said step f1) is negligible, then the overall risk of the element is negligible;
7) if a threat element as determined in said step c) is medium and the corresponding threat element in the threat correlation indication as determined in said step f1) is low, then the overall risk of the element is low;
8) if a threat element as determined in said step c) is medium and the corresponding threat element in the threat correlation indication as determined in said step f1) is medium, then the overall risk of the element is medium;
9) if a threat element as determined in said step c) is medium and the corresponding threat element in the threat correlation indication as determined in said step f1) is high, then the overall risk of the element is medium;
10) if a threat element as determined in said step c) is high and the corresponding threat element in the threat correlation indication as determined in said step f1) is negligible, then the overall risk of the element is negligible;
11) if a threat element as determined in said step c) is high and the corresponding threat element in the threat correlation indication as determined in said step f1) is low, then the overall risk of the element is medium;
12) if a threat element as determined in said step c) is high and the corresponding threat element in the threat correlation indication as determined in said step f1) is medium, then the overall risk of the element is high; and
13) if a threat element as determined in said step c) is high and the corresponding threat element in the threat correlation indication as determined in said step f1) is high, then the overall risk of the element is high; and b) selecting a risk profile for a failed test procedure as being the highest overall risk element.

57. The computer program medium according to claim 56, further comprising instructions for determining an overall target system risk.

58. The computer program medium according to claim 57 wherein the overall target system risk is the highest overall risk element of each of one or more failed test procedures.

59. The computer program medium according to claim 57, further comprising instructions for generating and printing a documentation package that will enable a determination to be made whether the target system complies with the at least one predefined standard, regulation and/or requirement.

60. The computer program medium according to claim 59 wherein the documentation package includes a risk assessment for at least one failed test procedure.

61. The computer program medium according to claim 59 wherein the documentation package includes an overall target system risk.

* * * * *